(12) United States Patent
Dudar et al.

(10) Patent No.: US 10,150,365 B2
(45) Date of Patent: Dec. 11, 2018

(54) SYSTEMS AND METHODS FOR COORDINATING REMOTE FUEL DELIVERY TO VEHICLES

(71) Applicant: Ford Global Technologies, LLC, Dearborn, MI (US)

(72) Inventors: Aed M. Dudar, Canton, MI (US); Dennis Seung-Man Yang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 34 days.

(21) Appl. No.: 15/265,788

(22) Filed: Sep. 14, 2016

(65) Prior Publication Data

US 2018/0072152 A1    Mar. 15, 2018

(51) Int. Cl.
| | |
|---|---|
| *B60K 15/035* | (2006.01) |
| *B60K 15/05* | (2006.01) |
| *B67D 7/04* | (2010.01) |
| *B67D 7/14* | (2010.01) |
| *B60K 15/03* | (2006.01) |

(52) U.S. Cl.
CPC ........ *B60K 15/03504* (2013.01); *B60K 15/05* (2013.01); *B67D 7/0492* (2013.01); *B67D 7/145* (2013.01); *B60K 2015/0319* (2013.01); *B60K 2015/0321* (2013.01); *B60K 2015/03342* (2013.01); *B60K 2015/0538* (2013.01)

(58) Field of Classification Search
None
See application file for complete search history.

(56) References Cited

U.S. PATENT DOCUMENTS

| | | |
|---|---|---|
| 4,396,202 A | 8/1983 | Kami et al. |
| 4,923,210 A | 5/1990 | Heider et al. |
| 5,322,321 A | 6/1994 | Yopp |
| 6,980,131 B1 | 12/2005 | Taylor |
| 7,034,747 B1 | 4/2006 | Walters et al. |

(Continued)

OTHER PUBLICATIONS

Dudar, Aed M., et al., "Systems and Methods for Operating an Evaporative Emissions System," U.S. Appl. No. 14/747,741, filed Jun. 23, 2015, 67 pages.

(Continued)

*Primary Examiner* — Rami Khatib
(74) *Attorney, Agent, or Firm* — Julia Voutyras; McCoy Russell LLP

(57) ABSTRACT

Methods and systems are provided for diagnosing functionality of a vehicle fuel system and a vehicle evaporative emissions system, and one or more components thereof, subsequent to refueling a vehicle fuel tank, and wherein the refueling event may comprise a remote refueling event. In one example, after completion of the refueling event, the fuel system and evaporative emissions system are sealed from atmosphere and from each other, and pressure is monitored in both the fuel system and evaporative emissions system in order to indicate the presence or absence of undesired evaporative emissions in both the fuel system and evaporative emissions system, and to indicate whether the fuel system is effectively sealed from the evaporative emissions system. In this way, costs associated with vehicle repair may be decreased, and undesired evaporative emissions to the atmosphere may be reduced.

16 Claims, 15 Drawing Sheets

(56) References Cited

U.S. PATENT DOCUMENTS

| | | |
|---|---|---|
| 8,556,327 B1 | 10/2013 | Higgins |
| 2004/0089063 A1* | 5/2004 | Matsubara ......... F02M 25/0818 |
| | | 73/114.41 |
| 2004/0089064 A1* | 5/2004 | Kidokoro ........... F02M 25/0809 |
| | | 73/114.41 |
| 2008/0203308 A1 | 8/2008 | Yoo |
| 2009/0002141 A1 | 1/2009 | Rinaldi |
| 2010/0121551 A1 | 5/2010 | Boss et al. |
| 2010/0294251 A1 | 11/2010 | Makino et al. |
| 2012/0152210 A1 | 6/2012 | Reddy et al. |
| 2012/0188054 A1 | 7/2012 | Bongard |
| 2013/0096757 A1* | 4/2013 | Fukui ................. F02M 25/0809 |
| | | 701/22 |
| 2013/0157640 A1 | 6/2013 | Aycock |
| 2013/0253799 A1 | 9/2013 | Peters et al. |
| 2014/0137985 A1 | 5/2014 | Zitkovic et al. |
| 2014/0260549 A1 | 9/2014 | Dudar et al. |
| 2015/0083089 A1 | 3/2015 | Pearce et al. |
| 2015/0198123 A1 | 7/2015 | Pearce et al. |
| 2016/0069304 A1* | 3/2016 | Guidi ................. F02M 25/0809 |
| | | 123/518 |
| 2018/0075567 A1* | 3/2018 | Mycroft ................ G06Q 50/30 |

OTHER PUBLICATIONS

Dudar, Aed M., et al., "Systems and Methods for Coordinating Remote Fuel Delivery to Vehicles," U.S. Appl. No. 15/265,763, filed Sep. 14, 2016, 122 pages.

* cited by examiner

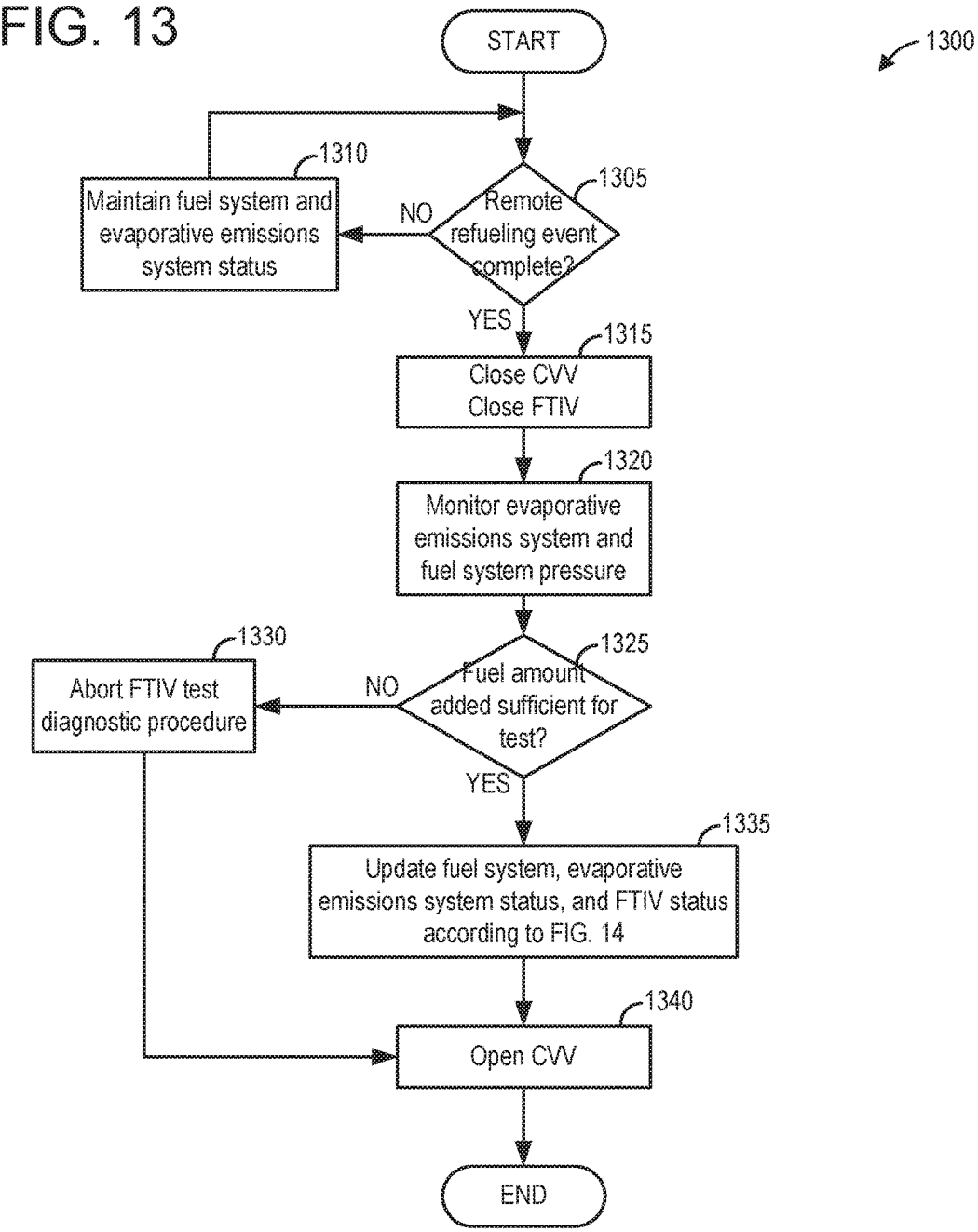

FIG. 14

| | Results of monitoring fuel system and evaporative emission system pressure subsequent to closing CVV and FTIV | Diagnosis |
|---|---|---|
| A | Fuel system pressure > threshold and evap system vacuum > threshold | Absence of undesired emissions in fuel system and evap system and FTIV functioning as desired |
| B | Fuel system pressure > threshold and evap system vacuum ~ = atmospheric pressure | Undesired evaporative emissions in canister-side of evap system and FTIV functioning as desired |
| C | Fuel system pressure and evap system pressure converge | FTIV not functioning as desired |
| D | Fuel system pressure < threshold and evap system vacuum > threshold | Undesired evaporative emissions in fuel system and FTIV functioning as desired |

SYSTEMS AND METHODS FOR COORDINATING REMOTE FUEL DELIVERY TO VEHICLES

FIELD

The present description relates generally to methods and systems for coordinating requests from vehicle operators to remotely fill vehicle fuel tanks via a fuel delivery service.

BACKGROUND/SUMMARY

Refilling of a vehicle fuel tank is an integral procedure for a vehicle that is powered at least in part by an engine configured to propel the vehicle via combustion of fuel. However, refilling the vehicle fuel tank can be a time consuming and cumbersome activity for a vehicle operator. For example, time spent driving to and from a gas station, in addition to time spent refueling a vehicle and/or waiting at the gas station for an opportunity to refuel, can take away from time spent on other more desirable activities. In other examples, the act of refueling a vehicle may in itself not be desirable to certain vehicle operators, for one reason or another. As such, there are now examples of companies striving to reduce the negative aspects of vehicle refueling, by providing a service that delivers fuel on demand to a vehicle, regardless of where the vehicle may be located. However, current methods for such services require that the fuel door be unlocked. While some fuel doors do not lock, or may be opened by mechanical means such as pushing on the fuel door, fuel doors that must be unlocked can be potentially problematic to such a service if the customer is not physically present at the vehicle location but desires the vehicle to be fueled by the refueling service. Such a problem is especially true for plug-in hybrid electric vehicles (PHEVs), where the fuel tank is typically sealed except during refueling operations and wherein the fuel tank must be depressurized before the refueling door unlocks to allow refueling to commence. The inventors herein have recognized these issues.

Furthermore, a remote refueling event may comprise a desirable opportunity for conducting evaporative emissions test diagnostic procedures and/or diagnosing components in a vehicle evaporative emissions system and fuel system subsequent to the remote refueling event. More specifically, because a refueling event may result in agitation of fuel in the fuel tank and may thus increase fuel vaporization and fuel temperature, if the evaporative emission system and fuel system are sealed subsequent to the refueling event, a pressure increase above a predetermined threshold (or thresholds) may be indicative of an absence of undesired evaporative emissions. However, if the car were to be immediately driven subsequent to the refueling event, interpretation of the results of an evaporative emissions test diagnostic may be confounded by variables such as slosh in the fuel tank, change in fuel tank pressure resulting from the fuel pump removing fuel from the fuel tank, etc.

Still further, for vehicles with sealed fuel tanks, the tank is typically sealed via a fuel tank isolation valve (FTIV) positioned between the fuel tank and a fuel vapor storage canister. Diagnosing functionality of the FTIV may be readily accomplished in vehicles with an onboard pump configured to evacuated or pressurize the fuel tank. For example, the FTIV may be closed, and the onboard pump activated. If a pressure change is observed in the fuel tank, for example, then it may be indicated that the FTIV is not functioning as desired. Similarly, engine manifold vacuum may be used to conduct a similar diagnostic of the FTIV. However, some vehicles are not equipped with an onboard pump, and furthermore, some vehicles may operate primarily in electric-only mode, thus reducing any opportunities to rationalize the FTIV via the use of engine intake manifold vacuum. In such examples, another method of FTIV diagnosis is desirable, such that overloading of the fuel vapor storage canister may be prevented, which may thus reduce undesired evaporative emissions.

The inventors herein have recognized these issues, and have developed systems and methods to at least partially address them. In one example, a method is provided, comprising after refueling a fuel system that supplies fuel to an engine, sealing the fuel system, and an evaporative emissions system removably coupled thereto, from atmosphere and from each other, and while the fuel system and the evaporative emissions system remain sealed and the engine is off, testing each of the systems based on a first pressure change in the fuel system, and a second pressure change in the evaporative emissions system.

In one example, testing each of the systems further comprises indicating an absence of undesired evaporative emissions in the fuel system responsive to the first pressure change in the fuel system reaching a first predetermined pressure threshold that is positive with respect to atmospheric pressure, and indicating an absence of undesired evaporative emissions in the evaporative emissions system responsive to the second pressure change in the evaporative emissions system reaching a second predetermined pressure threshold that is negative with respect to atmospheric pressure.

In another example, sealing the fuel system and evaporative emissions system from each other is accomplished via a fuel tank isolation valve positioned in a conduit between the fuel system and evaporative emissions system. In such an example, the fuel tank isolation valve may be indicated to be not functioning as desired responsive to pressure in the fuel system and the evaporative emissions system converging to a common pressure while the fuel system and evaporative emissions system are sealed from each other and from atmosphere. In this way, both a fuel system and evaporative emissions system may be simultaneously tested for undesired evaporative emissions, and a fuel tank isolation valve may further be indicated as to whether it is functioning as desired. By testing the fuel system and evaporative emissions system as such, potential locations of undesired evaporative emissions may be determined, thus decreasing costs associated with mitigation, and may reduce undesired evaporative emissions released to atmosphere.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 13 shows a flowchart of a high-level example method for conducting a fuel tank isolation valve diagnostic responsive to completion of a remote refueling event.

FIG. 14 shows a lookup table for interpreting the results of a fuel tank isolation valve diagnostic according to the method depicted in FIG. 13.

DETAILED DESCRIPTION

Figure 1:
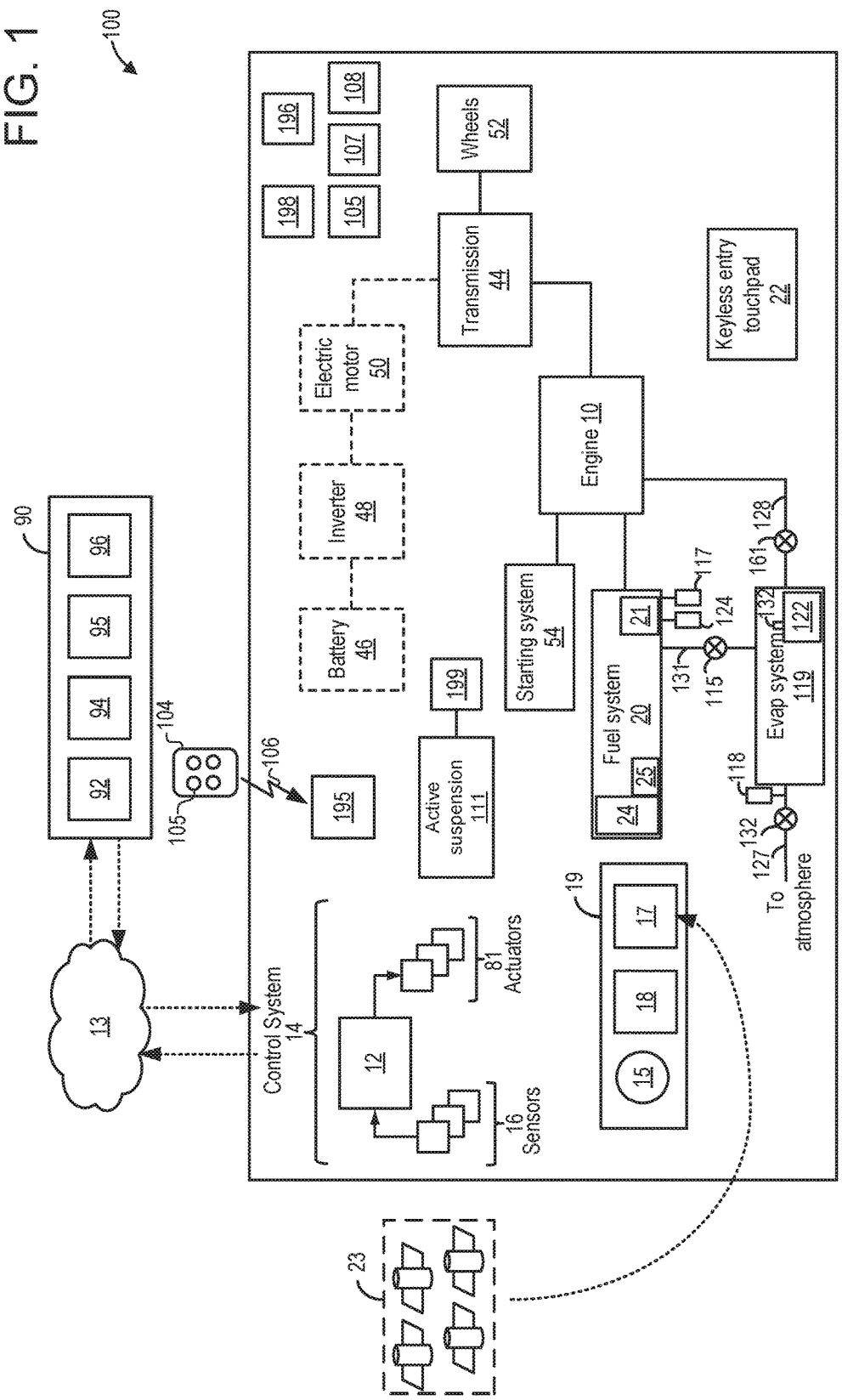
FIG. 1 shows a high-level block diagram illustrating an example vehicle system.

The following description relates to systems and methods for conducting a remote refueling event on a vehicle, such as the vehicle system depicted in FIG. 1. Specifically, a passenger vehicle may be refueled via a fuel delivery vehicle, using a remote fuel delivery system, such as the remote fuel delivery system depicted in FIG. 2. Remote fuel delivery may be scheduled by a passenger vehicle operator via the use of a website or software application (app), such as the application depicted in FIG. 3. In order to conduct the fuel delivery operations, precise vehicle location must be known by a fuel delivery vehicle operator. In one example, the passenger vehicle may automatically transmit vehicle location information to the software application, responsive to an indication of a vehicle-off event, as depicted in FIG. 4A. Alternatively, if the passenger vehicle is not equipped with vehicle location capabilities, the vehicle-off event may be communicated to a remote device, where the remote device may be equipped with location capabilities, as depicted in FIG. 4B. In such an example the remote device may typically be with the passenger vehicle operator in the vehicle at a vehicle-off condition, which may thus enable the remote device to serve as a vehicle-location indicator.

In some examples, access to the passenger vehicle fuel tank may be needed prior to enabling fuel delivery. For example, a refueling lock may need to be unlocked. As such, the software application may include information as to how the refueling lock may be unlocked to enable the remote refueling event. In one example, responsive to the vehicle controller receiving a request for refueling, the refueling lock may be unlocked according to the method depicted in FIG. 5A. In another example, the vehicle fuel tank may comprise a sealed fuel tank where the fuel tank may need to be depressurized prior to enabling the remote fuel delivery. In such an example, responsive to the vehicle controller receiving a request for refueling, the fuel tank may be depressurized prior to opening a refueling lock, or fuel door, according to the method depicted in FIG. 5B. For example, fuel tank depressurization may comprise coupling the fuel tank to the evaporative emissions system, and coupling the evaporative emissions system to atmosphere.

Figure 7:
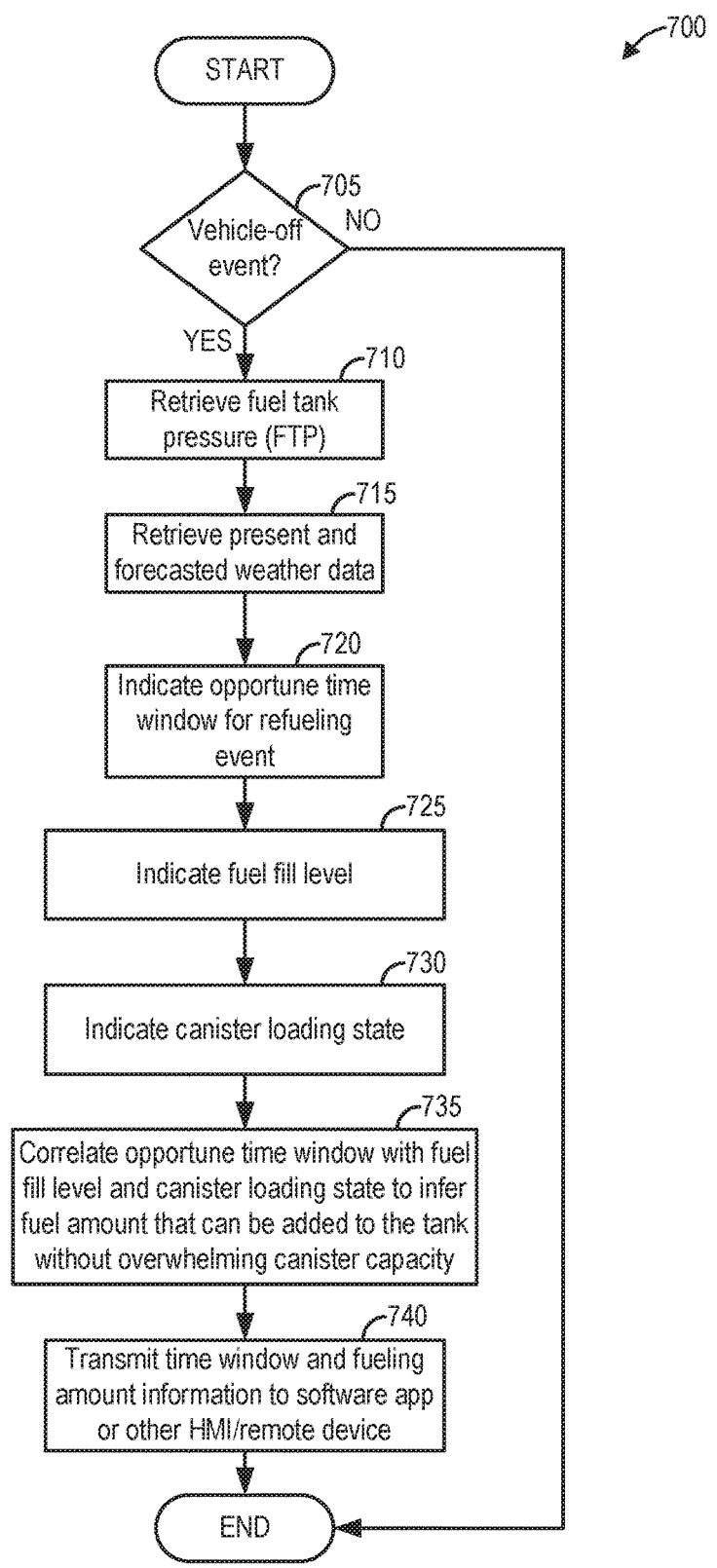
FIG. 7 shows a flowchart for a high-level example method for indicating time window(s) for environmentally friendly refueling events for vehicles comprising sealed fuel tanks.
Figure 8:
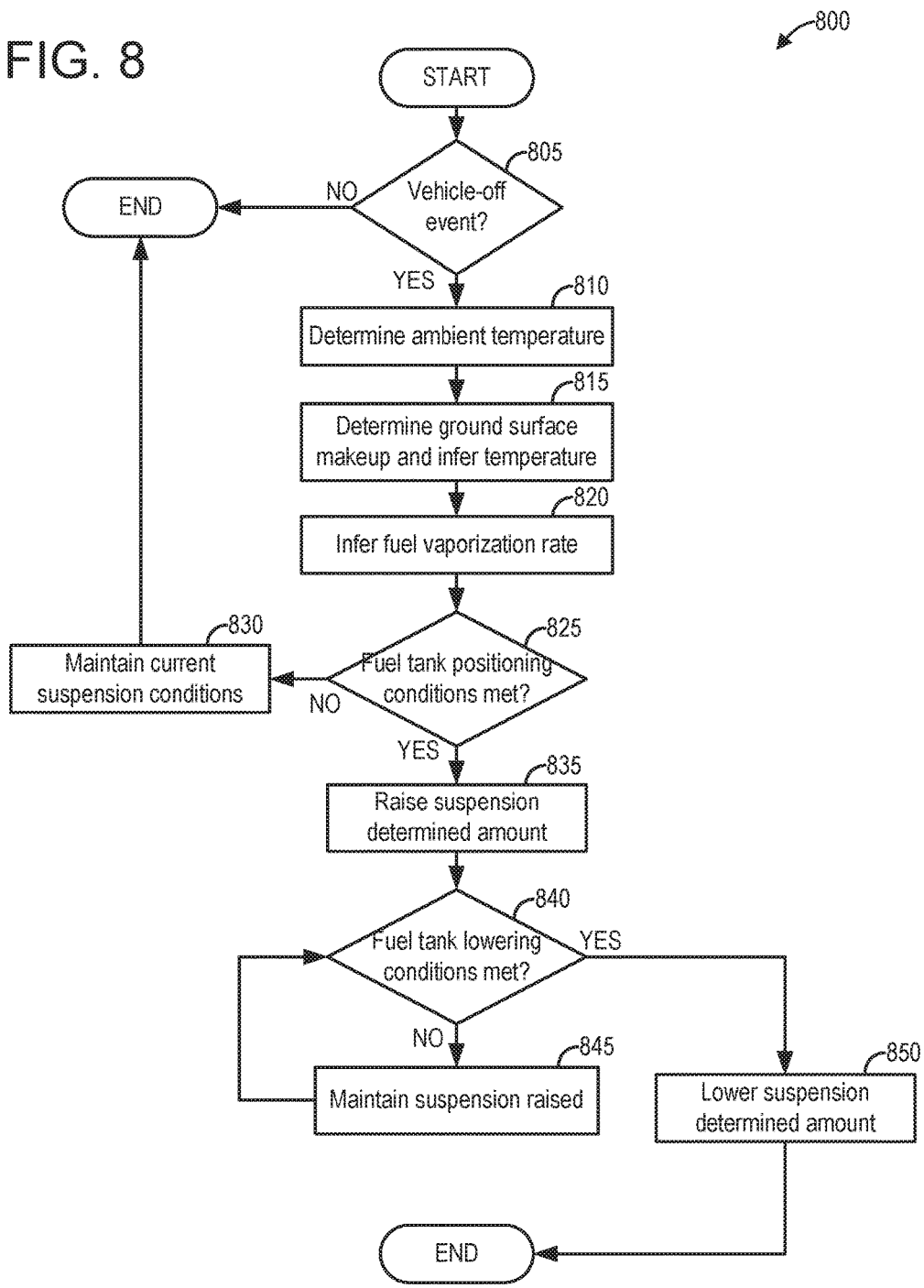
FIG. 8 shows a flowchart for a high-level example method for increasing a distance between a vehicle fuel tank and a ground surface during a vehicle-off event.

Depending on a loading state of a fuel vapor canister configured to capture and store fuel tank vapors, in some examples a (remote) refueling event may overwhelm the fuel vapor canister which may result in undesired evaporative emissions. Accordingly, for vehicles without a sealed fuel tank, the vehicle controller may determine a canister loading state, and based on the fuel level in the tank, an amount of fuel that can be added to the tank without overwhelming the canister may be indicated according to the method depicted in FIG. 6. For vehicles with sealed fuel tanks that need to be depressurized prior to enabling fuel to be added to the tank, certain times may be better than others for refueling events. For example, if the vehicle fuel tank is at negative pressure during depressurization, then a back-purge of the canister may result, which may thus partially clean the canister prior to the addition of fuel to the tank. In such an example the subsequent refueling event may not overwhelm the capacity of the canister. Accordingly, opportune time windows for environmentally friendly refueling events, where such time windows may additionally include a calculated amount of fuel that can be added to the tank without overwhelming the canister, may be determined according to the method depicted in FIG. 7. In some examples, conditions in which the vehicle is parked may additionally contribute to the loading of the fuel vapor canister with fuel vapors if the fuel tank is not sealed, or may result in a significant pressure-build in a sealed fuel tank such that a fuel vapor canister may become loaded with vapors during depressurization of the sealed fuel tank. Such examples may include if the vehicle is parked on a hot ground surface and the ambient temperature is high. As such, in some examples a vehicle suspension may be used in order to increase a distance between the vehicle fuel tank and the ground, which may enable a more environmentally friendly refueling event, for example, by encouraging the fuel tank to be at atmospheric or negative pressure. A method for raising the vehicle suspension to decrease fuel volatilization during vehicle-off conditions, is depicted in FIG. 8.

Figure 9:
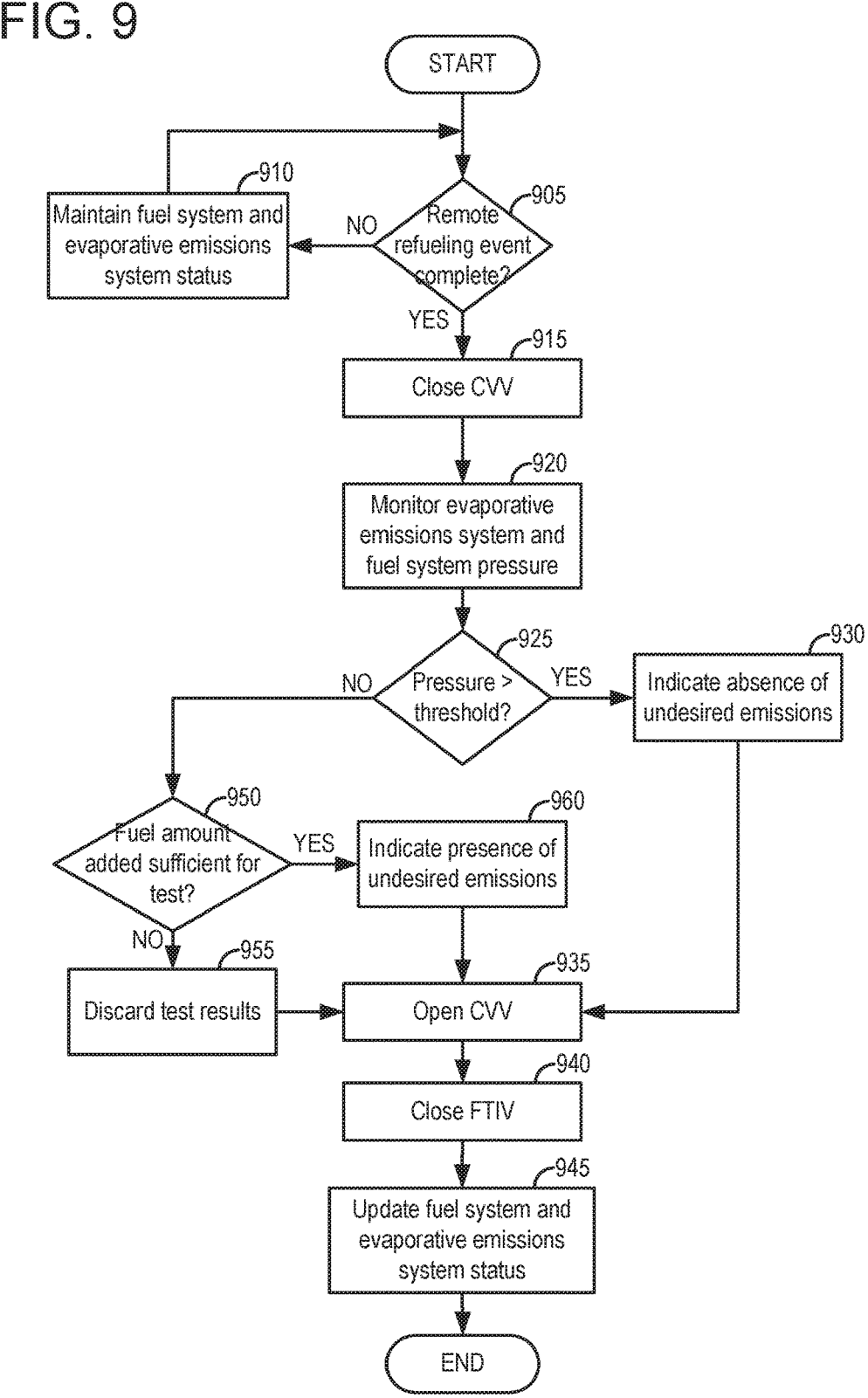
FIG. 9 shows a flowchart for a high-level example method for conducting an evaporative emissions test diagnostic procedure responsive to completion of a remote refueling event.
Figure 10:
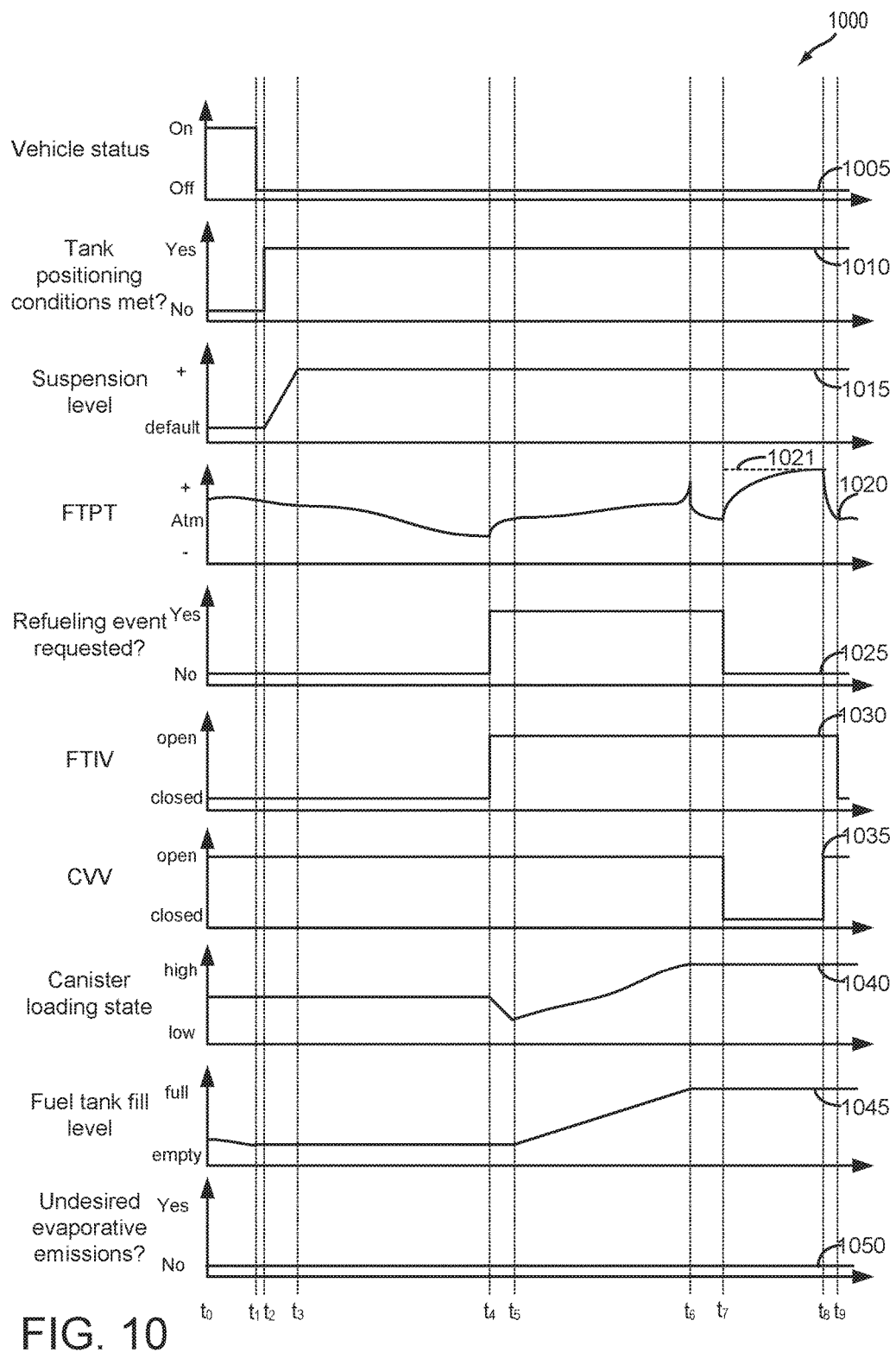
FIG. 10 shows an example timeline for conducting a remote refueling event.
Figure 15:
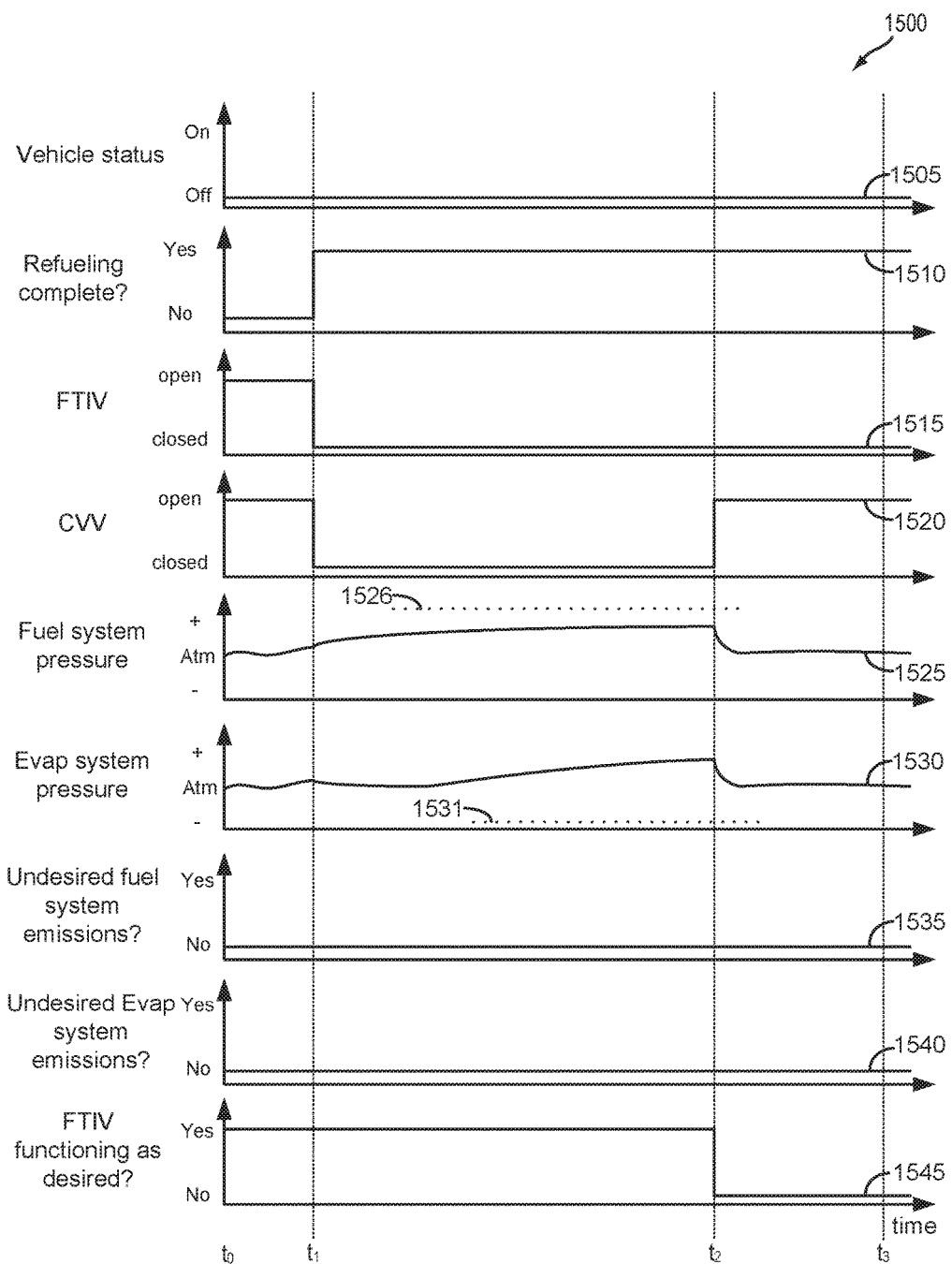
FIG. 15 shows an example timeline for conducting a fuel tank isolation valve diagnostic responsive to completion of a remote refueling event.

A remote refueling event is unique in that the vehicle being refueled is not typically driven immediately after the refueling event. As the addition of fuel to the tank may result in significant fuel vaporization, and an increase in fuel temperature, the completion of a remote refueling event presents an opportunity to conduct an evaporative emissions test diagnostic procedure, when the vehicle is not being driven. As such, responsive to an indication that a remote refueling event has been completed, a vehicle fuel system and evaporative emissions system may be sealed from atmosphere, and a pressure build (or pressure increase rate) in the fuel system and evaporative emissions system may be monitored in order to determine whether undesired evaporative emissions are present. Such a method is depicted in FIG. 9. A timeline for conducting a remote refueling event, is depicted in FIG. 10. Furthermore, in some examples wherein the fuel system is removably coupled to the evaporative emissions system via, for example, a fuel tank isolation valve, a separate evaporative emissions test diagnostic on each of the fuel system and the evaporative emissions system may be conducted, according to the method depicted in FIG. 11. An example timeline for conducting the simultaneous separate test on the fuel system and evaporative emissions system, is illustrated in FIG. 12. The method depicted in FIG. 11, and the corresponding timeline depicted in FIG. 12, rely on the fuel tank isolation valve functioning as desired. However, in some examples, the FTIV may not be functioning as desired. As such, the fuel tank isolation valve may be periodically diagnosed as to whether it is functioning as desired, according to the method depicted in FIG. 13. The results of the fuel tank isolation valve diagnostic may be interpreted via a look-up table, such as the look-up table illustrated in FIG. 14. An example timeline for conducting a fuel tank isolation valve diagnostic procedure is illustrated in FIG. 15.

FIG. 1 depicts a vehicle system 100 including an internal combustion engine 10 coupled to transmission 44. Engine 10 may be started with an engine starting system 54, including a starter motor. Transmission 44 may be a manual transmission, automatic transmission, or combinations thereof. Transmission 44 may include various components including but not limited to a torque converter, a final drive unit, a gear set having a plurality of gears, and so on. Transmission 44 is shown coupled to drive wheels 52, which may contact a road surface.

In one embodiment, vehicle system 100 may be a hybrid vehicle wherein transmission 44 may alternatively be driven by an electric motor 50. For example, the motor may be a battery-powered electric motor (as depicted) wherein electric motor 50 is powered by energy stored in battery 46. Other energy storage devices that may be used to power motor 50 include a capacitor, a flywheel, a pressure vessel, and so on. An energy conversion device, herein inverter 48, may be configured to convert the DC output of battery 46 into an AC output for use by electric motor 50. Electric motor 50 may also be operated in a regenerative mode, that is, as a generator, to absorb energy from vehicle motion and/or the engine and convert the absorbed energy to an energy form suitable for storage in battery 46. Furthermore, electric motor 50 may be operated as a motor or generator, as required, to augment or absorb torque during a transition of engine 10 between different combustion modes (e.g., during transitions between a spark ignition mode and a compression ignition mode).

When configured in the hybrid embodiment, vehicle system 100 may be operated in various modes wherein the vehicle is driven by only the engine, only the electric motor, or a combination thereof. Alternatively, assist or mild hybrid modes may also be employed, wherein the engine 10 is the primary source of torque, and the electric motor 50 selectively adds torque during specific conditions, such as during a tip-in event. For example, during an "engine-on" mode, engine 10 may be operated and used as the primary source of torque for powering wheels 52. During the "engine-on" mode, fuel may be supplied to engine 10 (combustion engine) from fuel system 20 including a fuel tank 21. The fuel tank may hold a plurality of fuels, such as gasoline, or fuel blends, such as a fuel with a range of alcohol (e.g., ethanol) concentrations including E10, E85, and so on, and combinations thereof. A fuel level sensor (not shown) located in fuel tank 21 may provide an indication of the fuel level ("Fuel Level Input") to controller 12. The fuel level sensor may comprise a float connected to a variable resistor. Alternatively, other types of fuel level sensors may be used.

A Fuel pump (not shown) is configured to pressurize fuel delivered to fuel injectors (not shown) of engine 10. For example, fuel injectors are provided for each cylinder. It will be appreciated that fuel system 20 may be a return-less fuel system, a return fuel system, or various other types of fuel system.

In another example, during an "engine-off" mode, electric motor 50 may be operated to power the wheels 52. The "engine-off" mode may be employed during braking, low speeds, while stopped at traffic lights, and so on. In still another example, during an "assist" mode, an alternate torque source may supplement and act in cooperation with the torque provided by engine 10.

Vehicle system 100 may further include control system 14. Control system 14 is shown receiving information from a plurality of sensors 16 and sending control signals to a plurality of actuators 81. The control system 14 may further include a controller 12. The controller 12 may receive input data from the various sensors 16 or buttons, process the input data, and trigger the actuators 81 in response to the processed input data based on instructions or code programmed therein corresponding to one or more routines. Example control routines are described herein with regard to FIGS. 3-9, and FIG. 13.

The control system 14 may be communicatively coupled to an off-board remote computing device 90 via a wireless network 13, which may comprise Wi-Fi, Bluetooth, a type of cellular service, a wireless data transfer protocol, and so on. The remote computing device 90 may comprise, for example, a processor 92 for executing instructions, a memory 94 for storing said instructions, a user interface 95 for enabling user input (e.g., a keyboard, a touch screen, a mouse, a microphone, a camera, etc.), and a display 96 for displaying graphical information. As such, the remote computing device 90 may comprise any suitable computing device, such as a personal computer (e.g., a desktop computer, a laptop, a tablet, etc.), a smart device (e.g., a smart phone, etc.), and so on. As described further herein and with regard to FIG. 2, the control system 14 may be configured to transmit information regarding status of the fuel system 20, as well as vehicle location information, to remote computing device 90, which may in turn display the information via display 96. As will be described in further detail in FIG. 2, such information may then be utilized to communicate with an outside service provider to coordinate remote fueling events.

Vehicle system 100 may also include an ambient temperature/humidity sensor 198, and sensors dedicated to indicating the occupancy-state of the vehicle, for example onboard cameras 105, seat load cells 107, and door sensing technology 108. In some examples, onboard cameras 105 may additionally include a capability of determining a ground composition, as will be discussed further below. Still further, in some examples vehicle system may be configured with infrared camera(s) 196 positioned on the vehicle system 100 such that an accurate estimation of ground temperature may be obtained, as discussed further below. Vehicle system 100 may also include inertial sensors 199. Inertial sensors 199 may comprise one or more of the following: longitudinal, latitudinal, vertical, yaw, roll, and pitch sensors. As one example, inertial sensors 199 may couple to the vehicle's restraint control module (RCM) (not shown), the RCM comprising a subsystem of control system 14. The control system may adjust engine output and/or the wheel brakes to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle. As will be described in further detail below, in one example, active suspension system 111 may be employed in order to raise a vehicle a determined amount while the vehicle is parked responsive to an indication of ambient temperature above a threshold and further responsive to an indication that the surface that the vehicle is parked on is above a threshold temperature. Such indications may be indicated via ambient temperature sensor/humidity sensor 198, onboard cameras 105, and IR camera(s) 196, for example. By raising the vehicle a determined amount, a distance between a vehicle fuel tank 21 and a hot ground surface may be maximized to facilitate air flow under the fuel tank and thus reduce potential for fuel vaporization under such conditions. Reducing the potential for fuel vaporization may thus reduce loading of a fuel vapor canister 122 while the vehicle is parked, and may thus reduce undesired evaporative emissions. Furthermore, in some examples, reducing the potential for fuel vaporization may maintain fuel tank pressure within a range such that environmentally friendly refueling events may be conducted, as discussed in detail below. For example, for fuel tanks that are typically sealed (e.g. PHEVs), by facilitating air flow under the fuel tank, conditions where a vacuum may be present in the fuel tank may be increased. As such, when the fuel tank is under vacuum, fuel vapors may be returned to the fuel tank via a "back-purge" of the canister to the fuel tank upon depressurization. In another example comprising a sealed fuel tank, facilitating air flow under the fuel tank may maintain the fuel tank at atmospheric pressure, such that the fuel vapor canister 122 is not loaded with vapors upon fuel tank depressurization. In some examples, such conditions may be coordinated with remote refueling events such that environmentally friendly refueling events are promoted, discussed in further detail below.

In some examples, fuel system 20 may include a fuel cap (not shown) for sealing off a fuel filler system 24 from the atmosphere. For example, fuel system 20 may be coupled to a fuel filler system via a fuel filler pipe or neck (not shown). Further, fuel system 20 may include a refueling lock 25. In some embodiments, the refueling lock may be a fuel cap locking mechanism. The fuel cap locking mechanism may be configured to automatically lock the fuel cap in a closed position so that the fuel cap cannot be opened. For example, the fuel cap may remain locked via the refueling lock 25 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, the refueling lock 25 may be a filler pipe valve located at a mouth of the fuel filler pipe. In such embodiments, the refueling lock may not prevent the removal of the fuel cap. Rather, the refueling lock may prevent the insertion of a refueling pump into the fuel filler pipe. The filler pipe valve may be electrically locked, for example by a solenoid, or mechanically locked, for example by a pressure diaphragm.

In some embodiments, the refueling lock 25 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where the refueling lock 25 is locked using an electrical mechanism, the refueling lock may be unlocked by commands from controller 12, for example, when a fuel tank pressure decreases below a pressure threshold. In another example, the refueling lock 25 may be unlocked by remote computing device 90 via communication between remote computing device 90 and controller 12. In still other examples, the refueling lock may be unlocked by a code entered into a keyless entry touchpad 22. For example, keyless entry touchpad 22 may be positioned on an external surface of a vehicle door, where one code may enable access to the vehicle cabin, and where another code may enable the vehicle refueling lock 25 to be opened. In some examples, described in further detail below, a code may enable the vehicle refueling lock to be opened while maintaining access to the vehicle cabin locked. In embodiments where the refueling lock 25 is locked using a mechanical mechanism, the refueling lock may be unlocked via a pressure gradient, for example, when a fuel tank pressure decreases to atmospheric pressure.

Vehicle system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites 23, and from the signal identify the geographical location of the vehicle. In some examples, the geographical location coordinates may be communicated to controller 12, and to remote computing device 90.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12) further illustrated in FIG. 2. As such, in some examples, the vehicle operator may communicate via display system 18 with an internet site or software application (app) in order to coordinate remote fuel delivery, as will be described in further detail below. For example, vehicle location and fuel system status may be communicated via display system 18, wherein such information may then be utilized via the internet to coordinate remote fuel delivery. In other examples, as discussed above, such information may be communicated by remote computing device 90. Furthermore, display system 18 may be utilized by the vehicle operator to manage/adjust various vehicle parameter settings.

Dashboard 19 may further include an operator ignition interface 15 via which the vehicle operator may adjust the ignition status of the vehicle engine 10. Specifically, the operator ignition interface 15 may be configured to initiate and/or terminate operation of the vehicle engine 10 based on an operator input. Various embodiments of the operator ignition interface 15 may include interfaces that require a physical apparatus, such as an active key, that may be inserted into the operator ignition interface 15 to start the engine 10 and turn on the vehicle, or may be removed to shut down the engine 10 and turn off the vehicle. Other embodiments may include a passive key that is communicatively coupled to the operator ignition interface 15. The passive key may be configured as an electronic key fob 104 or a smart key that does not have to be inserted or removed from the ignition interface 15 to operate the vehicle engine 10. Rather, the passive key may need to be located inside or proximate to the vehicle (e.g., within a threshold distance of the vehicle). For example, control system 12 may be in communication with a remote engine start receiver 195 (or transceiver) that receives wireless signals 106 from key fob 104 having a remote start button 105. Still other embodiments may additionally or optionally use a start/stop button that is manually pressed by the operator to start or shut down the engine 10 and turn the vehicle on or off. Based on the configuration of the operator ignition interface 15, a vehicle operator may provide an indication as to whether the engine 10 is in an engine-on or engine-off condition, and further whether the vehicle is in a vehicle-on or a vehicle-off condition. In other examples, a remote engine start may be initiated remote computing device 90, for example a cellular telephone, or smartphone-based system where a user's cellular telephone sends data to a server and the server communicates with the vehicle controller 12 to start the engine.

Controller 12 may also receive an indication of the ignition status of engine 10 from an ignition sensor (not shown) coupled to the operator ignition interface 15. Control system 14 may be configured to send control signals to the actuators 81 based on input received from the sensors and the vehicle operator. The various actuators may include, for example, cylinder fuel injectors, an air intake throttle coupled to the engine intake manifold, a spark plug, and so on.

Engine 10 is coupled to a fuel system 20, and evaporative emissions system (Evap) 119. Fuel system 20 includes fuel tank 21 coupled to a fuel pump (not shown), the fuel tank supplying fuel to an engine 10 which propels a vehicle. Evaporative emissions system 119 includes fuel vapor canister 122. Vapors generated in fuel tank 21 may be routed to fuel vapor canister 122, via conduit 131, before being purged to engine intake. As such, the evaporative emissions system 119 is coupled to fuel system 20, the evaporative emissions system 199 including a fuel vapor storage canister 122 for capturing and storing fuel tank vapors.

Fuel vapor canister 122 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 122 may be purged to engine intake by opening canister purge valve 161. While a single canister 122 is shown, it will be appreciated that evaporative emissions system 119 may include any number of canisters. In one example, canister purge valve 161 may be a solenoid valve wherein opening or closing of the valve is performed via actuation of a canister purge solenoid.

Canister 122 may include a buffer (not shown), each of the canister and the buffer comprising the adsorbent. The volume of the buffer may be smaller than (e.g., a fraction of) the volume of canister 122. The adsorbent in the buffer may be same as, or different from, the adsorbent in the canister (e.g., both may include charcoal). The buffer may be positioned within canister 122 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 132 may be coupled to and/or within canister 122. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Canister 122 includes a vent line 127 for routing gases out of the canister 122 to the atmosphere when storing, or trapping, fuel vapors from fuel tank 21. Vent line 127 may also allow fresh air to be drawn into fuel vapor canister 122 when purging stored fuel vapors to engine intake via purge line 128 and purge valve 161. While this example shows vent line 127 communicating with fresh, unheated air, various modifications may also be used. Vent line 127 may include a canister vent valve 132 to adjust a flow of air and vapors between canister 122 and the atmosphere. The canister vent valve 132 may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 132 may be a solenoid valve wherein opening or closing of the valve is performed via actuation of a canister vent solenoid. In particular, the canister vent valve may be in an open position that is closed upon actuation of the canister vent solenoid.

Vehicle system 100 may have reduced engine operation times due to the vehicle being powered by engine 10 during some conditions, and by the energy storage device under other conditions. While the reduced engine operation times reduce overall carbon emissions from the vehicle, they may also lead to insufficient purging of fuel vapors from the vehicle's emission control system. To address this, in one example a fuel tank isolation valve 115 may be optionally included in conduit 131 such that fuel tank 21 is coupled to canister 122 via the valve. During regular engine operation, isolation valve 115 may be kept closed to limit the amount of diurnal or "running loss" vapors directed to canister 222 from fuel tank 220. During refueling operations, isolation valve 115 may be temporarily opened, e.g., for a duration, to direct fuel vapors from the fuel tank 21 to canister 122. By opening the valve during refueling operations when the fuel tank pressure is higher than a threshold (e.g., above a mechanical pressure limit of the fuel tank), the refueling vapors may be released into the canister and the fuel tank pressure may be maintained below pressure limits. While the depicted example shows isolation valve 115 positioned along conduit 131, in alternate embodiments, the isolation valve may be mounted on fuel tank 21. Furthermore, as will be discussed in more detail below, in other examples a fuel tank isolation valve may not be included in the vehicle.

One or more pressure sensors 117 may be coupled to fuel system 20 for providing an estimate of a fuel system (and in some examples evaporative emissions system) pressure. In one example, the fuel system pressure, and in some examples evaporative emissions system pressure as well, is indicated by pressure sensor 117, where pressure sensor 117 is a fuel tank pressure transducer (FTPT) coupled to fuel tank 21. In alternate embodiments, the pressure sensor 117 may be coupled between the fuel tank and canister 122, for example between the fuel tank and isolation valve 115 (if included). In still other embodiments comprising a fuel tank isolation valve, one pressure sensor 118 may be positioned upstream of the isolation valve (between the isolation valve and the canister, or between the canister and a canister vent valve 132), while another pressure sensor (e.g. 117) may be positioned downstream of the isolation valve (between the isolation valve and the fuel tank), to provide an estimate of pressure in both the evaporative emissions system 119 and the fuel system 20, under conditions where the fuel tank isolation valve 115 is closed. In some examples, a vehicle control system may infer and indicate undesired evaporative emissions based on changes in a fuel tank (and evaporative emissions system) pressure during an evaporative emissions diagnostic routine, as described in further detail below.

One or more temperature sensors 124 may also be coupled to fuel system 20 for providing an estimate of a fuel system temperature. In one example, the fuel system temperature is a fuel tank temperature, wherein temperature sensor 124 is a fuel tank temperature sensor coupled to fuel tank 21 for estimating a fuel tank temperature. In alternate embodiments, the temperature sensor may be coupled between the fuel tank and canister 122, for example.

Fuel vapors released from canister 122, for example during a purging operation, may be directed into engine intake via purge line 128. The flow of vapors along purge line 128 may be regulated by canister purge valve 161, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system (evaporative emissions control system) from the engine intake. An optional canister check valve (not shown) may be included in purge line 128 to prevent intake manifold pressure from flowing gases in the opposite direction of the purge flow. As such, the check valve may be necessary if the canister purge valve control is not accurately timed or the canister purge valve itself can be forced open by a high intake manifold pressure.

Fuel system 20 and evaporative emissions system 119 may be operated by controller 12 in a plurality of modes by selective adjustment of the various valves and solenoids. For example, the fuel system and evaporative emissions system may be operated in a fuel vapor storage mode (e.g., during a fuel tank refueling operation and with the engine not running), wherein the controller 12 may open isolation valve 115 (if included) and canister vent valve 132 while closing canister purge valve (CPV) 161 to direct refueling vapors into canister 122 while preventing fuel vapors from being directed into engine intake.

As another example, the fuel system and evaporative emissions system may be operated in a refueling mode (e.g., when fuel tank refueling is requested by a vehicle operator), wherein the controller 12 may open isolation valve 115 (if included) and canister vent valve 132, while maintaining canister purge valve 161 closed, to depressurize the fuel tank before enabling fuel to be added therein. As such, isolation valve 115 (if included) may be kept open during the refueling operation to allow refueling vapors to be stored in the canister. After refueling is completed, the isolation valve (if included) may be closed.

As yet another example, the fuel system and evaporative emissions system may be operated in a canister purging mode (e.g., after an emission control device light-off temperature has been attained and with the engine running), wherein the controller 12 may open canister purge valve 161 and canister vent valve 132 while closing isolation valve 115 (if included). However, under some conditions isolation valve 115 may additionally be opened in order to purge fuel tank vapors to engine intake as well. Herein, the vacuum generated by the operating engine may be used to draw fresh air through vent line 127 and through fuel vapor canister 122 to purge the stored fuel vapors to engine intake. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 122 (e.g., downstream of the canister), or positioned in engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

As discussed above, control system 14 is shown receiving information from a plurality of sensors 16 (various examples of which are described herein) and sending control signals to a plurality of actuators 81 (various examples of which are described herein). As one example, sensors 16 may include fuel tank pressure sensor 117, and temperature sensor 124. Other sensors such as additional pressure, temperature, air/fuel ratio, and composition sensors may be coupled to various locations in the vehicle system 100. As another example, the actuators may include fuel injectors (not shown), isolation valve 115 (if included), canister purge valve 161, canister vent valve 132, fuel pump (not shown), and throttle (not shown).

As discussed above, control system 14 may further receive information regarding the location of the vehicle from an on-board global positioning system (GPS). Information received from the GPS may include vehicle speed, vehicle altitude, vehicle position/location, etc. This information may be used to infer engine operating parameters, such as local barometric pressure. Control system 14 may further be configured to receive information via the internet or other communication networks. Information received from the GPS may be cross-referenced to information available via the internet to determine local weather conditions, local vehicle regulations, etc. Control system 14 may use the internet to obtain updated software modules which may be stored in non-transitory memory.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines. Example control routines are described herein with regard to FIG. 3, FIGS. 4A-4B, FIGS. 5A-5B, FIGS. 6-9, FIG. 11, and FIG. 13.

Controller 12 may also be configured to intermittently perform evaporative emissions detection routines on fuel system 20 and evaporative emissions system 119 to confirm the presence or absence of undesired evaporative emissions from the fuel system and/or evaporative emissions control system. As such, various diagnostic evaporative emissions detection tests may be performed while the engine is off (engine-off evaporative emissions test) or while the engine is running (engine-on evaporative emissions test). Evaporative emissions tests performed while the engine is running may include applying a negative pressure on the fuel system and evaporative emissions system for a duration (e.g., until a target vacuum is reached) and then sealing the fuel system and evaporative emissions system while monitoring a change in pressure (e.g., a rate of change in the vacuum level, or a final pressure value). Evaporative emissions tests performed while the engine is not running may include sealing the fuel system and evaporative emissions system following engine shut-off and monitoring a change in pressure. This type of evaporative emissions test is referred to herein as an engine-off natural vacuum test (EONV). In sealing the fuel system and evaporative emissions system following engine shut-off, pressure in such a fuel system and evaporative emissions control system will increase if the tank is heated further (e.g., from hot exhaust or a hot parking surface) as liquid fuel vaporizes. If the pressure rise meets or exceeds a predetermined threshold, it may be indicated that the fuel system and the evaporative emissions control system are free from undesired evaporative emissions. Alternatively, if during the pressure rise portion of the test the pressure curve reaches a zero-slope prior to reaching the threshold, as fuel in the fuel tank cools, a vacuum is generated in the fuel system and evaporative emissions system as fuel vapors condense to liquid fuel. Vacuum generation may monitored and undesired emissions identified based on expected vacuum development or expected rates of vacuum development. The EONV test may be monitored for a period of time based on available battery charge.

Another engine-off evaporative emissions test diagnostic may be conducted responsive to the completion of a remote refueling event, as will be discussed in more detail below. Because it is likely that a remote refueling event will be followed by a duration where the vehicle that has been refueled is not driven, such an event presents an opportunity to conduct an evaporative emissions test diagnostic upon completion of the remote refueling event. During fueling, fuel in the fuel tank may rise, and agitation of the fuel may result in increased vaporization. As such, if the fuel system and evaporative emissions system are subsequently sealed, then a pressure build may be monitored to indicate the presence or absence of undesired evaporative emissions, as will be discussed below.

Figure 2:
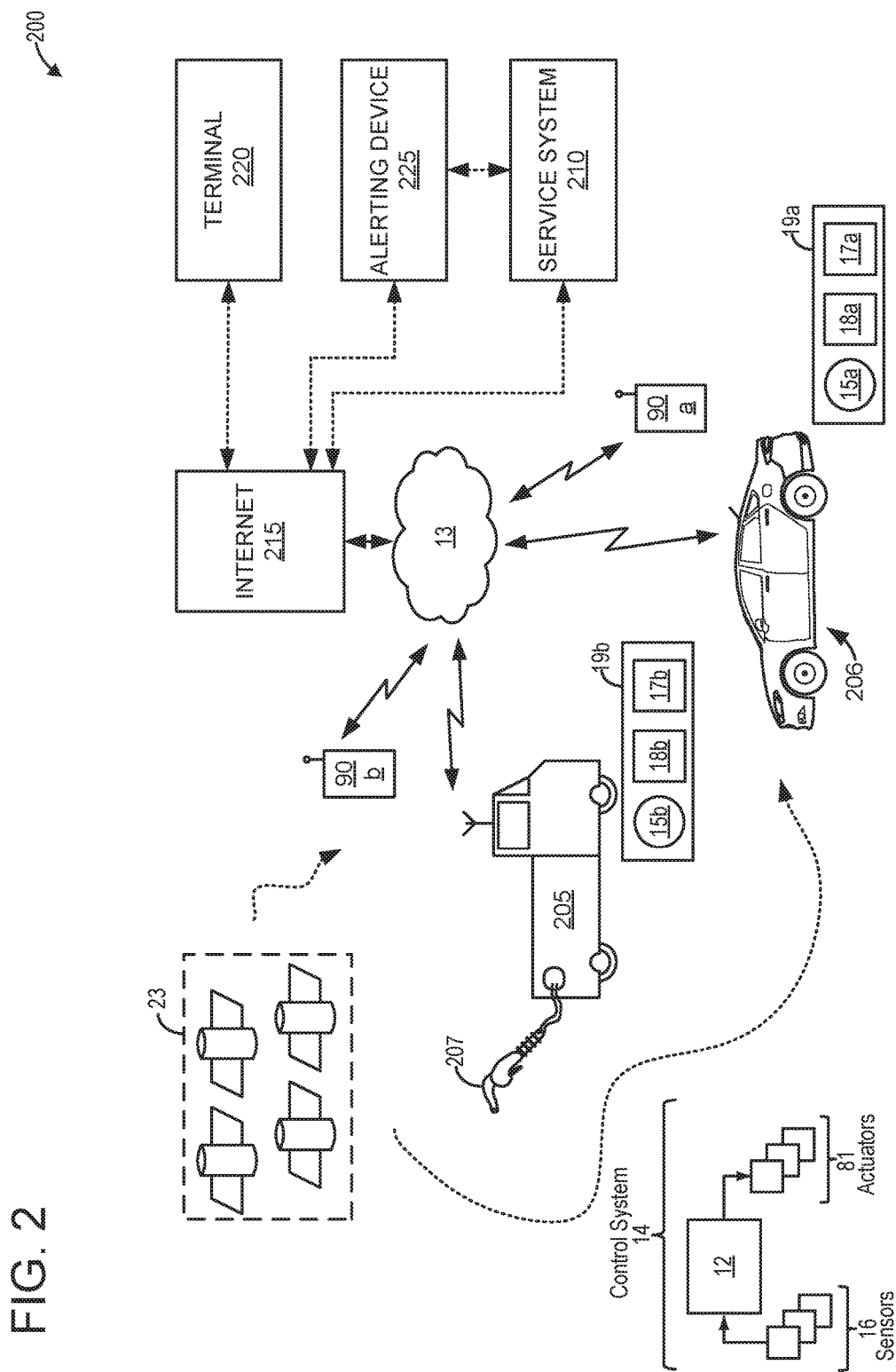
FIG. 2 shows a high-level block diagram for a fuel delivery system.

Turning now to FIG. 2, an example remote fuel delivery system 200 is shown. The system includes one or more fuel delivery vehicles 205. Each fuel delivery vehicle 205 is capable of transporting and dispensing fuel on demand to one or more passenger vehicles 206. Fuel may be dispensed from fuel delivery vehicle 205 to passenger vehicle 206 via fuel dispenser 207. As such, fuel dispenser 207 may comprise any type of dispenser device known in the art. For example, in one embodiment, fuel dispenser 207 may automatically shut off responsive to an increase in fuel tank pressure, where the increase in fuel tank pressure occurs as the result of increasing fuel level closing a fill limit vent valve in the fuel tank when the tank is filled to capacity. In other embodiments, fuel dispenser 207 may deliver any desired amount of fuel, as will be discussed in detail below. As described above, each passenger vehicle 206 may include dashboard 19a, comprising an on-board navigation system 17a (e.g. GPS) receiving information from GPS satellites 23, a display system 18a, and operator ignition interface 15a. Similarly, each fuel delivery vehicle 205 may too include dashboard 19b comprising on-board navigation system 17b (e.g. GPS), a display system 18b, and operator ignition interface 15b. While not explicitly shown, it may be understood that both fuel delivery vehicle(s) 205 and passenger vehicle(s) 206 include a control system (e.g. 14), as discussed in detail above with regard to FIG. 1. As such, geographical location coordinates obtained via onboard navigation system(s) (e.g. 17a, 17b) may be communicated to controller(s) (e.g. 12), and to remote computing device(s) (e.g. 90a, 90b). For example, the control system for each vehicle may be communicatively coupled to remote computing device(s) (e.g. 90a, 90b) via wireless network 13, which may comprise Wi-Fi, Bluetooth, cellular service, wireless data transfer protocol, etc. While not explicitly shown remote computing device(s) may comprise a processor, memory, a user interface, and a display, as discussed above with regard to FIG. 1. The control system in each vehicle may be configured to transmit vehicle information (e.g. fuel system status, location information) to remote computing device(s) (e.g. 90a, 90b). In other examples, remote computing device(s) (e.g. 90a, 90b) may additionally or alternatively be configured with GPS technology, enabling accurate indication of the position of remote device(s) via signals received from GPS satellites 23.

The controller(s) (e.g. 12) in each of fuel delivery vehicle(s) 205 and passenger vehicle(s) 206 may be configured to transmit vehicle system data and vehicle location data via wireless network 13 and the internet 215 to a service system 210. In one example, passenger vehicle(s) may be configured to automatically transmit vehicle system data and vehicle location data to either service system and/or remote device (e.g. 90a) via wireless network 13 and the internet. In another example, display system(s) (18a, 18b) may be utilized for communicating vehicle system data and vehicle location data via wireless network 13 and the internet 215 to service system 210. Similarly, in some examples remote computing device(s) (e.g. 90*a*, 90*b*) may additionally or alternatively be used to transmit vehicle system data and vehicle location data via wireless network 13 and the internet 215 to service center 210. Service system 210 may thus receive and collect data from passenger vehicle(s) 206 and from fuel delivery vehicle(s) 205, where the data is subsequently made available to a user(s) of a terminal(s) 220. For example, terminal(s) 220 may comprise a computer(s) that connects via the internet 215 to a web site or application associated with service center 210. The user(s) of terminal(s) 220 may view and organize incoming data from fuel delivery vehicle(s) 205 and passenger vehicle(s) 206, and communicate further information back to the operators of fuel delivery vehicle(s) 205 and passenger vehicle(s) 206 via the internet 215 and wireless network 13, as discussed in further detail below. However, in other examples, the web site or software application associated with service system 210 may be fully automated to respond to data provided from the operators of passenger vehicle(s) and fuel delivery vehicle(s), and to generate output that may be communicated back to the operators of the fuel deliver vehicles and passenger vehicles, without input from a user(s) of a terminal(s) (e.g. 220) associated with service system 210, as discussed in detail further below. In either example, whether the web site or application associated with service system 210 is fully automated or whether user input via terminal(s) (e.g. 220) is utilized, service system 210 may activate an alerting device 225 that may be communicated to the passenger vehicle operator and/or fuel delivery vehicle via remote computing device(s) (e.g. 90*a*, 90*b*), or via display system(s) (e.g. 18*a*, 18*b*). Alerting device 225 may in some examples comprise an alert to the fuel delivery driver and/or the passenger vehicle operator that the fuel delivery vehicle is within a range of the passenger vehicle to be refueled. Alerting device 225 may in other examples additionally or alternatively comprise an alert to the fuel delivery driver and/or the vehicle operator that the fuel delivery vehicle is located at the location of the passenger vehicle to be refueled, for example the alert may be initiated responsive to GPS coordinates for the fuel delivery vehicle 205 matching (or nearly matching) the passenger vehicle 206 GPS coordinates. In still other examples, alerting device 225 may comprise an estimated time of arrival or a scheduled arrival time, and may be communicated to the fuel delivery driver and/or the passenger vehicle operator. In further examples, alerting device may additionally include an alert to the passenger vehicle operator to take an action, for example to unlock a fuel door on the passenger vehicle 206 either remotely, via the use of a key fob (e.g. 104) or remote computing device (e.g. 90*a*), or manually. In still other examples, alerting device 225 may include automatically opening a fuel door on passenger vehicle 206 responsive to fuel delivery vehicle 205 arriving at the passenger vehicle 206. Still other examples will be further elaborated below. Such an alerting device may comprise an email, text message, or recorded voice message, an indication on the downloaded application (app) for example, and may be sent to one or more of remote computing device(s) (e.g. 90*a*, 90*b*), and/or vehicle display system(s) (e.g. 18*a*, 18*b*).

In some examples, the application (app) may be downloaded from the internet to the controller(s) of passenger vehicle(s) 206 and fuel delivery vehicle(s) 205, and may be displayed, for example via vehicle display system(s) (e.g. 18*a*, 18*b*). In other examples, the app may additionally or alternatively be downloaded from the internet to remote computing device(s) (e.g. 90*a*, 90*b*). The app may enable a vehicle operator of a passenger vehicle (e.g. 206) to request a fuel delivery truck (e.g. 205) to travel to the site of the passenger vehicle in order to remotely dispense fuel to the passenger vehicle. As such, embodiments described herein are focused on details of said app, which provides an interactive environment for enabling a user to request a fuel delivery service using a computing device.

Figure 3:
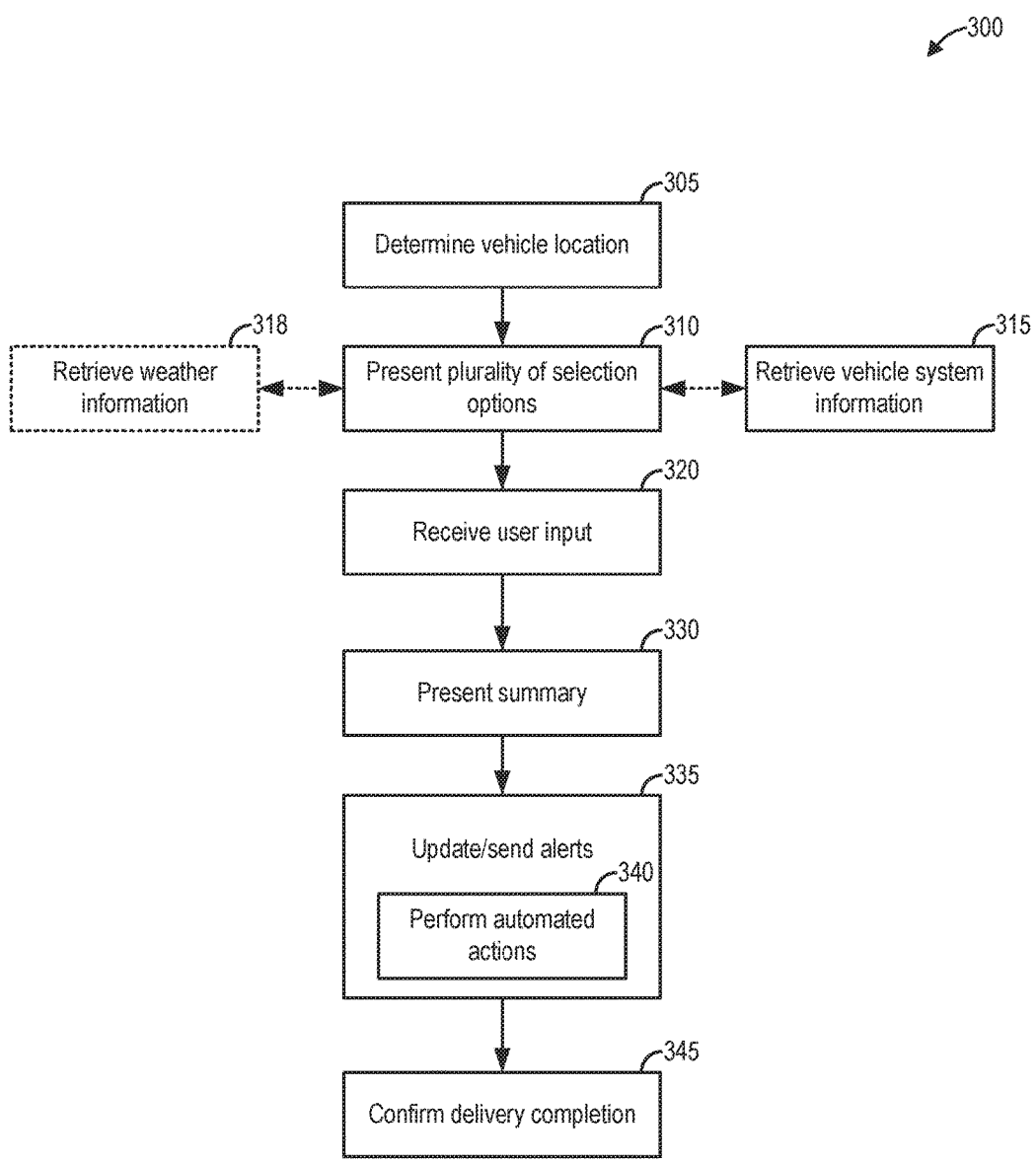
FIG. 3 shows a flowchart for a high-level example method for a software application for coordinating a passenger vehicle remote fueling event.
Figure 4A:
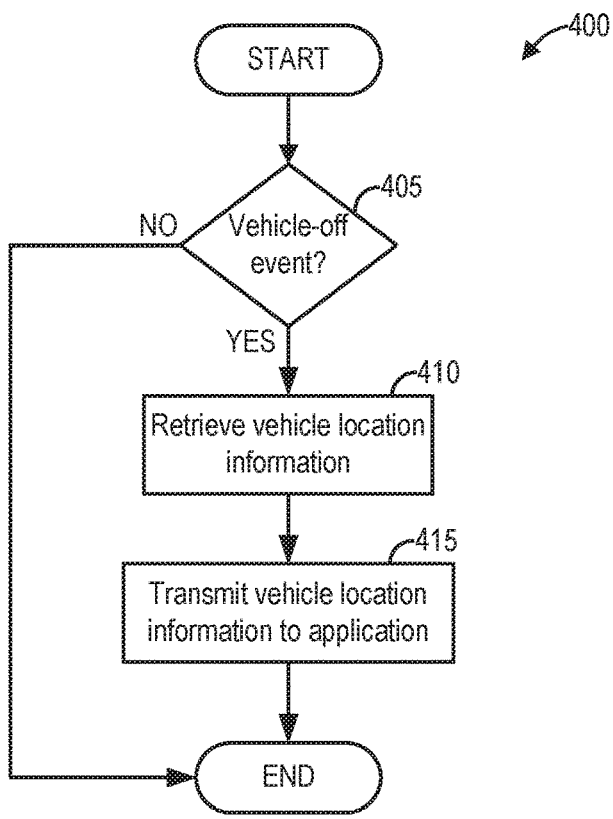
FIG. 4A shows a flowchart for a high-level example method for transmitting vehicle location information to a software application.
Figure 4B:
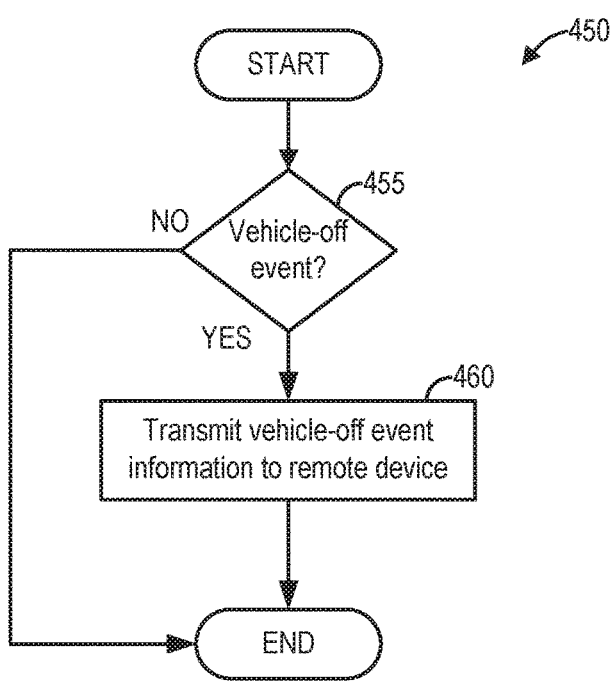
FIG. 4B shows a flowchart for a high-level example method for transmitting vehicle-off event information to a remote computing device.

Turning now to FIG. 3, a flow chart for a high-level example method 300 comprising an on-demand service user interface on a computing device, is shown. More specifically, method 300 may comprise a software application (app) for enabling a vehicle operator (e.g. a user) to request an on-demand fuel delivery vehicle to deliver fuel remotely to one or more vehicles via a computing device comprising, for example, remote computing device (e.g. 90), or a display system (e.g. 18) in the vehicle. Such an application may be enabled to retrieve information regarding the status of various vehicle systems, for example fuel level in a fuel tank of the vehicle, fuel tank pressure, fuel tank temperature, fuel vapor canister load, refueling lock status, etc. Such an application may be further enabled to retrieve external information such as current and future weather and ambient temperature information. In some examples, external information such as current and future weather and ambient temperature information may additionally or alternatively be retrieved via a vehicle controller, and transmitted to the application. Furthermore, based on information provided to the app via one or more user(s) and/or information regarding the status of various vehicle systems, vehicle settings may be correspondingly adjusted. In this way, an interactive app on a computing device may be utilized to request remote fuel delivery, where fuel delivery may be coordinated with the status of relevant vehicle systems, as described in detail below. Method 300 will be described with reference to the systems described herein and shown in FIGS. 1-2, though it should be understood that similar methods may be applied to other systems without departing from the scope of this disclosure. Parts of method 300 may be carried out by a controller, such as controller 12 in FIGS. 1-2, based on input to the app. Parts of method 300 that are carried out by the controller may be stored at the controller as executable instructions in non-transitory memory, where such parts of method 300 are enabled based on user input to the app. Parts of method 300 carried out by the controller include instructions that are executed by the controller based on instructions stored on a memory of the controller and in conjunction with signals received from sensors of the various vehicle systems, such as sensors described above with reference to FIG. 1. Based on user input to the app, the controller may employ engine, fuel system, and evaporative emissions system actuators such as fuel tank isolation valve (e.g. 115), canister purge valve (e.g. 161), canister vent valve (e.g. 132), active suspension system (e.g. 111), etc., according to the method below.

Method 300 begins at 305 and may include determining the current vehicle location. In one example, the app may automatically determine the current location of the vehicle. For example, the app may be configured to automatically retrieve GPS coordinates of the vehicle via a vehicle on-board navigation system (e.g. 17). In one example, GPS coordinates may be automatically uploaded to the app responsive to a vehicle-off event, such that any time the vehicle enters into a vehicle-off state, the app stores the GPS coordinates of the vehicle until a subsequent vehicle-on event. In some examples, the vehicle controller may automatically communicate vehicle location information to the app, according to the method depicted in FIG. 4A. In some examples, a vehicle may not be configured with an on-board navigation system (e.g. 17). In such an example, a remote computing device (e.g. 90) may be configured with GPS technology, enabling accurate indication of the position of the remote computing device. As such, GPS coordinates comprising the remote computing device may be automatically uploaded to the app responsive to an indication of a vehicle-off event, where the remote computing device is configured to communicate with the control system (e.g. 14) of the vehicle and with the app. For example, the vehicle controller may automatically communicate a vehicle-off event to a remote computing device, according to the method depicted in FIG. 4B. In such an example, by automatically updating the app responsive to a vehicle-off event, where the GPS coordinates are based on the location of the remote computing device, the vehicle position information may be obtained as at the time of the vehicle-off event it may be likely that remote computing device (e.g. 90) is positioned with the user in the vehicle.

In other examples, vehicle location information may be entered manually into the app by the user. Such an example may include an option to search and select a particular location, where such locations may be based on previous history of remote-refueling events, for example. Other examples may comprise the user entering into the app a physical address where the vehicle is located, from which GPS coordinates may be obtained via the app. For example, in a case where the vehicle does not comprise an on-board navigation system and where remote computing device (e.g. 90) is configured with the app to automatically update GPS information based on the position of remote computing device, if remote computing device is not positioned within the vehicle at the time of a vehicle-off event, correct vehicle location information may need to be entered manually. Still other examples may comprise a condition where remote computing device includes a desktop computer or laptop, which may not typically be present in the vehicle at a vehicle-off event, and where the vehicle is further not equipped with an on-board navigation system. In such an example condition, vehicle location may be entered manually into the app as discussed above.

Figure 5A:
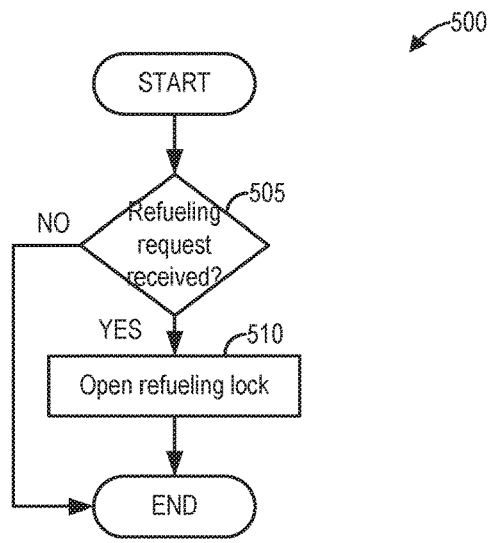
FIG. 5A shows a flowchart for a high-level example method for opening a refueling lock responsive to a request for refueling in a vehicle without a sealed fuel tank.
Figure 5B:
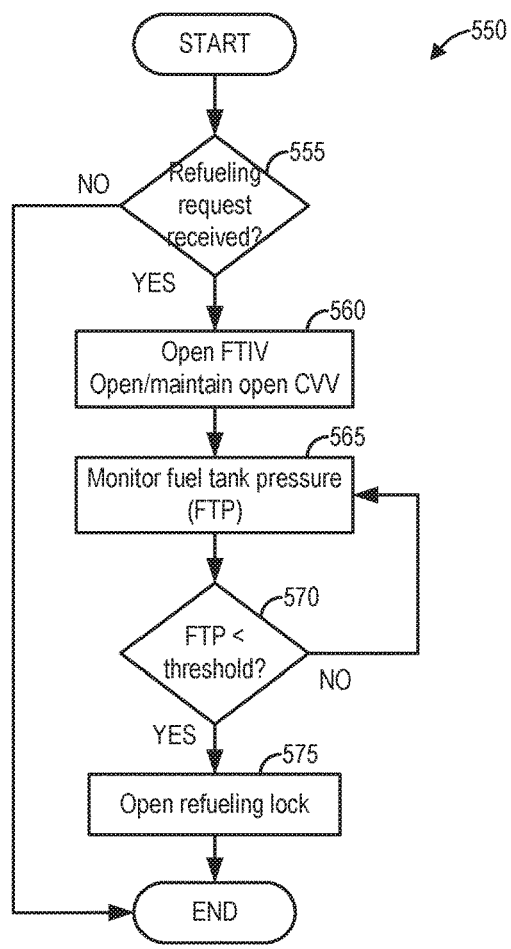
FIG. 5B shows a flowchart for a high-level example method for depressurizing a sealed fuel tank prior to enabling a refueling event, responsive to a request for refueling.

Based on the vehicle location information, method 300 may proceed to 310 where a plurality of selection options may be presented on a display, for example on remote computing device (e.g. 90) or display system (e.g. 18). For example, the selection options may enable a user to select various options and criteria for remote fuel delivery. One example may include a selection option for entering in vehicle characteristics such as make, model, vehicle color, license plate number, etc., such that the vehicle can be readily identified by the fuel delivery truck operator. Another selection option may include an option for indicating a preferred time for which the vehicle may be refueled. Such an option may further include the option to specify windows of time for delivery, for example between a time A and a time B. In some examples, selection options may include the possibility of choosing an environmentally friendly refueling event, discussed above and which will be discussed in further detail below. Another selection option may include an option for selecting a preferred fuel type. For example various selection options for gasoline, or other fuel blends may be presented. Another selection option may include an option to enter in payment information. Such an example option may comprise entering in credit or debit information such that payments may be automatically made responsive to completion of the remote refueling event. Another selection option may include entering in fuel door status information. For example, various selection options may enable the user to indicate whether the fuel door will be left unlocked, or whether the fuel door will be unlocked by the user either remotely or manually responsive to the fuel delivery truck arriving on site, as depicted in FIGS. 5A-5B. Further selection options relating to fuel door status information may include whether the fuel door will be unlocked automatically responsive to the fuel delivery truck arriving on site, or whether a code for a keyless entry touchpad (e.g. 22) may be provided to the fuel delivery truck driver such that responsive to the fuel delivery truck arriving on site, the fuel delivery truck operator may manually open the fuel door by entering in the provided code on the vehicle touchpad. As discussed above, in some examples the code provided to the fuel delivery operator may comprise a code that enables the fuel door to be unlocked without unlocking the door(s) to the main vehicle cabin.

In some examples, selection options at 310 may be further based on vehicle system information retrieved from the vehicle via communication between the vehicle controller (e.g. 12) and remote computing device (e.g. 90) and/or display system (e.g. 18), and made available to the user via the app at 315. In one example a fuel level status may be communicated to the app by the vehicle controller, wherein a selection option may include an ability of the user to select a specific amount of fuel to be added to the tank, or an option to fill the fuel tank to capacity, based on the indicated level of fuel in the tank. In other examples a selection option may allow for a specified monetary amount of fuel to be added to the tank (e.g. 20 dollars' worth of fuel). In such an example, the app may indicate a maximum dollar amount that can be added to the tank based on the indicated level of fuel in the tank, where the user may enter a specified monetary amount equal to or less than the maximum dollar amount indicated.

Figure 6:
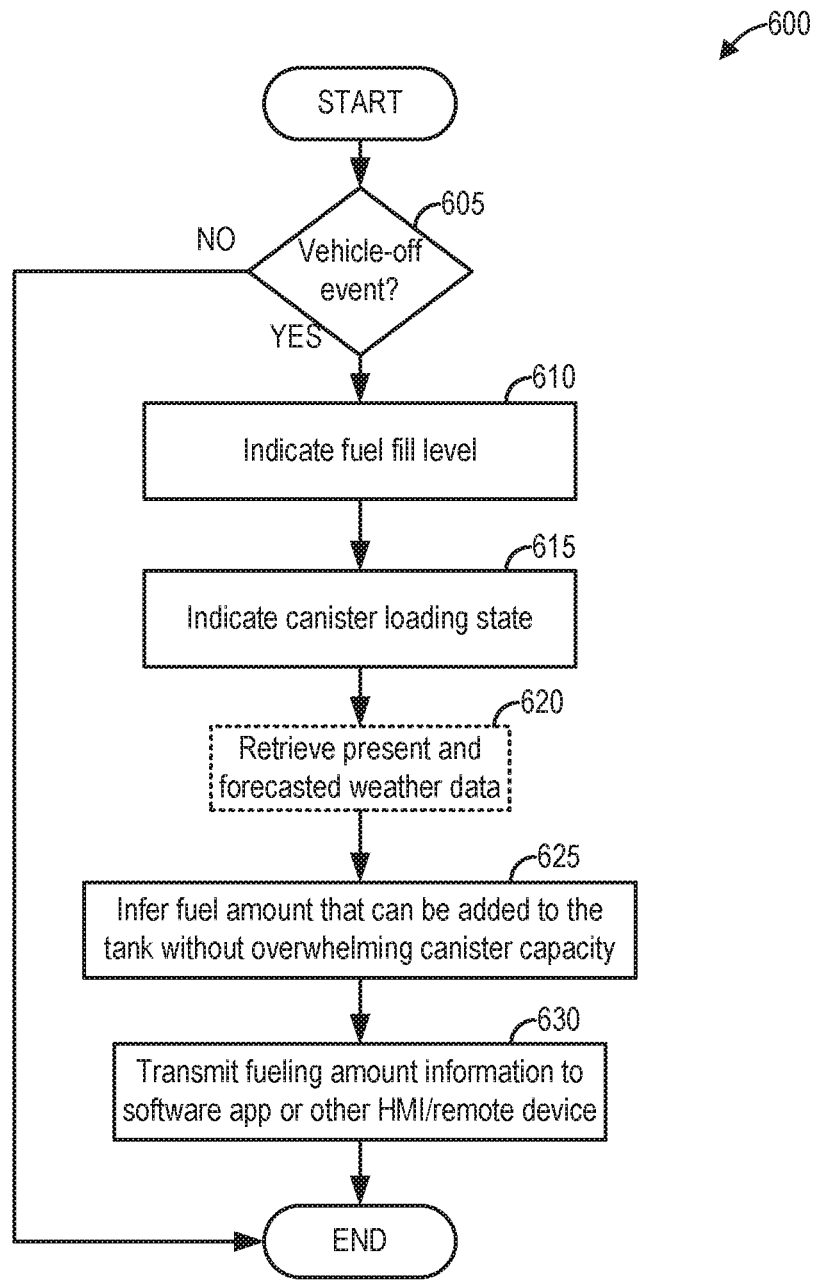
FIG. 6 shows a flowchart for a high-level example method for estimating an amount of fuel that may be added to a fuel tank without overwhelming a capacity of a fuel vapor canister, where the fuel tank is not sealed.

Another example where selection options at 310 may be based on vehicle system information 315 may comprise an indication of a fuel vapor canister loading state. For example, as discussed above, certain vehicles (e.g. hybrids, vehicles with limited engine run time) may have limited opportunities for purging fuel vapors from a fuel vapor canister (e.g. 122), and as such there may be certain times where refueling is more desirable (e.g. environmentally friendly) than others so that undesired emissions are not inadvertently released to the atmosphere. Accordingly, the fuel vapor canister loading state may be communicated to the app by the vehicle controller and the user may make a selection based on fuel vapor canister loading state. For example, the canister loading state and fuel tank fill level may be communicated to the app by the controller, and based on the loading state and fuel fill level, a calculated amount of fuel that can be added to the fuel tank without overwhelming the fuel vapor canister storage capacity may be indicated. In some examples, the app may calculate the amount of fuel that can be added to the tank based on the loading state and fuel level. In other examples, the vehicle controller may calculate the amount of fuel that can be added to the fuel tank without overwhelming the fuel vapor canister storage capacity, where the calculation may similarly be based on fuel tank fill level and canister loading state, and the calculated amount may be communicated to the application, as depicted in FIG. 6. As such, the user may be enabled to select whether to fill the fuel tank with the calculated amount of fuel based on canister loading capacity, or whether to fill the fuel tank with a greater or lesser amount. In some examples, the user may be prevented from entering in an amount of fuel greater than the calculated amount, so that undesired emissions are reduced.

As described above, some vehicles (e.g. PHEVs) have fuel tanks which are sealed except for refueling operations, and as such, the fuel tank is typically under either positive pressure or negative pressure. Such fuel tanks may be depressurized prior to enabling refueling; for example a refueling lock (e.g. 25) may only be opened responsive to an indication that fuel tank pressure is below an absolute value pressure threshold. As discussed above, if the fuel tank is under positive pressure and the canister load is high, depressurization may overwhelm the canister such that undesired emissions may be introduced to atmosphere. In other examples, depressurization may not overwhelm the canister, but may load the canister such that a subsequent refueling event may overwhelm the canister. Alternatively, a fuel tank under negative pressure may represent an ideal condition for initiating a refueling event, as depressurization of a fuel tank under negative pressure may draw atmospheric air across the fuel vapor canister, thus "back-purging" fuel vapors to the fuel tank. In such an example, the canister is at least partially cleaned during fuel tank depressurization, and thus the potential for undesired emissions is reduced both during fuel tank depressurization and subsequent refueling. Accordingly, if the vehicle comprises a sealed fuel tank, selection options at 310 may be based on fuel tank pressure, fuel tank temperature, and canister loading state, each of which may be communicated to the app via the vehicle controller at 315. For example, the app may present optimal times for a refueling event. In another example, the vehicle controller may calculate optimal times for a refueling event, similarly based on fuel tank pressure, fuel tank temperature, and canister loading state, as depicted in FIG. 7. In both examples, selection options for vehicles with sealed fuel tanks may be further based on weather information for example at 318, or retrieved via the controller at 315, and utilized in calculating optimal times for the refueling event. Weather information may include information such as current and future ambient temperature forecasts, as well rain, wind, snow, cold/warm fronts, etc., and may be uploaded to the vehicle controller and/or the app from the internet, for example. Accordingly, selection options at 310 may include an option to schedule the fuel delivery truck (e.g. 205) to arrive at the vehicle to be refueled (e.g. 206) during a time period where the fuel tank is predicted to be under vacuum. In another example, selection options at 310 may include an option to schedule the fuel delivery truck to arrive at the vehicle to be refueled at a time period where the fuel tank is predicted to be at or near atmospheric pressure so that the canister is not loaded with depressurization vapors.

In the case of a sealed fuel tank where the fuel tank may be depressurized prior to enabling a refueling event, either the passenger vehicle (e.g. 206) operator may initiate a request for refueling responsive to a fuel delivery vehicle (e.g. 205) arriving at the vehicle location, or another means must be enabled to allow the operator of the fuel delivery vehicle access to the fuel tank, discussed below with regard to FIG. 5B. As such, one selection option at 310 where the fuel tank comprises a sealed fuel tank may include an option for the passenger vehicle operator to initiate the refueling request responsive to the fuel delivery vehicle arriving on-site. For example, the passenger vehicle operator may select an option to initiate the refueling event remotely, by the use of a key fob (e.g. 104) or remote computing device (e.g. 90), or by manually entering the vehicle and initiating the refueling event, for example via display system (e.g. 18), or via a refueling button on the dash. In some examples, initiating the refueling event may be enabled through the app. For example, the user may select an option to initiate the refueling event via communicating with the vehicle controller via the app to initiate the refueling event. In one example, the user may select an option to automatically initiate the refueling event responsive to the fuel delivery truck arriving on-site. Such an automatic refueling event initiation may be commenced responsive to the app indicating that the GPS coordinates of the fuel delivery vehicle match the GPS coordinates of the passenger vehicle. In other examples, the driver of the fuel delivery vehicle may confirm arrival via the app, wherein the refueling event may be automatically initiated if such an option is selected. In still other examples, the driver of the fuel delivery vehicle may confirm arrival via the app, wherein the refueling event may be initiated by the passenger vehicle operator manually interacting with the app. With sealed fuel tanks, initiation of the refueling event may include commanding open a fuel tank isolation valve (e.g. 115) and commanding open or maintaining open a canister vent valve (e.g. 132), to depressurize the fuel tank. Responsive to an indication that absolute fuel tank pressure is below a predetermined threshold, a refueling lock (e.g. 25) may subsequently be commanded open, discussed below with regard to FIG. 5B.

In another example, in the case of a sealed fuel tank a passenger vehicle operator may select an option to provide a code for a vehicle keyless entry touchpad (e.g. 22), such that the fuel delivery truck operator may manually open the fuel door. Such a code may be provided via the app and may be retrievable by the fuel delivery operator via the app. In such an example, the code may be entered into the keyless entry touchpad, wherein upon entering the code the fuel tank may be depressurized prior to enabling opening of the refueling lock (e.g. 25). Accordingly, upon entering the provided code into the touchpad, fuel tank isolation valve (e.g. 115) may be commanded open, and canister vent valve (e.g. 132) may be commanded open or maintained open, such that the fuel tank may be depressurized below an absolute pressure threshold, whereupon the refueling lock may be commanded open.

In still another example, discussed above with regard to FIG. 1, certain vehicles may be equipped with an active suspension (e.g. 111), onboard camera(s) (e.g. 105), an ambient temperature/humidity sensor (e.g. 198), and infrared camera(s) (e.g. 196). Such a vehicle may be capable of indicating ambient temperature, ground surface temperature, and ground surface composition (e.g. asphalt, concrete, etc.), and if it is indicated that significant fuel vaporization may occur due to the parking conditions, the vehicle suspension may be raised such that the likelihood of fuel vaporization is reduced, described below with regard to FIG. 8. In some examples, such information may be communicated via the controller to the app at step 315, wherein selection options at 310 may be updated to include said information. In another example, such information may be used by the vehicle controller to calculate a predicted time for when the vehicle fuel tank may be at atmospheric pressure or at a negative pressure, discussed below with regard to FIG. 7, which may thus be communicated to the app via the controller at step 315.

Proceeding to 320, method 300 may include the app receiving all of the user input based on the selection options provided as discussed above with regard to step 310. The input provided by the passenger vehicle operator may be uploaded to the app and the information transmitted via a wireless network (e.g. 13) and the internet (e.g. 215) to a service system (e.g. 210). As discussed above, in some examples a service center may receive and collect data inputted into the app by the passenger vehicle operator, in addition to receiving data inputted into the app, either automatically or manually, by fuel delivery vehicle operator(s). In some examples, such data may be made available to user(s) of terminal(s) that connect to the internet and may enable said users of said terminals to interact with the data communicated to the app, which may include viewing, organizing, and updating the data. Further information (e.g. scheduling information, delivery route, etc.) may be communicated back to the fuel delivery vehicle(s) and user(s) of passenger vehicles(s) responsive to the data inputted into the app, as discussed in further detail below. While the discussion herein focuses on the app, it may be understood that such a service may comprise a stand-alone website which may function similarly to the app, without departing from the scope of this disclosure.

As discussed above, in some examples the app (or web site) associated with the service center may be fully automated to respond to data provided from the operators of passenger vehicles, in addition to the data provided by fuel delivery vehicles, and to generate output that may be communicated back to the operators of fuel delivery vehicles and passenger vehicles, without input from user(s) of terminal(s) (e.g. 220). For example, the app may include algorithms that enable the app to receive information regarding potential fuel delivery times and locations based on passenger vehicle operator(s) input, correlate such information with fuel delivery vehicle location and scheduling information, and to organize the sum of such information into an optimized delivery schedule. For example, such algorithms may include taking into account current and future (e.g. predicted, pattern-based) traffic information, delivery schedules already in place, optimal delivery times for environmentally friendly refueling events, etc. Such examples will be further discussed below.

Proceeding to 330, method 300 may include presenting a summary interface to the passenger vehicle operator indicating a summary of the options selected by said operator. For example, based on the input provided by the operator, summary interface may include such information as scheduled delivery time (including windows for scheduled delivery), fuel delivery vehicle tracking information options, location information for the remote fuel delivery, fuel type and amount to be added to the tank, payment amount and payment method. Summary screen may further include information as to whether the fuel door will be manually unlocked by the passenger vehicle operator, remotely unlocked by the passenger vehicle operator, automatically unlocked responsive to an indication that the fuel delivery vehicle is on-site, or whether the fuel door will be unlocked by the fuel delivery operator using an app-provided passcode for use with a keyless touch pad (e.g. 22). In some examples, summary screen may only contain essential information, such as passenger vehicle location and scheduled fuel delivery arrival time, for simplicity, and the other information discussed above may be accessed via a secondary summary screen, which the passenger vehicle operator can access if desired.

Responsive to a fuel delivery request being confirmed and a summary screen presented at 330, method 300 may proceed to 335. At 335, method 300 may include sending alerts to the passenger vehicle operator via the app. Alerts may be sent directly to the app, or in some examples a text message to a cellular phone, or an e mail may additionally or alternatively be sent to the passenger vehicle operator. In one example, an alert may be sent responsive to the fuel delivery vehicle coming within a predetermined range of the particular passenger vehicle to be refueled. For example, a circular area with a defined radius surrounding the passenger vehicle to be refueled may be indicated, where an alert may be sent responsive to the fuel delivery vehicle entering into the defined area. In another example, an alert may be sent responsive to the fuel delivery vehicle estimated to arrive within a certain time frame. For example, an alert may be sent indicating that the fuel delivery vehicle will arrive within a defined number of minutes, or within a range of minutes. In another example, an alert may additionally or alternatively be sent responsive to the fuel delivery vehicle arriving on-site (e.g. at the passenger vehicle location). Such alerts may be automatically generated or sent by the service system responsive to thresholds being met, such as when GPS on the fuel delivery vehicle indicates that the fuel delivery vehicle is within a radius of the passenger vehicle, or when it is indicated via GPS and in some examples in conjunction with traffic information, weather information, etc., that the fuel delivery vehicle is within a determined number of minutes to arrival at the passenger vehicle. In some examples, such an alert may include information requesting/reminding the vehicle operator to be present at the vehicle in order to manually grant access to the refueling door, or a request/reminder to remotely unlock the refueling door. In some examples, sending alerts at 335 may include alerting the passenger vehicle operator of a delayed arrival, where the delayed arrival may be based on malfunctioning equipment, traffic delays, weather-specific delays, etc. In the case of a delay, a plurality of options may be presented to the passenger vehicle operator, where the plurality of options may include the ability to confirm or deny an appointment for a later time, an ability to cancel the appointment, an ability to reschedule the appointment, etc. In other examples, sending alerts at 335 may include sending an alert that the fuel delivery vehicle has arrived on site.

In some examples, automated actions may be performed at 340 responsive to an indication that the fuel delivery service vehicle has arrived on site. For example, if the passenger vehicle user selected an option at 320 to have access to the fuel door automatically unlock responsive to the fuel delivery truck arriving on-site, then at 340 the app may automatically unlock the passenger vehicle fuel tank (e.g. refueling lock) via communication between the app and the vehicle controller. In some examples, the automatic unlocking of the refueling lock may be initiated responsive to GPS coordinates on the fuel delivery vehicle matching (or nearly matching) the GPS coordinates of the passenger vehicle, wherein the match may be indicated via the app and wherein the app may communicate with the vehicle controller to unlock the refueling door. In other examples, a fuel delivery truck operator may confirm, via the app, that the fuel delivery truck is located at the position of the passenger vehicle, at which point the app may communicate with the vehicle controller to command the passenger vehicle fuel door to open. In the example case of a sealed fuel tank that needs to be depressurized prior to initiation of refueling, depressurization of the fuel tank may be automatically initiated responsive to the fuel delivery vehicle arriving on site, where the on-site arrival may be indicated as discussed above. For example, the app may communicate with the vehicle controller to automatically command the fuel tank isolation valve (e.g. 115) to be opened, and may further include commanding open or maintaining open canister vent valve (e.g. 132). Pressure in the fuel tank (e.g. 21) may be monitored via fuel tank pressure sensors (e.g. 117), where responsive to an indicated fuel tank pressure below an absolute pressure threshold, refueling lock (e.g. 25) may be automatically commanded open.

As discussed, responsive to the fuel delivery truck arriving on site, in one example access to the fuel tank may be achieved via automatic unlocking (and in some cases automatic fuel tank depressurization), of the refueling lock via communication from the app to the vehicle controller. In other examples, the passenger vehicle operator may be instructed/alerted, either just prior to arrival or responsive to arrival of the fuel delivery truck on-site, to either remotely or manually unlock the refueling lock (and in some cases additionally initiate fuel tank depressurization). In still further examples, a code may be provided via the app to the fuel delivery truck operator, such that the code may be used by the fuel delivery truck operator to unlock (and in some cases initiate fuel tank depressurization) the refueling lock. Responsive to gaining access to the fuel door, the fuel delivery vehicle operator may initiate refueling of the vehicle according to the instructions entered into the app by the passenger vehicle operator. The app may be accessed by the fuel delivery operator in order to add the desired amount and type of fuel to the passenger vehicle fuel tank.

Proceeding to 345, responsive to completion of the remote refueling event, the app may be utilized to indicate the completion of the remote refueling event to the passenger vehicle operator. Furthermore, in some examples, an indication of completion of the refueling event may be sent to the service center such that it may be indicated that said specific remote refueling event has been completed. For example, as discussed above, in some examples service center may include terminal(s) that may be accessed by user(s) of said terminals in order to organize data from the fuel delivery vehicle(s) and passenger vehicle(s) to coordinate an optimized fuel delivery schedule. In other examples, as discussed above, the app (or associated web site) may be fully automated where algorithms may enable the app to receive information regarding the status of fuel delivery vehicle(s) and passenger vehicle(s), where such information is organized into an optimized fuel delivery schedule. Accordingly, by indicating completion of a particular remote refueling event, future scheduling events may be correspondingly updated.

In some examples, fuel delivery completion confirmation may be communicated automatically to the app, where the app is configured to communicate with the passenger vehicle controller. For example, responsive to the refueling lock being re-locked, the app may automatically be updated to indicate that the refueling event has been completed. In some examples, an automatic alert may subsequently be sent to the passenger vehicle operator, where the automatic alert may in some cases be directly through the app, or may additionally or alternatively be sent via a text message to a cell phone of the passenger vehicle operator, or via an e mail.

In still further examples the fuel delivery vehicle operator may input information directly into the app responsive to completion of the refueling event, wherein such information may then be communicated to the passenger vehicle operator. Again, such information may be conveyed directly via the app, or via text or e mail.

In some examples where the app is configured to communicate with the passenger vehicle controller, it may be indicated that the refueling lock was not locked subsequent to refueling in the following manner. For example, the app may determine that the fuel delivery truck is no longer at the site of the passenger vehicle based on indicated GPS coordinates of the passenger vehicle and fuel delivery truck. In one example, if the GPS coordinates indicate that the fuel delivery truck is a predetermined distance away from the passenger vehicle, wherein it is further indicated that the refueling lock has not been locked, an automatic alert may be sent to the passenger vehicle operator, and in some cases the fuel delivery operator as well. The automatic alert may thus provide an indication to the passenger vehicle operator and fuel delivery vehicle operator that the refueling lock has not been locked subsequent to completion of refueling, and may thus instruct either the passenger vehicle operator and/or the fuel delivery vehicle operator of the need to re-lock the refueling lock.

Responsive to completion of the refueling event, at 345 an indication may also be communicated to the app that payment for the service is being processed, or has been processed.

Turning now to FIG. 4A, a high level example method 400 for communicating vehicle location information to a software app, such as the app depicted above in FIG. 3, is shown. More specifically, method 400 includes, responsive to a key-off event indication, retrieving vehicle information from an onboard GPS device, and communicating/sending the vehicle location to the software application. Method 400 may be described with reference to the systems described herein and shown in FIG. 1 and FIG. 2, though it should be understood that similar methods may be applied to other systems without departing from the scope of this disclosure. Method 400 may be carried out by a controller, such as controller 12 in FIG. 1, and may be stored at the controller as executable instructions in non-transitory memory. Instructions for carrying out method 400 and the rest of the methods included herein may be executed by the controller based on instructions stored on a memory of the controller and in conjunction with signals received from sensors of the engine system, such as the sensors described above with reference to FIG. 1. The controller may employ fuel system and evaporative emissions system actuators, according to the method below.

Method 400 begins at 405 and may include indicating whether a vehicle-off event has occurred. A vehicle-off event may comprise a key-off event using an active key that can be inserted/removed from an ignition interface (e.g. 15), or a vehicle-off event via an electronic key fob (e.g. 104) or smart key which do not have to be inserted or removed from the ignition interface. In another example, the vehicle-off event may comprise a vehicle operator depressing a start/stop button to shut down the vehicle. If, at 405, a vehicle-off event is indicated, method 400 may proceed to 410. At 410, method 400 may include retrieving vehicle location information from an on-board navigation system (e.g. 17). Vehicle location information may include GPS coordinates corresponding to the vehicle location, for example. In another example, a physical address may be retrieved based on GPS coordinates. With the vehicle location information retrieved at 410 responsive to the vehicle-off event, method 400 may proceed to 415 and may include transmitting the vehicle location information to a software application, such as the software application depicted above in FIG. 3. For example, the vehicle controller may be configured to transmit/communicate the vehicle location information wirelessly via the internet to the software application, where the software application is associated with a service center (e.g. 210). As such, via method 400 a software application may be configured to communicate with the vehicle controller such that vehicle location date is automatically communicated to the software application responsive to a vehicle-off event. Such vehicle location information may thus be utilized in order to coordinate remote fuel delivery, as discussed above with regard to FIG. 3. However, not all vehicles may be equipped with on-board navigation systems. In such examples, it may still be desirable to communicate vehicle location information to the software application responsive to an indication of a vehicle-off event, as will be discussed further below with regard to FIG. 4B.

Turning now to FIG. 4B, a high-level example method 450 for communicating a vehicle-off event to a remote computing device (e.g. 90), is shown. More specifically, in vehicles that are not equipped with on-board navigation systems, a remote computing device may be configured to communicate with a controller (e.g. 12) of the vehicle, such that a vehicle-off indication may be automatically communicated to the remote computing device responsive to such an indication. In this way, if the remote computing device is configured with GPS or other location positioning systems, the location of the remote computing device may be automatically uploaded to a software application, such as the software application depicted above in FIG. 3. If the remote computing device comprises a smartphone or other device that the vehicle operator is likely to carry during vehicle operation, then vehicle location information may be communicated to the software application based on the location of the remote computing device at a vehicle-off event. Method 450 will be described with reference to the systems described herein and shown in FIG. 1 and FIG. 2, though it should be understood that similar methods may be applied to other systems without departing from the scope of this disclosure. Method 450 may be carried out by a controller, such as controller 12 in FIG. 1, and may be stored at the controller as executable instructions in non-transitory memory. Instructions for carrying out method 450 and the rest of the methods included herein may be executed by the controller based on instructions stored on a memory of the controller and in conjunction with signals received from sensors of the engine system, such as the sensors described above with reference to FIG. 1 and FIG. 2. The controller may employ fuel system and evaporative emissions system actuators, according to the method below.

Method 450 begins at 455 and may include indicating whether a vehicle-off event has occurred. As discussed above with regard to method 400 depicted in FIG. 4A, a vehicle-off event may comprise a key-off event using an active key or a passive key (e.g. key fob or smart key), or via manual depression of a start/stop button in the vehicle. If, at 455, a vehicle-off event is indicated, method 450 may proceed to 460. At 460, method 400 may include transmitting the vehicle-off event indication to a remote computing device (e.g. 90). For example, the vehicle controller may be communicatively coupled to the remote computing device via a wireless network (e.g. 13), which may comprise Wi-Fi, Bluetooth, a type of cellular service, a wireless data transfer protocol, etc. as discussed above. By automatically communicating the vehicle-off indication to the remote computing device, if the remote device is configured with a capability to indicate the location (e.g. GPS coordinates, physical address) of the remote device, vehicle location may be thus determined if the remote device is positioned within the vehicle at the time of the vehicle-off indication. Such information may be communicated to a software application, such as the software application depicted above in FIG. 3, such that remote refueling events may be coordinated.

As discussed above with regard to the method depicted in FIG. 3, in some examples a fuel door may be locked, and thus the fuel door may need to be unlocked prior to enabling a remote fuel delivery. In other examples, a vehicle may include a sealed fuel tank (e.g. PHEV's), that may need to be depressurized prior to enabling fuel to be added to the fuel tank. As such, a vehicle controller may receive a request for refueling, at which point a refueling lock may be commanded open, as depicted below in FIG. 5A. In another example, a vehicle controller may receive a request for refueling, at which point the fuel tank may be depressurized prior to enabling fuel to be added to the tank, as depicted below in FIG. 5B.

Turning now to FIG. 5A, a high-level example method 500 for opening a refueling lock responsive a request for refueling, is shown. More specifically, the request for refueling may pertain to a refueling event that comprises a remote fuel delivery event, and as such the request may comprise a software application communicating with a vehicle controller, for example, or other means of communicating a refueling request, as will be discussed below. In this way, the opening of a refueling lock may be coordinated with a remote fuel delivery. Method 500 will be described with reference to the systems described herein and shown in FIG. 1 and FIG. 2, though it should be understood that similar methods may be applied to other systems without departing from the scope of this disclosure. Method 500 may be carried out by a controller, such as controller 12 in FIG. 1, and may be stored at the controller as executable instructions in non-transitory memory. Instructions for carrying out method 500 and the rest of the methods included herein may be executed by the controller based on instructions stored on a memory of the controller and in conjunction with signals received from sensors of the engine system, such as the sensors described above with reference to FIG. 1 and FIG. 2. The controller may employ fuel system actuators, such as refueling lock (e.g. 25) etc., according to the method below.

Method 500 begins at 505 and may include indicating whether a refueling request has been received by the vehicle controller. At 505, a refueling request may include an example where a software application such as that depicted in FIG. 3 determines that GPS coordinates corresponding to the passenger vehicle (e.g. 206) match (or very nearly match) the GPS coordinates of the fuel delivery vehicle (e.g. 205), at which point an automatic request for refueling may be sent to the passenger vehicle controller. In another example, upon arrival on-site, a fuel delivery vehicle operator may manually confirm arrival via the software application, whereupon a request for refueling may be sent via the software application to the passenger vehicle controller. In still another example, upon arrival on-site (or where arrival is estimated to be within a predetermined time duration), the passenger vehicle operator may be notified via an alert to either manually or remotely unlock the fuel door. For example, the passenger vehicle operator may thus initiate a refueling request via the use of a key fob (e.g. 104) or remote computing device (e.g. 90), where the refueling request is communicated wirelessly to the passenger vehicle controller in order to unlock the fuel door. In a case where the passenger vehicle operator chooses to manually unlock the fuel door, such an example may include the vehicle operator entering the passenger vehicle and depressing a refueling button in the vehicle to unlock the fuel door. In still other examples, manually unlocking the fuel door may include entering a code into a keyless entry touchpad (e.g. 22) positioned on an external surface of the vehicle (e.g. vehicle door). In some examples, a code for unlocking the fuel door may be different than another code for unlocking access to the vehicle cabin. Depending on the selection options provided to the software app, in one example the passenger vehicle operator may manually enter the code into the keyless touchpad, whereas in another example the keyless code may be provided via the software app to the fuel delivery vehicle operator, such that the fuel delivery vehicle operator may manually enter the code into the keyless touchpad. It may be understood that all of the above examples are illustrative, and are not meant to be limiting in any way. As such, at 505, a refueling request may be received by the passenger vehicle controller by any means known in the art. As such, if, at 505, a refueling request is received by the vehicle controller, method 500 may proceed to 510. At 510, method 500 may include commanding open the refueling lock. As such, a fuel filler system (e.g. 24) may be made accessible for a refueling event. Method 500 may then end.

As discussed above, in other examples, including a sealed fuel tank, the fuel tank may need to be depressurized prior to enabling fuel to be added to the tank. Turning now to FIG. 5B, a high level example method 550 for depressurizing a fuel tank responsive to a refueling request, is shown. More specifically, as discussed above and with regard to FIG. 5A, the request for refueling may pertain to a remote fuel delivery event. Method 550 will be described with reference to the systems described herein and shown in FIG. 1 and FIG. 2, though it should be understood that similar methods may be applied to other systems without departing from the scope of this disclosure. Method 550 may be carried out by a controller, such as controller 12 in FIG. 1, and may be stored at the controller as executable instructions in non-transitory memory. Instructions for carrying out method 550 and the rest of the methods included herein may be executed by the controller based on instructions stored on a memory of the controller and in conjunction with signals received from sensors of the engine system, such as the sensors described above with reference to FIG. 1 and FIG. 2. The controller may employ fuel system and evaporative emissions system actuators, such as fuel tank isolation valve (e.g. 115), canister vent valve (e.g. 132), refueling lock (e.g. 25), etc. according to the method below.

Method 550 begins at 555 and may include indicating whether a refueling request has been received by the vehicle controller. In an effort to avoid redundancy, all of the potential ways in which a refueling request may be received by the vehicle controller will not be reiterated here, but it may be understood that all of the examples described above with regard step 505 of method 500 may additionally pertain to step 555 of method 550. As such, if a refueling request is received at 555, method 550 may proceed to 560. At 560, method 550 may include commanding open a fuel tank isolation valve (FTIV) (e.g. 115). Furthermore, at 560, method 550 may include commanding open or maintaining open a canister vent valve (CVV) (e.g. 132). By commanding open the FTIV and maintaining open or commanding open the CVV, fuel tank vapors may be directed from the fuel tank (e.g. 21) through a conduit (e.g. 131) to a fuel vapor canister (e.g. 122), where the vapors may be adsorbed before exiting to atmosphere via a vent line (e.g.). With the fuel tank thus coupled to atmosphere, method 550 may proceed to 565, and may include monitoring fuel tank pressure. Fuel tank pressure may be monitored, for example, via a fuel tank pressure transducer (e.g. 117). Continuing at 570, method 550 may include indicating whether an absolute fuel tank pressure is less than a threshold. For example, the threshold may comprise a predetermined pressure above or below atmospheric pressure, where, if absolute fuel tank pressure is less than the threshold the fuel tank is at or nearly at atmospheric pressure. As such, at 570, if absolute fuel tank pressure is not indicated to be less than the threshold, method 550 may include continuing to monitor fuel tank pressure at 565.

Responsive to fuel tank pressure dropping below the threshold at 570, method 550 may proceed to 575. At 575, method 550 may include commanding open refueling lock. Such an action may be controlled by the vehicle controller, for example. However, in some embodiments, refueling lock may comprise a mechanical mechanism, where by the refueling lock may be unlocked via a pressure gradient, responsive to fuel tank pressure below the threshold at 570.

As such, method 550 may be used in order to depressurize a sealed fuel tank in order to enable fueling via a remote delivery vehicle.

As discussed above, certain vehicles, such as hybrid vehicles and other vehicles with reduced engine run time, may have limited opportunities for purging fuel vapors from a fuel vapor canister (e.g. 122). As such, if a refueling event is initiated without knowledge of the canister loading state, in some cases the refueling event may overwhelm the canister, thus resulting in undesired emissions. As such, it may be desirable to know an amount of fuel that may be added to the fuel tank without overwhelming the canister.

Turning now to FIG. 6, a high level example method 600 for determining a fuel amount that may be added to a vehicle fuel tank without overwhelming a fuel vapor canister coupled to the fuel tank, is shown. More specifically, method 600 may be used to, responsive to a vehicle-off event where the fuel tank does not include a sealed fuel tank, indicate a fuel tank fill level, indicate a canister loading state, and infer a maximum fuel amount that may be added to the fuel tank without resulting in undesired evaporative emissions. In other words, method 600 may include calculating an amount of fuel that can be added to the fuel tank without overwhelming a storage capacity of the fuel vapor storage canister, wherein the calculated amount is a function of the fuel fill level in the fuel tank and the loading state of the fuel vapor storage canister. In some examples, such a method may be further based on present and forecasted weather data, as discussed below. Method 600 will be described with reference to the systems described herein and shown in FIG. 1 and FIG. 2, though it should be understood that similar methods may be applied to other systems without departing from the scope of this disclosure. Method 600 may be carried out by a controller such as controller 12 in FIG. 1, and may be stored at the controller as executable instructions in non-transitory memory. Instructions for carrying out method 600 and the rest of the methods included herein may be executed by the controller based on instructions stored on a memory of the controller and in conjunction with signals received from sensors of the engine system, such as the sensors described above with reference to FIG. 1 and FIG. 2. The controller may employ fuel system and evaporative emissions system actuators, according to the method below.

Method 600 begins at 605 and may include indicating whether a vehicle-off event has occurred. As discussed above with regard to method 400 depicted in FIG. 4A, a vehicle-off event may comprise a key-off event using an active key or a passive key (e.g. key fob or smart key), or via manual depression of a start/stop button in the vehicle. If, at 605, a vehicle-off event is indicated, method 600 may proceed to 610.

At 610, method 600 may include indicating a fuel fill level in the vehicle fuel tank (e.g. 21). Fuel fill level may be indicated, for example, by a fuel level sensor (not shown) positioned in the fuel tank, which may provide an indication of the fuel level to the vehicle controller (e.g. 12). As discussed above, the fuel level sensor may comprise a flow connected to a variable resistor, or other type of fuel level sensor.

Proceeding to 615, method 600 may include indicating a canister loading state. As discussed above, as fuel vapor is adsorbed by an adsorbent in the canister, heat is generated, whereas heat is consumed as fuel vapor is desorbed from the adsorbent. As such, one or more temperature sensors (e.g. 132) coupled to and/or positioned within the fuel vapor storage canister may be utilized in order to provide an estimate of canister loading state based on monitored temperature changes within the canister. As such, an indication of the canister loading state may be provided to the vehicle controller at 615.

Proceeding to 620, in some examples where the vehicle controller is communicatively coupled (e.g. via wireless communication) to the internet, or if the vehicle comprises an onboard navigation system capable of communicating with the vehicle controller, as described above with regard to FIG. 2, method 600 may include retrieving present and forecasted weather data. It may be understood that in some examples the vehicle controller may not be capable of retrieving present and forecast weather data, and as such, step 620 is illustrated with a dashed box to emphasize that step 620 may be an optional step in method 600. If the vehicle controller is capable of retrieving present and forecast weather data, weather information may be retrieved from one or more data servers, including government and/or private data collection services that provide historic and forecast weather data in a retrievable format, for example, via an application programming interface. The weather information retrieved may be further based on the location of the vehicle as determined by an on-board GPS, if the vehicle is equipped with an on-board navigation system (e.g. 17). For example, data from the nearest available weather stations may be retrieved. The retrieved data may include present and forecasted temperature, humidity, barometric pressure, precipitation, wind, etc. Controller 12 may process the data to extract the relevant information corresponding to a predetermined time duration subsequent to the vehicle-off condition, in order to accurately predict an amount of fuel that may be added to a fuel tank based on canister loading state. For example, in some cases a canister may become loaded with additional fuel vapors during a vehicle-off condition, due to fuel vaporization due to high ambient temperature, high ground temperature, etc. As such, an accurate determination of how much fuel that can be added to the fuel tank at a given time during a vehicle-off condition may be made, by including present and forecasted weather information. In some examples, forecasted weather information may be retrieved for a period of 4 hours, 8 hours, or 12 hours, for example. However, in some examples, forecasted weather information may be retrieved for less than 4 hours, or greater than 12 hours.

Proceeding to 625, method 600 may include inferring a fuel amount that can be added to the fuel tank without overwhelming the capacity of the canister. In a case where weather information is not included in the calculation, the calculation may be based on the current fuel fill level and the canister loading state, and may thus include a single determination comprising an estimate of a maximum fuel fill amount that may be added to the tank. However, in a case where weather information is additionally included in the calculation, the data may comprise a table, where a maximum fuel fill amount may be indicated at various time periods comprising a predetermined time duration. For example, the predetermined time duration may comprise a time duration less than 4 hours, between 4 hours and 12 hours, or greater than 12 hours. As such, if the refueling event were to occur at, for example, 4 hours subsequent to the vehicle-off event, a maximum fuel fill level may be different than if the vehicle were to be refueled 1 hour after a vehicle-off event, for instance. Whether weather information is utilized or not, the calculated maximum fuel fill level(s) indicated at 625 may be stored at the controller.

Proceeding to 630, method 600 may include transmitting the fueling amount information to a software application, such as the software application depicted in FIG. 3, for example. Such information may be communicated wirelessly via the internet, for example, if the controller is equipped with wireless internet connectivity. In other examples, the fueling amount information may be transmitted to/displayed on a vehicle dashboard, for example a human machine interface/touchscreen display (e.g. 18). In still other examples, the fueling amount information may be transmitted wirelessly, via Bluetooth, etc., to a remote communication device (e.g. 90). If the vehicle is not equipped with wireless internet connectivity, but the remote communication device is, then once the fuel amount information is transmitted via Bluetooth to the remote communication device, the data may subsequently be uploaded to the software application, for example, or such information may be utilized by the vehicle operator without the use of the software application.

As such, refueling events may be conducted such that only an amount of fuel may be added to the tank that will not overwhelm the fuel vapor canister capacity, thus reducing the potential for undesired evaporative emissions. Such an amount of fuel may be referred to as the predetermined fuel fill level (predetermined level). While not explicitly illustrated, in some examples, method 600 may additionally be based on whether a vehicle suspension has been raised in order to reduce fuel vaporization during the vehicle-off condition. A method for raising a vehicle suspension in order to reduce fuel vaporization is depicted in FIG. 8. For example, if the vehicle suspension has been raised to reduce fuel vaporization, then an amount of fuel that may be added to the fuel tank may be greater, for example, than if the vehicle suspension had not been raised, or vice versa. Such a condition may be accounted for by the example method 600 illustrated in FIG. 6 when inferring a fuel amount that can be added to the tank without overwhelming canister capacity.

While the method depicted in FIG. 6 applies to vehicles without a sealed fuel tank, in a condition where a fuel tank is sealed except for during refueling events, such as in the case of a plug-in hybrid electric vehicle (PHEV), certain conditions may comprise optimal times for refueling events, as discussed above. Briefly, a fuel tank under negative pressure may result in a back-purge of a fuel vapor canister responsive to commanding open a fuel tank isolation valve (FTIV) (e.g. 115) in order to depressurize the fuel tank prior to refueling. As such, the fuel vapor canister may be at least partially cleaned under such circumstances. Another example includes a fuel tank at atmospheric pressure, wherein commanding open the FTIV does not result in any further loading of the fuel vapor canister.

Accordingly, turning now to FIG. 7, a high level example method 700 for indicating opportune time window(s) for environmentally friendly refueling events, is shown. More specifically, at a vehicle-off event, method 700 may be used to indicate fuel tank pressure and retrieve present and forecasted weather information, and from said information, indicate a time window(s) for when the fuel tank is expected to be under vacuum conditions or at atmospheric pressure conditions. Method 700 will be described with reference to the systems described herein and shown in FIG. 1 and FIG. 2, though it should be understood that similar methods may be applied to other systems without departing from the scope of this disclosure. Method 700 may be carried out by a controller, such as controller 12 in FIG. 1, and may be stored at the controller as executable instructions in non-transitory memory. Instructions for carrying out method 700 and the rest of the methods included herein may be executed by the controller based on instructions stored on a memory of the controller and in conjunction with signals received from sensors of the engine system, such as the sensors described above with reference to FIG. 1 and FIG. 2. The controller may employ fuel system and evaporative emissions system actuators, according to the method below.

Method 700 begins at 705 and may include indicating whether a vehicle-off event has occurred. As discussed above with regard to method 400 depicted in FIG. 4A, a vehicle-off event may comprise a key-off event using an active key or a passive key (e.g. key fob or smart key), or via manual depression of a start/stop button in the vehicle. If, at 705, a vehicle-off event is indicated, method 700 may proceed to 710. At 710, method 700 may include indicating fuel tank pressure. For example, as discussed above fuel tank pressure may be monitored, for example, via a fuel tank pressure transducer (e.g. 117).

Proceeding to 715, method 700 may include retrieving present and forecasted weather data. As such, method 700 may be conducted in a vehicle where the controller is communicatively coupled to the internet, via wireless communication, for example, or if the vehicle comprises an onboard navigation system capable of communicating with the vehicle controller. As discussed above with regard to FIG. 6, and which will be reiterated here, weather information may be retrieved from one or more data servers, including government and/or private data collection services that provide historic and forecast weather data in a retrievable format, for example, via an application programming interface. The weather information retrieved may be further based on the location of the vehicle as determined by an on-board GPS, if the vehicle is equipped with an on-board navigation system (e.g. 17). For example, data from the nearest available weather stations may be retrieved. The retrieved data may include present and forecasted temperature, humidity, barometric pressure, precipitation, wind, etc. In some examples, forecasted weather information may be retrieved for a period of 4 hours, 8 hours, or 12 hours, for example. However, in some examples, forecasted weather information may be retrieved for less than 4 hours, or greater than 12 hours.

Proceeding to 720, method 700 may include calculating opportune time window(s) for environmentally friendly refueling events. As discussed above, opportune time windows for environmentally friendly refueling events may comprise time periods which the fuel tank is at atmospheric or negative pressure. For example, if the fuel tank is determined to be at a negative pressure and the forecast weather data indicates a rise in temperature, the opportune time window may be smaller than if the forecast weather data indicates a decrease in temperature. In another example, if the fuel tank is at a positive pressure, based on the forecast weather data it may be indicated when the next time window the fuel tank will be at either atmospheric pressure or negative pressure. In summary, based on the current fuel tank pressure and forecasted weather data, time windows for which the fuel tank will be at atmospheric or negative pressure may be determined at time 720.

Proceeding to 725, method 700 may include indicating fuel fill level in the vehicle fuel tank (e.g. 21). As discussed above, fuel fill level may be indicated, for example, by a fuel level sensor (not shown) located in the fuel tank, which may provide an indication of the fuel level to the vehicle controller (e.g. 12), and may comprise a flow connected to a variable resistor, or other type of fuel level sensor.

Proceeding to 730, method 700 may include indicating a canister loading state. As discussed above, one or more temperature sensors (e.g. 132) coupled to and/or within the canister may be utilized in order to provide an estimate of canister loading state based on monitored temperature changes within the canister. As such, an indication of the canister loading state may be provided to the vehicle controller at 730.

Proceeding to 735, method 700 may include correlating the opportune time window(s) for environmentally friendly refueling events with canister loading state in order to infer/estimate an amount of fuel that can be added to the tank without overwhelming canister capacity. For example, for a time window where it is indicated that the fuel tank will be under vacuum, an estimated vacuum level may be used to determine an amount by which the canister may be cleaned during a back-purge of the canister during fuel tank depressurization. The estimated amount of canister cleaning may be used to estimate a canister load level prior to a refueling event, and as such, in conjunction with current fuel fill level, an estimated amount of fuel that can be added to the tank without overwhelming the fuel vapor canister may be determined. Similarly, for a time window where it is indicated that the fuel tank will be at atmospheric pressure, then an estimated amount of fuel that can be added to the tank may be determined based on the canister loading state and the current fuel fill level, as the canister will not be loaded or back-purged responsive to initiating a refueling event. As such, step 735 is similar to step 625 of method 600, in that an estimated amount of fuel that may be added to the fuel tank without overwhelming the canister may be indicated, except that in the case of method 700, the estimated amount is further based on time windows for which the sealed fuel tank may be under negative pressure or atmospheric pressure. While not explicitly illustrated, in some examples time windows may additionally be indicated for when the fuel tank may be at positive pressure, and an estimated level of positive pressure may be correlated with canister loading state in order to determine how much the canister loading state will change based on depressurization of the positively pressurized fuel tank prior to a refueling event. For example, if a canister loading state is low, and an amount of positive pressure in the fuel tank is estimated, then it may be further indicated/updated what the canister loading state will be subsequent to fuel tank depressurization. The updated canister loading state may thus be utilized in order to calculate an amount of fuel that may be added to the fuel tank, depending on the current fuel fill level in the tank. As such, even under conditions of positive pressure, it may be indicated an amount of fuel that may be added to the tank without overwhelming the canister.

Proceeding to 740, method 700 may include transmitting the indicated time window information and correlated fueling amount information to a software application, such as the software application depicted in FIG. 3, for example. As discussed above, fueling amount information may be referred to as the predetermined fuel fill level (predetermined level). Such information may be communicated wirelessly via the internet, for example. In other example, the time window information and correlated fueling amount information may be transmitted to/displayed on a vehicle dashboard, for example a human machine interface/touchscreen display (e.g. 18). In still other examples, the time window information and fueling amount information may be transmitted wirelessly, via Bluetooth, etc., to a remote communication device (e.g. 90). If the vehicle is not equipped with wireless internet connectivity, but the remote communication device is, then once the time window information and correlated fueling amount information is transmitted via Bluetooth to the remote communication device, the data may subsequently be uploaded to the software application, for example, or such information may be utilized by the vehicle operator without the use of the software application.

As such, refueling events in a vehicle wherein the fuel tank is sealed except for refueling events may be conducted such that only an amount of fuel may be added to the tank that will not overwhelm the fuel vapor canister capacity, thus reducing the potential for undesired evaporative emissions. While not explicitly illustrated, in some examples method 700 may additionally be based on whether a vehicle suspension has been raised in order to reduce fuel vaporization during the vehicle-off condition. A method for raising a vehicle suspension in order to reduce fuel vaporization is depicted in FIG. 8. For example, if the vehicle suspension has been raised to reduce fuel vaporization, then the time windows for opportune refueling events may be correspondingly adjusted. More specifically, a hot ground surface may result in significantly more fuel vaporization if the vehicle suspension is not raised, as compared to if the vehicle suspension is raised. As such, depending on whether the vehicle suspension has been raised or not, time windows for environmentally friendly refueling events may change. Such conditions may be accounted for by the example method 700 illustrated above when indicating opportune time windows for environmentally friendly refueling events and fueling amounts that can be added to the tank without overwhelming fuel vapor canister capacity.

Turning now to FIG. 8, a high level example method 800 for raising a vehicle suspension responsive to a vehicle-off event, is shown. More specifically, responsive to a vehicle-off event, an ambient temperature, and a ground surface temperature may be indicated in order to infer whether fuel vaporization rate during the vehicle-off event may be greater than a predetermined threshold fuel vaporization rate. If an inferred fuel vaporization rate is indicated to be greater than the threshold fuel vaporization rate, then method 800 may be used to raise the vehicle suspension a determined amount, such that fuel vaporization may be reduced. Method 800 will be described with reference to the systems described herein and shown in FIG. 1 and FIG. 2, though it should be understood that similar methods may be applied to other systems without departing from the scope of this disclosure. Method 800 may be carried out by a controller, such as controller 12 in FIG. 1, and may be stored at the controller as executable instructions in non-transitory memory. Instructions for carrying out method 800 and the rest of the methods included herein may be executed by the controller based on instructions stored on a memory of the controller and in conjunction with signals received from sensors of the engine system, such as the sensors described above with reference to FIG. 1. The controller may employ vehicle system actuators, such as active suspension (e.g. 111), according to the method below.

Method 800 begins at 805 and may include indicating whether a vehicle-off event has occurred. As discussed above with regard to method 400 depicted in FIG. 4A, a vehicle-off event may comprise a key-off event using an active key or a passive key (e.g. key fob or smart key), or via manual depression of a start/stop button in the vehicle. If a vehicle-off event is indicated, method 800 may proceed to 810. At 810, method 800 may include determining an ambient temperature. An ambient temperature may be indicated by an ambient temperature/humidity sensor (e.g. 198), for example. Proceeding to 815, method 800 may include determining ground surface makeup and inferring ground surface temperature. For example, inferring ground surface makeup may be carried out by onboard camera(s) (e.g. 105) configured to recognize and indicate whether a ground surface composition comprises asphalt vs. another surface such as concrete, dirt, grass, sand, etc. Still further, at 815, method 800 may include inferring ground surface temperature. For example, inferring ground surface temperature may include the use of infrared camera(s) positioned on the vehicle such that an accurate estimation of ground temperature may be obtained. Proceeding to 820, method 800 may include inferring a fuel vaporization rate based on the ambient temperature, ground surface makeup and ground surface temperature. While not explicitly illustrated, in some examples fuel vaporization rate may additionally or alternatively be indicated via a fuel tank pressure sensor (e.g. 117) and a fuel tank temperature sensor (e.g. 124).

Proceeding to 825, method 800 includes indicating whether fuel tank positioning conditions are met. For example, from the inferred or measured fuel vaporization rate indicated at step 820, it may be determined whether the fuel vaporization rate is greater than a predetermined threshold fuel vaporization rate. If, at 825, it is indicated that the inferred or measured fuel vaporization rate is not greater than the threshold, method 800 may proceed to 830 and may include maintaining the status of the vehicle suspension system in its current state. Alternatively, at 825, it may be indicated that the inferred or estimated fuel vaporization rate is greater than the predetermined threshold fuel vaporization rate. The threshold vaporization rate may comprise a rate where canister loading is expected to be above a threshold loading rate, for example, in the case of a vehicle without a sealed fuel tank. In another example, the threshold vaporization rate may comprise a rate for which pressure in a sealed fuel tank is estimated to build beyond a threshold fuel tank pressure. In such an example where the fuel tank is sealed, by raising the vehicle suspension, conditions where pressure in the fuel tank may reach atmospheric pressure or a negative pressure may be more rapidly reached, as compared to if the vehicle suspension were not raised. Accordingly, in conditions where the fuel tank is sealed, such as in the case of PHEVs, raising the suspension may thus result in a reduction in the amount of fuel vapors that may load a fuel vapor canister during depressurization of the fuel tank responsive to a request for refueling. In a condition where the fuel tank is not sealed from the fuel vapor canister during vehicle-off conditions, raising the vehicle suspension may thus result in less fuel vapor canister loading due to fuel vaporization, and as such, an amount of fuel that may be added to the fuel tank without overwhelming the canister may be greater than if the vehicle suspension were not raised.

Accordingly, if at 825 it is indicated the fuel tank positioning conditions are met, method 800 may proceed to 835. At 835, method 800 may include raising the vehicle suspension a determined amount. As discussed above, raising the vehicle suspension a determined amount by be accomplished via an active suspension system (e.g. 111) responsive to input from inertial sensors (e.g. 199). In one example, if the vehicle fuel tank is positioned at the rear of the vehicle, then the front of the vehicle may be lowered and the rear of the vehicle may be correspondingly raised. In another example, where the vehicle fuel tank is positioned near the front of the vehicle, then the rear of the vehicle may be lowered and the front of the vehicle may be correspondingly raised. Such examples are meant to be illustrative and are in no way meant to be limiting. While not explicitly illustrated, in some examples, raising the vehicle at 835 may only proceed responsive to an indication that the vehicle is not occupied. For example, vehicle-occupancy may be indicated via onboard cameras (e.g. 105), seat load cells (e.g. 107), and/or door sensing technology (e.g. 108).

Proceeding to 840, it may thus be indicated whether, while the vehicle suspension is raised, whether fuel tank lowering conditions are met. For example, if it is indicated that the vehicle has become occupied, where vehicle occupancy may be indicated via the unlocking of a vehicle cabin door, via onboard camera(s), seat load cells, and/or door sensing technology, as discussed above. In other examples, fuel tank lowering conditions may be met if it is indicated that ambient temperature and/or ground temperature are below predetermined thresholds. In still further examples, in vehicles equipped with fuel vapor dome temperature tensors (e.g. 124) and fuel tank pressure sensors (e.g. 117), if an amount of fuel vaporization drops below a predetermined threshold fuel vaporization rate, then it may be indicated that fuel tank lowering conditions are met. If fuel tank lowering conditions are not met at 840, method 800 may proceed to 845, and may include maintaining the vehicle suspension raised at its current level. However, if at 840, fuel tank lowering conditions are met, method 800 may proceed to 850. At 850, method 800 may include lowering the vehicle suspension a predetermined amount in order to return the vehicle suspension to a default vehicle-off state.

Turning now to FIG. 9, a flow chart for a high level method 900 for conducting an evaporative emissions test diagnostic procedure responsive to completion of a remote refueling event, is shown. More specifically, a remote refueling event may comprise a unique circumstance where a refueling event may take place, yet the vehicle may not be driven shortly thereafter. As the refueling event may result in agitation of the fuel in the fuel tank and may thus increase fuel vaporization and fuel temperature, if the evaporative emissions system and fuel system is sealed subsequent to the refueling event where the car is not driven, a pressure increase above a threshold may be indicative of an absence of undesired evaporative emissions. In this way, a remote refueling event may additionally be utilized to conduct an opportunistic evaporative emissions test diagnostic. Method 900 will be described with reference to the systems described herein and shown in FIG. 1 and FIG. 2, though it should be understood that similar methods may be applied to other systems without departing from the scope of this disclosure. Method 900 may be carried out by a controller, such as controller 12 in FIG. 1, and may be stored at the controller as executable instructions in non-transitory memory. Instructions for carrying out method 900 and the rest of the methods included herein may be executed by the controller based on instructions stored on a memory of the controller and in conjunction with signals received from sensors of the engine system, such as the sensors described above with reference to FIG. 1 and FIG. 2. The controller may employ fuel system and evaporative emissions system actuators, such as fuel tank isolation valve (FTIV) (e.g. 115), canister vent valve (CVV) (e.g. 132), canister purge valve (CPV) (e.g. 161), etc., according to the method below.

Method 900 begins at 905 and may include indicating whether a remote refueling event is complete. In one example, completion of the remote refueling event may comprise a re-locking of a fuel lock (e.g. 25), closing of a fuel door, replacement of a gas cap, etc. In another example, completion of the remote refueling event may comprise a fuel delivery operator communicating with a software application, such as that depicted in FIG. 3, that the refueling event is complete, wherein such information may further be communicated to the vehicle controller (e.g. 12). If, at 905, it is indicated that the remote refueling event is not complete, method 900 may proceed to 910 and may include maintaining fuel system and evaporative emissions system status in order to proceed with the refueling event. For example, during a refueling event, the FTIV may be open, the CVV may be open, and the CPV may be closed. As such, if the remote refueling event is not indicated to be complete, at 910 method 900 may include maintaining the FTIV and the CVV open, and maintaining closed the CPV.

Upon indication that the remote refueling event is complete at 905, method 900 may proceed to 915. At 915, method 900 may include commanding closed the CVV. By commanding closed the CVV, the fuel system and evaporative emissions control system may be sealed from atmosphere. Proceeding to 920, method 900 may include monitoring pressure in the fuel system and evaporative emissions control system, via a fuel tank pressure transducer (FTPT) (e.g. 117), for example. A pressure increase greater than a predetermined threshold pressure, or a pressure rate increase greater than a threshold pressure increase rate, may be indicative of the absence of undesired evaporative emissions. As such, at 925, method 900 may include indicating whether pressure in the fuel system and evaporative emissions system is greater than the predetermined threshold pressure, or whether the pressure increase rate is greater than the predetermined threshold pressure increase rate. In some examples, the pressure may be monitored for a predetermined time duration. If, at 925, it is indicated that pressure in the fuel system is greater than a predetermined threshold pressure or threshold pressure rate increase, method 900 may proceed to 930, and may include indicating the absence of undesired evaporative emissions. The indication of the undesired evaporative emissions may be stored at the controller. Proceeding to 935, method 900 may include commanding open the CVV. By commanding open the CVV, while the FTIV is maintained open, pressure in the fuel system and evaporative emissions system may be returned to atmospheric pressure. Subsequently, at 940, method 900 may include commanding closed the FTIV to seal the fuel tank. At 945, method 900 may include updating fuel system and evaporative emissions system status. For example, an evaporative emissions test diagnostic schedule may be updated to reflect the passing result. Method 900 may then end.

Returning to 925, if pressure in the fuel system and evaporative is not indicated to reach the predetermined pressure threshold within the predetermined time duration, or if it is indicated that the pressure increase rate is less than the threshold pressure increase rate, method 900 may proceed to 950. At 950, it may be determined whether the amount of fuel that was added to the fuel tank is sufficient for a robust pressure build. For example, if a fuel amount below a threshold fuel amount is added to the tank, then the amount of fuel vaporization and increase in fuel temperature as a result of the refueling event may be lower than an amount which may produce a robust pressure build responsive to sealing the fuel system and evaporative emissions system. As such, if at 950 it is determined that the reason for the pressure build (or pressure rate) not increasing to the predetermined pressure threshold (or the predetermined pressure rate threshold) is due to the amount of fuel added to the tank being below the threshold fuel amount, method 900 may proceed to 955 and may include discarding test results. Method 900 may thus proceed to 935 and may include commanding open the CVV to relieve pressure in the fuel system and evaporative emissions system, and responsive to the pressure reaching atmospheric pressure, method 900 may proceed to 940. At 940, method 900 may include commanding closed the FTIV to seal the fuel tank. Method 900 may then proceed to 945, and may include updating fuel system and evaporative emissions system status. For example, because an evaporative emissions test diagnostic was conducted but the results were discarded, an evaporative emissions test schedule may be updated to conduct an evaporative emissions test diagnostic at the next available opportunity. Method 900 may then end.

Returning to 950, if it is indicated that the amount of fuel that was added to the tank is above the threshold fuel amount, method 900 may proceed to 960 and may include indicating the presence of undesired evaporative emissions. The indication of the presence of undesired evaporative emissions may be stored at the controller, for example. Furthermore, indicating the presence of undesired evaporative emissions may include illuminating a malfunction indicator light (MIL) on the vehicle dash, for example, in order to alert the vehicle operator of a need to service the vehicle. Method 900 may thus proceed to 935, and may include commanding open the CVV to relieve pressure in the fuel system and evaporative emissions system. Responsive to pressure in the fuel system and evaporative emissions system reaching atmospheric pressure (or near atmospheric pressure), method 900 may proceed to 940 and may include commanding closed the FTIV to seal the fuel tank. Continuing to 945, method 900 may include updating fuel system and evaporative emissions system status. For example, as undesired evaporative emissions were indicated, method 900 may include updating suspending future evaporative emissions test diagnostics until it is indicated that the source of undesired evaporative emissions has been remedied. Method 900 may then end.

Turning now to FIG. 10, an example timeline for conducting a remote refueling event using the methods depicted in FIGS. 4A-9, is shown. Timeline 1000 includes plot 1005, indicating whether a vehicle is on, or off, over time. Timeline 1000 further includes plot 1010, indicating whether conditions are met for actively raising a vehicle suspension in order to increase the distance of an onboard fuel tank from a hot ground surface, over time. Accordingly, timeline 1000 further includes plot 1015, indicating a vehicle suspension height, over time. Timeline 1000 further includes plot 1020, indicating a fuel tank pressure. Line 1021 represents a threshold pressure that, if reached during an evaporative emissions test diagnostic procedure, may be indicative of the absence of undesired evaporative emissions. Timeline 1000 further includes plot 1025, indicating whether a refueling event is requested, plot 1030, indicating whether a fuel tank isolation valve is open or closed, and plot 1035, indicating whether a canister vent valve is open or closed, over time. Timeline 1000 further includes plot 1040, indicating a fuel vapor canister loading state, over time. Timeline 1000 further includes plot 1045, indicating a fuel tank fill level, over time. Timeline 1000 further includes plot 1050, indicating whether undesired emissions are indicated, over time.

At time t0, the vehicle is in operation, as indicated by plot 1005. As the vehicle is in operation, vehicle-off fuel tank positioning conditions are not met, indicated by plot 1010. For example, as described above with regard to the method depicted in FIG. 8, during vehicle-off conditions, if a measured or inferred fuel tank vaporization rate is greater than a predetermined threshold, then a vehicle active suspension (e.g. 111) may be employed in order to increase the distance between the fuel tank and the ground. However, because the vehicle is in operation at time t0, fuel tank positioning conditions are not met. Vehicle operating conditions are such that, the vehicle suspension is operating at a default suspension level, as indicated by plot 1015. The vehicle depicted in example timeline 1000 may comprise a vehicle with a sealed fuel tank, and as the vehicle is in operation, the fuel tank isolation valve (FTIV) is closed, indicated by plot 1030, and fuel tank pressure, as indicated by a fuel tank pressure transducer (e.g. 117), is above atmospheric pressure, as indicated by plot 1020. The CVV, indicated by plot 1035, is open. The vehicle depicted in example timeline 1000 may comprise a hybrid vehicle, for example a hybrid electric vehicle (HEV) or plug-in hybrid electric vehicle (PHEV). As such, the vehicle may operate for extended times without the use of the vehicle engine. In such a vehicle, opportunities for purging a fuel vapor canister may be limited, and as such, the FTIV may limit the loading of the fuel vapor canister. However, the vehicle evaporative emissions control system and fuel system may need to be intermittently diagnosed for undesired evaporative emissions. As such, the FTIV may be intermittently opened during engine-off conditions, which, if the fuel tank is under positive pressure, may load the fuel vapor canister with vapors. As such, even though the fuel tank is indicated to be nearly empty, as indicated by plot 1045, which indicates a refueling event was unlikely to have recently loaded the fuel vapor canister, canister load is fairly high, as indicated by plot 1040. As such, it may be understood that the vehicle has been operating in primarily an electric only-mode, or an engine-on mode in which the canister has not had opportunities to be cleaned.

At time t1, a vehicle-off event is indicated. As discussed above with regard to FIG. 4A and FIG. 4B, responsive to an indication of a vehicle-off event, vehicle location information may be communicated to the software application (e.g. FIG. 3). The vehicle-off event may comprise a key-off event using an active key that can be inserted/removed from an ignition interface (e.g. 15), or a vehicle-off event via an electronic key fob (e.g. 104) or smart key which do not have to be inserted or removed from the ignition interface. As a vehicle-off event is initiated at time t1, ambient temperature may be determined, for example via an ambient temperature/humidity sensor (e.g. 198), and a ground surface makeup and temperature may be indicated, using for example, onboard camera(s) (e.g. 105) and infrared camera(s) (e.g. 196), respectively. In this way, a fuel vaporization rate may be estimated. In some examples, the fuel vaporization rate may additionally or alternatively be estimated or measured via a fuel tank pressure sensor (e.g. 117) and a fuel tank temperature sensor (e.g. 124). If the fuel vaporization rate is indicated to be able a threshold fuel vaporization rate, then the active suspension system may be employed in order to increase the distance of the fuel tank from the ground surface. Accordingly, at time t2 it is indicated that fuel tank positioning conditions are met, as indicated by plot 1010. Accordingly, between time t2 and t3, the vehicle active suspension is employed in order to raise the vehicle a predetermined amount. As discussed above, depending on the positioning of the fuel tank, either the front end of the vehicle may be raised while the rear end is lowered, or vice versa. For illustrative purposes however, raising the suspension is depicted as a single increase from a default suspension level to a raised (+) height.

Between time t3 and t4, with the fuel tank raised and while the vehicle remains in an off-state, fuel tank pressure begins to decline toward a negative fuel tank pressure. For example, while the fuel vaporization rate was indicated to be above the fuel vaporization rate threshold at time t2, over time the fuel vaporization rate, and thus fuel tank pressure, may decline. In one example, the change may be due to diurnal cycle temperature fluctuations. In another example, a change in weather conditions may result in the drop in fuel tank pressure.

It may be understood that the operator of a vehicle may have utilized a software application, such as the application depicted in FIG. 3, to schedule a remote refueling event for the vehicle. In this example, the remote refueling event may comprise an environmentally friendly refueling event. As described above, an environmentally friendly refueling event may comprise a condition where a sealed fuel tank is at atmospheric pressure or under negative pressure. A fuel tank at atmospheric pressure may not load the fuel vapor canister with fuel vapor upon unsealing the fuel tank prior to initiation of the refueling event. A fuel tank at a negative pressure may additionally serve the purpose of back-purging the canister prior to enabling initiation of the refueling event. As discussed above with regard to FIG. 7, the vehicle controller may be configured to indicate fuel tank pressure at the vehicle-off event, and indicate opportune time window(s) for environmentally friendly refueling events. Furthermore, based on the fill level in the fuel tank and canister loading state at the vehicle-off event, an inferred fuel amount that can be added to the fuel tank at a given time may be indicated. Such information may be communicated (e.g. wirelessly) to the software application in order to provide the vehicle operator with selection options for the remote refueling event. In this example, it may be understood that the passenger vehicle operator has selected the remote refueling event to occur at a time window wherein the fuel tank is predicted to be at a negative pressure, such that the fuel vapor canister may be slightly cleaned, such that the fuel tank may be filled to capacity without overwhelming the fuel vapor canister.

Accordingly, at time t4, a request for refueling is received by the vehicle controller, as indicated by plot 1025. As discussed above, the way in which the request for refueling may be indicated to the vehicle controller may vary depending on selections the passenger vehicle operator has made via the software application discussed above at FIG. 3. Briefly, one example may comprise GPS coordinates of a fuel delivery vehicle (e.g. 206) matching or nearly matching GPS coordinates of the passenger vehicle (e.g. 205), at which point an automatic request for refueling may be sent to the passenger vehicle controller via the software application. In another example, upon arrival on-site, a fuel delivery operator may manually confirm arrival via the software application, whereupon a request for refueling may be sent via the software application to the passenger vehicle controller. Another example may comprise the passenger vehicle operator being notified via an alert to either manually or remotely unlock the fuel door. The passenger vehicle operator may thus initiate a refueling request via a key fob (e.g. 104), remote computing device (e.g. 90), or manually. In still other examples the passenger vehicle operator may manually enter a key code into a keyless entry touchpad (e.g. 22) positioned on an external surface of the vehicle. Alternatively, the key code may be provided, via the software application, to the fuel delivery operator, such that the fuel delivery operator may manually enter the key code in order to initiate the refueling event. In any case, whatever the method utilized in order to initiate the refueling request, at time t4 a refueling request is received by the passenger vehicle controller. Accordingly, as the vehicle comprises a sealed fuel tank, initiation of the refueling event results in the controller commanding open the FTIV in order to depressurize the fuel tank. As the fuel tank is under slight negative pressure, fuel tank depressurization may thus draw air in from the atmosphere, across the fuel vapor canister where fuel vapors may be desorbed from the canister, and returned to the fuel tank. As such, between time t4 and t5, with the FTIV opened, canister loading state is indicated to decline, as indicated by plot 1040. Furthermore, with the FTIV opened, the fuel tank returns to atmospheric pressure, as indicated by plot 1020. Because the fuel tank depressurization event served to additionally clean the fuel vapor canister, the fuel tank may be filled to capacity without overwhelming the canister capacity, thus reducing undesired evaporative emissions.

Accordingly, at time t5, the refueling operation commences. For example, the passenger vehicle fuel tank may begin being filled by a fuel dispenser (e.g. 207) on the fuel delivery vehicle (e.g. 205). Accordingly, between time t5 and t6, fuel level in the fuel tank is indicated to rise. With fuel being dispensed into the tank, fuel vapors may be generated. As such, with the FTIV open (and the CVV maintained open), vapors generated during the refueling event may be adsorbed by the fuel vapor canister. As such, the fuel vapor canister loading state is indicated to rise during the course of the refueling event, between time t5 and t6.

At time t6, fuel level in the tank is indicated to plateau. In one example, the plateau may be the result of the fuel dispenser automatically shutting off responsive to an increase in fuel tank pressure, where the increase in fuel tank pressure occurs as the result of the increasing fuel level closing a fill limit vent valve in the fuel tank when the tank is filled to capacity, as discussed above with regard to FIG. 2. However, in other examples, the fuel delivery operator may add only a desired or requested amount of fuel to the tank. As discussed above, such a desired or requested fuel amount may be based on a calculated amount of fuel that may be added to the tank without overwhelming the fuel vapor canister, such that undesired evaporative emissions may be reduced.

As fuel is no longer being added to the passenger vehicle fuel tank at time t6, but as the FTIV is still open, pressure in the fuel tank returns to atmospheric pressure between time t6 and t7. At time t7, a refueling event is no longer indicated to be requested. In other words, it may be indicated that the refueling event is complete. Such an indication may comprise the re-locking of a fuel lock, closing of a fuel door, replacement of a gas cap, etc. Furthermore, such an indication may be communicated to the software application, such that the passenger vehicle operator may be alerted that the refueling event is complete. As the refueling event is indicated to be complete, and as the addition of fuel to the tank is a process that creates a significant amount of fuel vapors, the fuel system and evaporative emissions system may be sealed in order to conduct an evaporative emissions test diagnostic procedure, as discussed above with regard to the method depicted in FIG. 9. As such, at time t7 the CVV may be commanded closed, while the FTIV may be maintained open. As such, the fuel system and evaporative emissions system may be sealed from atmosphere. Between time t7 and t8, pressure in the fuel system and evaporative emissions system is indicated to increase, as indicated by plot 1020. At time t8, pressure in the fuel system and evaporative emissions system reaches the predetermined pressure threshold, represented by line 1021. As such, no undesired evaporative emissions are indicated, as depicted by plot 1050. Accordingly, as the evaporative emissions test diagnostic is complete, at time t8 the CVV is commanded open. With the CVV and the FTIV open, pressure in the fuel system and evaporative emissions system returns to atmospheric pressure between time t8 and t9. At time t9, the FTIV is commanded closed in order to seal the fuel tank.

As discussed above, a remote refueling event may present an opportune time to conduct an evaporative emissions test diagnostic procedure on the vehicle fuel system and evaporative emissions system. Such an example was described above with regard to FIG. 9, and illustrated in the timeline depicted in FIG. 10, where the entire fuel system and evaporative emissions system was sealed by closing the CVV, and undesired evaporative emissions indicated based on a monitored pressure build in the fuel system and evaporative emissions system. However, while such a method may enable an indication of undesired evaporative emissions, the precise location of the source of undesired evaporative emissions may not be able to be determined. The ability to determine the location of the source of undesired evaporative emissions (e.g. canister-side or fuel tank-side) is desirable, as such information reduces dealership troubleshooting time. As such, a method is presented below that provides an opportunity to diagnose both the fuel system and the evaporative emissions system separately after a refueling event. In one example, the refueling event may comprise a remote refueling event, however in other examples the refueling event may not comprise a remote refueling event.

Figure 11:
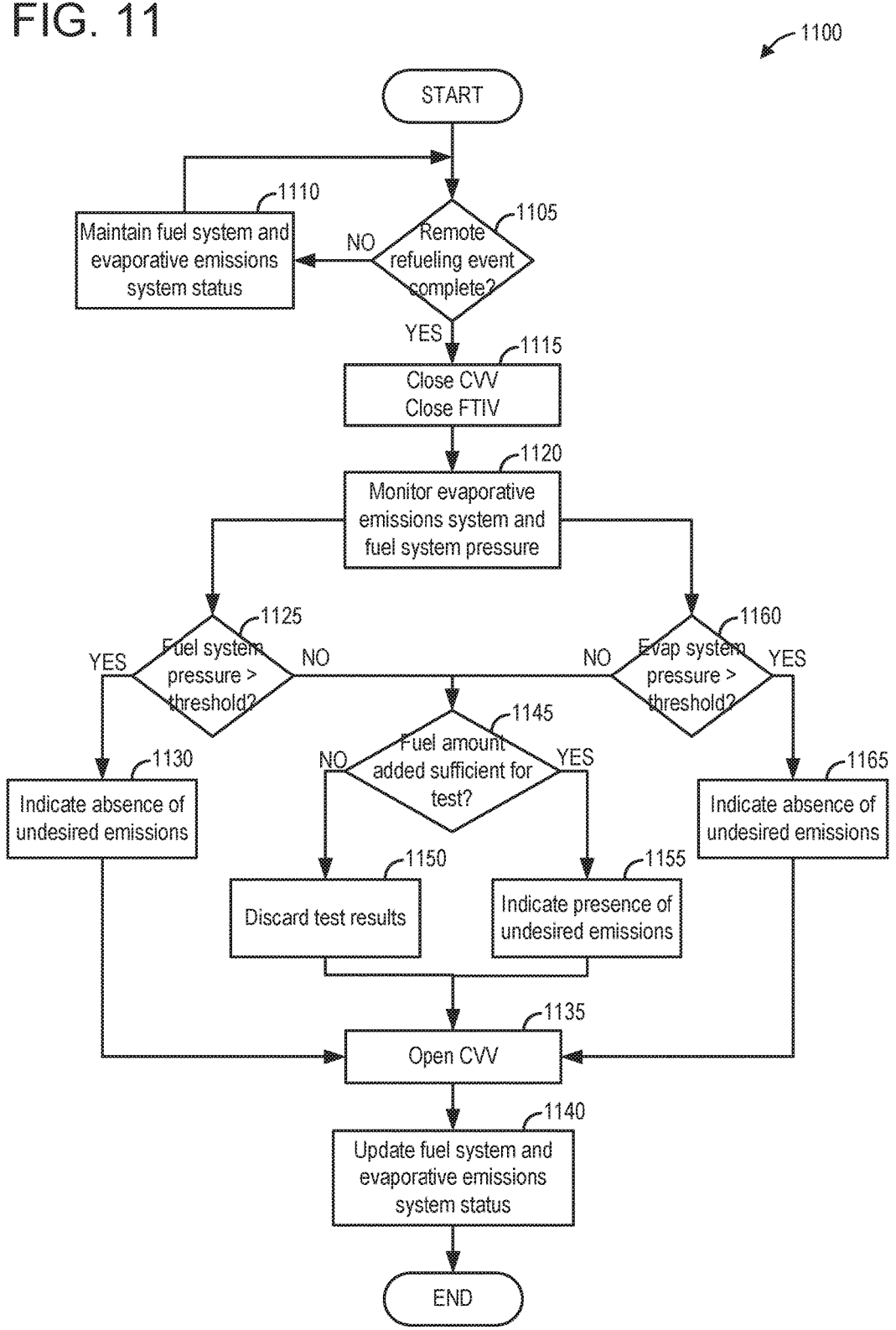
FIG. 11 shows a flowchart for a high-level example method for simultaneously conducting a separate evaporative emissions test diagnostic procedure on a vehicle fuel system (e.g. fuel tank-side), and evaporative emissions system (e.g. canister-side).
Figure 12:
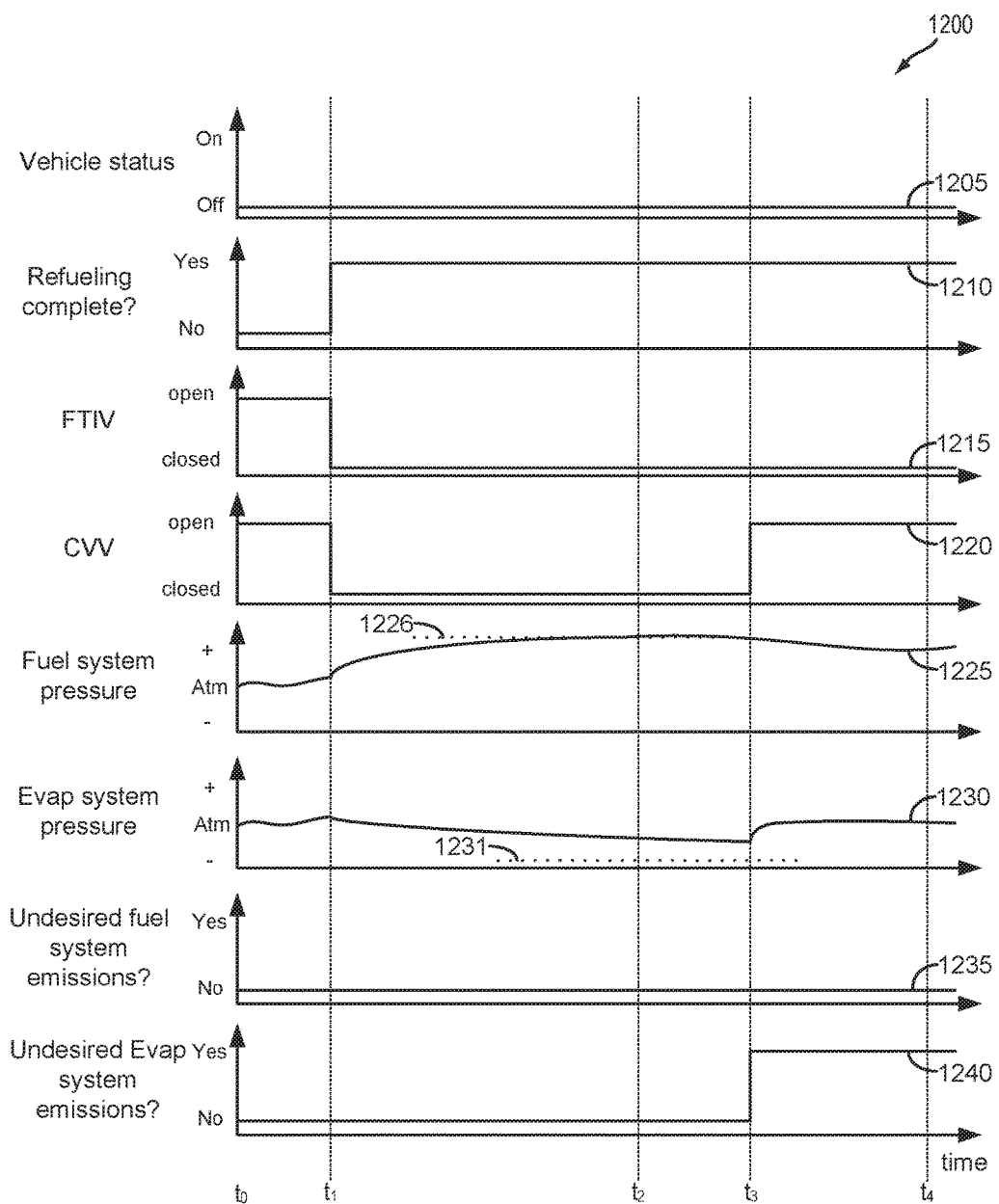
FIG. 12 shows an example timeline for conducting a simultaneous separate evaporative emissions test diagnostic procedure on a vehicle fuel system, and on an evaporative emissions system.

Turning now to FIG. 11, a high level example method 1100 for simultaneously conducting an evaporative emissions test diagnostic procedure on a vehicle fuel system (e.g. fuel tank-side), and evaporative emissions system (e.g. canister-side), is shown. More specifically, responsive to completion of a refueling event, where the refueling event may comprise a remote refueling event, both a fuel tank isolation valve (FTIV) (e.g. 115), and a canister vent valve (CVV) (e.g. 132), are commanded closed. Accordingly, both the fuel system and evaporative emissions system may be sealed from each other and from atmosphere. Pressure in the fuel system and evaporative emissions system may thus be monitored, using one pressure sensor (e.g. 117) for the fuel system, and another pressure sensor (e.g. 118) for the evaporative emissions system. The presence of undesired evaporative emissions may be indicated in the fuel system responsive to a pressure build less than a predetermined threshold, whereas the presence of undesired evaporative emissions may be indicated in the evaporative emissions system responsive to a vacuum-build less than a threshold vacuum. Method 1100 will be described with reference to the systems described herein and shown in FIG. 1 and FIG. 2, though it should be understood that similar methods may be applied to other systems without departing from the scope of this disclosure. Method 1100 may be carried out by a controller, such as controller 12 in FIG. 1, and may be stored at the controller as executable instructions in non-transitory memory. Instructions for carrying out method 1100 and the rest of the methods included herein may be executed by the controller based on instructions stored on a memory of the controller and in conjunction with signals received from sensors of the engine system, such as the sensors described above with reference to FIG. 1 and FIG. 2. The controller may employ fuel system and evaporative emissions system actuators, such as canister purge valve (CPV) (e.g. 161), FTIV (e.g. 115), CVV (e.g. 132), etc., according to the method below. Method 1100 will be described in relation to a remote refueling event, however as discussed above, the method is not in any way limited to remote refueling events. For example, such a method may be used subsequent to completion of any refueling event, where the fuel tank may be sealed by a FTIV, and where a CVV may seal an evaporative emissions system from atmosphere.

Method 1100 begins at 1105 and may include indicating whether a remote refueling event is complete. In one example, completion of the remote refueling event may comprise a re-locking of a fuel lock (e.g. 25), closing of a fuel door, replacement of a gas cap, etc. In another example, completion of the remote refueling event may comprise a fuel delivery operator communicating with a software application, such as that depicted in FIG. 3, that the refueling event is complete, wherein such information may further be communicated to the vehicle controller (e.g. 12). If, at 1105, it is indicated that the remote refueling event is not complete, method 1100 may proceed to 1110 and may include maintaining fuel system and evaporative emissions system status in order to proceed with the refueling event. For example, during a refueling event, the FTIV may be open, the CVV may be open, and the CPV may be closed. As such, if the remote refueling event is not indicated to be complete, at 1110 method 1100 may include maintaining the FTIV and the CVV open, and maintaining closed the CPV.

Upon indication that the remote refueling event is complete at 1105, method 1100 may proceed to 1115. At 1115, method 1100 may include commanding closed the CVV and commanding closed the FTIV. By commanding closed the FTIV and the CVV together, the fuel system may be sealed, the evaporative emissions system may be sealed, and importantly, the fuel system and evaporative emissions system may be sealed from each other. In other words, at 1115, method 900 may comprise isolating the fuel system from the evaporative emissions system and from atmosphere after the fuel system has been filled to the predetermined fuel fill level (predetermined level).

Proceeding to 1120, method 1100 may include monitoring pressure in the fuel system and the evaporative emissions system. Importantly, pressure in the fuel system may be monitored separately from the pressure monitoring in the evaporative emissions system. For example, pressure in the fuel system may be monitored by one pressure sensor (e.g. 117), while pressure in the evaporative emissions system may be monitored by another pressure sensor (e.g. 118). As indicated in the method depicted in FIG. 11, both the fuel system and evaporative emissions system may be simultaneously monitored, where the monitoring may include indicating the presence or absence of undesired evaporative emissions. However, in order to describe the process flow, first the monitoring of the fuel system will be described, followed by a description of the monitoring of the evaporative emissions system. It may be understood that monitoring of the fuel system and evaporative emissions system at 1120 may include monitoring for a predetermined time duration, for example.

As such, during monitoring of the fuel system, method 1100 may proceed to 1125. At 1125, method 1100 may include indicating whether fuel system pressure is greater than a predetermined positive pressure threshold. For example, because a refueling event has recently been completed where the addition of fuel to the fuel tank may result in the agitation of the fuel, thus increasing fuel temperature and fuel vaporization, pressure may build in the sealed fuel tank. As such, a pressure build greater than the predetermined positive pressure threshold may be indicative of the absence of undesired evaporative emissions. As such, if at 1125, pressure in the fuel tank is indicated to be greater than the predetermined positive pressure threshold, where pressure is monitored by a pressure sensor (e.g. 117), method 1100 may proceed to 1130. At 1130, method 1100 may include indicating an absence of undesired evaporative emissions. For example, indicating the absence of undesired evaporative emissions may include storing the result at the controller. Proceeding to 1135, method 1100 may include commanding open the CVV. However, commanding open the CVV may only be conducted responsive to an indication that the evaporative emissions system test (e.g. canister-side test) is also complete. If the evaporative emissions system test is not complete at 1135, method 1100 may include maintaining the CVV closed, until it is indicated that the evaporative emissions system test is complete. If it is indicated at 1135 that the evaporative emissions system test is complete, method 1100 may proceed to 1140. At 1140, method 1100 may include updating the fuel system status (and evaporative emissions system status). For example, at 1140, an evaporative emissions test schedule on the fuel system may be updated responsive to the passing result. For example, future tests may be delayed based on the passing result.

Returning to 1125, if it is indicated that fuel system pressure did not reach the predetermined positive pressure threshold during the predetermined time duration, method 1100 may proceed to 1145. At 1145, method 1100 may include indicating whether an amount of fuel that was added to the tank was sufficient for conducting the simultaneous fuel system and evaporative emissions test diagnostic. For example, if an amount of fuel is less than a predetermined threshold, then the test results may not be robust. As such, if the fuel system pressure is not indicated to reach the predetermined positive pressure threshold at 1125, and it is further determined at 1145 that the amount of fuel added to the tank was below a predetermined threshold, then method 1100 may include discarding the test results at 1150. Continuing to 1135, method 1100 may include commanding open the CVV, however as described above, commanding open the CVV may only be conducted responsive to an indication that both the fuel system test and the evaporative emissions system test are both complete. If both the tests are indicated to be complete, the CVV may be commanded open to relieve pressure in the evaporative emissions system. Proceeding to 1140, method 1100 may include updating the fuel system (and evaporative emissions system) status. For example, it may be indicated that an evaporative emissions test diagnostic was conducted, but that the results of the test were discarded based on the fuel amount added to the tank during the refueling event. As such, at 1140, an evaporative emissions test diagnostic schedule may be updated to reflect the discarded test result. For example, an evaporative emissions test schedule may be updated to conduct another test at the next available opportunity.

Returning to 1145, if it is indicated that the amount of fuel added to the tank was sufficient for conducting the evaporative emissions test diagnostic procedure, method 1100 may proceed to 1155. At 1155, method 1100 may include indicating the presence of undesired evaporative emissions in the fuel system. In other words, method 1100 may thus include monitoring pressure of the fuel system after it is filled, and indicating the existence of undesired evaporative emissions based on a change in the pressure of the fuel system. Such an indication may be stored at the controller, for example. Furthermore, a malfunction indicator light (MIL) may be illuminated on the vehicle dashboard, to alert the vehicle driver of the need to service the vehicle. Continuing to 1135, method 1100 may include commanding open the CVV. As discussed above, commanding open the CVV may only be conducted responsive to an indication that the evaporative emissions test diagnostic on the evaporative emissions system (e.g. canister-side) is also complete. Proceeding to 1140, method 1100 may include updating the fuel system (and evaporative emissions system) status. For example, evaporative emissions test diagnostic procedures may be suspended until it is indicated that the source of undesired evaporative emissions has been remedied.

Returning to 1120, the steps for monitoring pressure in the evaporative emissions system will be described. With the FTIV closed and the CVV closed, the evaporative emissions system may be monitored via a pressure sensor (e.g. 118) positioned in the evaporative emissions system, between the FTIV and the CVV. During the refueling event, fuel vapors may be adsorbed by the fuel vapor canister, thus resulting in an increase in temperature of the fuel vapor canister. Due to the increase in temperature during the refueling event, by subsequently sealing the evaporative emissions system, a vacuum may build in the evaporative emissions system as the canister cools down. As such, at 1160, method 1100 may include indicating whether pressure in the evaporative emissions (Evap) system is greater than a predetermined negative pressure threshold. In other words, it may be indicated whether a vacuum-build in the evaporative emissions system is greater than a predetermined vacuum pressure threshold. If, at 1160, it is indicated that pressure in the evaporative emissions system is greater than the predetermined negative pressure threshold, method 1100 may proceed to 1165. At 1165, method 1100 may include indicating the absence of undesired evaporative emissions. Such a result may be stored at the controller, for example. Proceeding to 1135, method 1100 may include commanding open the CVV. In some examples, if the evaporative emissions test diagnostic completes before the fuel system diagnostic is complete, then the CVV may be commanded open as commanding open the CVV may not affect the fuel system diagnostic (e.g. the FTIV remains sealed). However, in other examples, the CVV may not be opened until it is indicated that both the fuel system test diagnostic and the evaporative emissions test diagnostic are complete. By commanding open the CVV, pressure in the evaporative emissions system may be relieved at 1135.

Proceeding to 1140, method 1100 may include updating evaporative emissions (and in some examples fuel system) status. For example, an evaporative emissions test diagnostic schedule may be updated to reflect the passing result. In one example, future evaporative emissions test diagnostics may be postponed or delayed based on the passing result.

Returning to 1160, if it is indicated that pressure in the evaporative emissions system did not reach the negative pressure threshold during the predetermined time duration for conducting the evaporative emissions test diagnostic, method 1100 may proceed to 1145. At 1145, method 1100 may include indicating whether the fuel amount added during the refueling event was sufficient for conducting the simultaneous fuel system and evaporative emissions test diagnostic. As discussed above, if the amount of fuel added during refueling is less than a predetermined threshold, test results may not be robust. For example, the lower the amount of fuel added to the tank, the less heat generated in the evaporative emissions system as a result of fuel vapors being adsorbed by the fuel vapor canister. Less heat generated in the evaporative emissions system may thus result in less subsequent vacuum build, thus making the test results unreliable. Accordingly, if at 1145, it is indicated that the amount of fuel added to the tank is less than a threshold amount, method 1100 may proceed to 1150, and may include discarding the test results. Continuing to 1135, method 1100 may include commanding open the CVV. However, as discussed above, in some examples the CVV may be commanded open even if the fuel system test is not complete, while in other examples the CVV may only be commanded open if it is indicated that the fuel system test diagnostic is also complete. By commanding open the CVV, pressure in the evaporative emissions system may be relieved. Continuing to 1140, method 1100 may include updating the evaporative emissions system (and in some examples fuel system) status. For example, it may be indicated that an evaporative emissions test diagnostic was conducted responsive to an indication of completion of a refueling event, but that the test results were discarded. As such, an evaporative emissions test diagnostic schedule may be updated. For example, as the test results were discarded, the test schedule may be updated such that the evaporative emissions system may be checked for undesired evaporative emissions at the next available opportunity.

Returning to 1145, it if is indicated that the amount of fuel added to the tank during the refueling event was sufficient for conducting the simultaneous evaporative emissions system and fuel system test diagnostic, method 1100 may proceed to 1155. At 1155, method 1100 may include indicating the presence of undesired evaporative emissions. In other words, method 1100 may include monitoring pressure in the evaporative emissions system and indicating the existence of undesired evaporative emissions based on a change in the pressure of the evaporative emissions system. Such a result may be stored at the controller, for example. Furthermore, a MIL may be illuminated on the vehicle dashboard, to notify the vehicle operator of the need to service the vehicle. Proceeding to 1135, method 1100 may include commanding open the CVV. As discussed above, in some examples the CVV may be commanded open even if the fuel system diagnostic is not complete, however in other examples the CVV may only be commanded open responsive to an indication the fuel system diagnostic is also complete. Commanding open the CVV may relieve pressure in the evaporative emissions system.

Proceeding to 1140, method 1100 may include updating evaporative emissions system (and in some examples fuel system) status. For example, future evaporative emissions test diagnostics on the evaporative emissions system may be suspended until it is indicated that the source of undesired evaporative emissions has been remedied.

While not explicitly illustrated, it may be understood that the method depicted in FIG. 11 relies on a FTIV that is functioning as desired. However, in some examples, the FTIV may not be functioning as desired, which may affect the interpretation of a simultaneous evaporative emissions test diagnostic on a vehicle fuel system (e.g. fuel tank-side), and evaporative emissions system (e.g. canister-side), such as that depicted in FIG. 11. Accordingly, as will be discussed in further detail below with regard to method 1300 depicted in FIG. 13, based on monitored pressure in the fuel system and evaporative emissions system subsequent to a refueling event and the commanding closed of the FTIV and CVV, in some examples it may be further indicated as to whether the FTIV is functioning as desired.

FIG. 12 depicts an example timeline 1200 for conducting a simultaneous fuel system and evaporative emissions system test diagnostic procedure on a vehicle. More specifically, responsive to the completion of a refueling event, where the refueling event may in some examples comprise a remote refueling event, both a vehicle fuel system and evaporative emissions system may be sealed from atmosphere and from each other, such that the presence or absence of undesired evaporative emissions may be indicated separately for each of the fuel system and evaporative emissions system. Example timeline 1200 depicting conducting the simultaneous fuel system and evaporative emissions system test diagnostic procedure uses the method illustrated in FIG. 11. Timeline 1200 includes plot 1205, indicating whether the vehicle is in operation (On), or not (Off), over time. Timeline 1200 further includes plot 1210, indicating whether a refueling event, which may in some examples comprise a remote refueling event, is complete, over time. Timeline 1200 further includes plot 1215, indicating the open or closed state of a fuel tank isolation valve (FTIV) (e.g. 115), and plot 1220, indicating the open or closed state of a canister vent valve (CVV) (e.g. 132), over time. While not explicitly illustrated, it may be understood that, in this example illustration, the FTIV is functioning as desired. Timeline 1200 further includes plot 1225, indicating pressure in the fuel system (e.g. 20), where the fuel system may be defined as being separated from an evaporative emissions system by the FTIV (e.g. 115), over time. Line 1226 represents a predetermined positive pressure threshold, which, if reached during the evaporative emissions test diagnostic procedure, may indicate the absence of undesired evaporative emissions in the fuel system. Timeline 1200 further includes plot 1230, indicating pressure in the evaporative emissions system (e.g. 119), where the evaporative emissions system may be defined as the system between a canister vent valve (CVV) (e.g. 132), FTIV (e.g. 115), and canister purge valve (CPV) (e.g. 161), over time. Line 1231 represents a negative pressure threshold, which, if reached during the evaporative emissions test diagnostic procedure, may indicate the absence of undesired evaporative emissions in the evaporative emissions system. Accordingly, timeline 1200 further includes plot 1235, indicating whether undesired evaporative emissions are indicated in the fuel system, and plot 1240, indicating whether undesired evaporative emissions are indicated in the evaporative emissions system, over time.

At time t0, it may be understood that a refueling event is in progress. As such, the vehicle is not in operation, as indicated by plot 1205. The refueling event is not yet indicated to be complete, as indicated by plot 1210. As discussed above, a refueling event may be indicated to be complete responsive to a re-locking of a fuel lock (e.g. 25), closing of a fuel door, replacement of a gas cap, etc. In some examples where the refueling event comprises a remote refueling event, a fuel delivery operator may communicate with a software application, such as that depicted in FIG. 3, that the refueling event is complete, wherein such information may be further communicated to the vehicle controller. As the refueling event is in progress, the FTIV is open, indicated by plot 1215, and the CVV is also open, indicated by plot 1220. While not explicitly illustrated, it may be understood that a CPV (e.g. 161) is closed. With the FTIV and CVV open (and CPV closed), fuel vapors generated during the refueling event may be directed to the fuel vapor canister for adsorption, prior to exiting to atmosphere. Because the FTIV and the CVV are open, fuel system pressure is near atmospheric pressure, indicated by plot 1225. Fuel system pressure may be indicated by a pressure sensor (e.g. 117). Similarly, evaporative emissions (Evap) system pressure is near atmospheric pressure, indicated by plot 1230. Evaporative emissions system pressure may be indicated by another pressure sensor (e.g. 118). A test diagnostic is not being conducted as a refueling event is in progress, and as such undesired fuel system emissions are not indicated, illustrated by plot 1235. Similarly, undesired evaporative emissions system emissions are not indicated, illustrated by plot 1240.

At time t1, it is indicated that the refueling event is complete. Accordingly, the FTIV and the CVV are commanded closed. By commanding closed the FTIV, the fuel system may be sealed from atmosphere and from the evaporative emissions system. Further, by commanding closed the CVV, the evaporative emissions system may be sealed from atmosphere (and sealed from the fuel system by the closed FTIV). Because the addition of fuel to the tank may agitate the fuel, and may thus increase fuel temperature and fuel vaporization, pressure in the fuel system may be expected to build. Alternatively, during the refueling event, fuel tank vapors adsorbed by the fuel vapor canister (e.g. 122) may result in the generation of heat. As such, a vacuum may be expected to build in the evaporative emissions system as the fuel vapor canister cools. Accordingly, between time t1 and t2, a pressure build is monitored in the fuel system, and a vacuum build is monitored in the evaporative emissions system.

At time t2, pressure in the fuel system reaches the predetermined positive pressure threshold, represented by line 1226. As such, undesired evaporative emissions are not indicated in the fuel system, as indicated by plot 1235. However, at time t2 the evaporative emissions system test diagnostic procedure is not complete. For example, a predetermined time duration for conducting the simultaneous evaporative emissions test diagnostic may not have elapsed by time t2. As such, if the CVV were commanded open, the evaporative emissions system test would be aborted. Accordingly, at time t2, the CVV is maintained closed, and vacuum in the evaporative emissions system continues to build between time t2 and t3.

At time t3, it may be understood that the predetermined time duration for conducting the simultaneous evaporative emissions test diagnostic has elapsed. As the vacuum-build in the evaporative emissions system did not reach the predetermined negative pressure threshold, represented by line 1231, at time t3, undesired evaporative emissions may be indicated, as illustrated by plot 1240. With both the fuel system and the evaporative emissions system test diagnostics completed, the CVV may be commanded open, illustrated by plot 1220, and the FTIV may be maintained closed, illustrated by plot 1215. Accordingly, pressure in the evaporative emissions system returns to atmospheric pressure, illustrated by plot 1230.

Between time t3 and t4, the vehicle remains in a non-operational state, such as may occur after a remote refueling event where the vehicle is not immediately driven responsive to completion of a refueling event. Accordingly, positive pressure in the fuel system is maintained due to the closed FTIV, and pressure in the evaporative emissions system remains near atmospheric pressure due to the open CVV.

As discussed above and which will be discussed in further detail below, the timeline depicted in FIG. 12, along with the method depicted in FIG. 11, relies on the FTIV functioning as desired. However, in some examples, the FTIV may not be functioning as desired. A FTIV that is not functioning as desired may affect a canister loading state, as the FTIV is designed to prevent fuel vapors from being routed to the fuel vapor canister except during refueling events, when the FTIV is commanded open to route fuel vapors generated during refueling to the fuel vapor canister for storage. Thus, a FTIV that is not functioning as desired may lead to additional undesired loading of the fuel vapor canister with fuel vapors, which may further lead to undesired evaporative emissions. Accordingly, diagnosing whether the FTIV is functioning as desired may prevent undesired evaporative emissions, and may prolong functional lifetime of the fuel vapor canister.

In some examples where a vehicle is equipped with an onboard pump configured to pressurize or evacuate a vehicle fuel system and evaporative emission system, the FTIV may be diagnosed by commanding the FTIV closed and activating the pump in a pressure or vacuum mode. If pressure or vacuum is observed in the fuel tank via, for example, a pressure sensor configured to monitor fuel tank pressure (e.g. 117), where the pressure sensor is positioned between the fuel tank and the FTIV, then it may be indicated that the FTIV is not functioning as desired. In other examples, such as a mild HEV, a similar diagnostic may be performed via evacuating the fuel tank using engine vacuum. In such an example, with the FTIV closed, if vacuum is indicated in the fuel tank, then it may be indicated that the FTIV is not functioning as desired.

However, some vehicles (e.g. certain PHEVs) are not equipped with an onboard pump, and furthermore, the engine may never turn on if the vehicle operator regularly charges the battery such that the vehicle is mainly driven in electric-only mode. In such examples, another method to diagnose whether the FTIV is functioning as desired is needed. Accordingly, method 1300 depicted in FIG. 13 illustrates an example method for diagnosing the FTIV.

Turning now to FIG. 13, a high level example method 1300 for simultaneously conducting an evaporative emissions test diagnostic procedure on a vehicle fuel system (e.g. fuel tank-side), and evaporative emissions system (e.g. canister-side), and further diagnosing a vehicle FTIV (e.g. 115), is shown. More specifically, responsive to completion of a refueling event, where the refueling event may comprise a remote refueling event, both a FTIV and a canister vent valve (e.g. 132), may be commanded closed. Accordingly, as discussed above with regard to FIG. 11, both the fuel system and evaporative emissions system may be sealed from each other and from atmosphere. Pressure in the fuel system and evaporative emissions system may thus be monitored, using one pressure sensor (e.g. 117) for the fuel system, and another pressure sensor (e.g. 118) for the evaporative emissions system. In a condition where a pressure build is observed in both the fuel system and evaporative emissions system, where the pressure in each of the fuel system and evaporative emissions system is indicated to converge to the same pressure value, then it may be indicated that the FTIV is not functioning as desired. In other words, it may be indicated that the fuel system is not effectively sealed from the evaporative emissions system.

Method 1300 will be described with reference to the systems described herein and shown in FIG. 1 and FIG. 2, though it should be understood that similar methods may be applied to other systems without departing from the scope of this disclosure. Method 1300 may be carried out by a controller, such as controller 12 in FIG. 1, and may be stored at the controller as executable instructions in non-transitory memory. Instructions for carrying out method 1300 and the rest of the methods included herein may be executed by the controller based on instructions stored on a memory of the controller and in conjunction with signals received from sensors of the engine system, such as the sensors described above with reference to FIG. 1 and FIG. 2. The controller may employ fuel system and evaporative emissions system actuators, such as canister purge valve (CPV) (e.g. 161), FTIV (e.g. 115), CVV (e.g. 132), etc., according to the method below. Method 1300 will be described in relation to a remote refueling event, however as discussed above, the method is not in any way limited to remote refueling events. For example, such a method may be used subsequent to completion of any refueling event, where the fuel tank may be sealed by a FTIV, and where a CVV may seal an evaporative emissions system from atmosphere.

Method 1300 begins at 1305 and may include indicating whether a remote refueling event is complete. Discussed above, a remove refueling event may include sending a request to route a fuel delivery vehicle to the vehicle to-be-refueled, receiving an indication that the fuel delivery vehicle has arrived and in response unlocking a fuel door on the vehicle provided predetermined conditions of the fuel system and evaporative emissions system are met, and delivering fuel to the fuel system until filled to a predetermined level. Furthermore, the predetermined conditions of the fuel system and evaporative emissions system may be related to fuel pressure in the fuel system.

As discussed above, completion of the remote refueling event may comprise a re-locking of a fuel lock, closing of a fuel door, replacement of a gas cap. In another example, completion of the remote refueling event may comprise a fuel delivery operator communicating with a software application, such as that depicted in FIG. 3, that the refueling event is complete, wherein such information may further be communicated to the vehicle controller (e.g. 12). If, at 1305, it is indicated that the remote refueling event is not complete, method 1300 may proceed to 1310, and may include maintaining fuel system and evaporative emissions system status in order to proceed with the refueling event. For example, during a refueling event, the FTIV may be open, the CVV may be open, and the CPV may be closed. As such, if the remote refueling event is not indicated to be complete, at 1310 method 1300 may include maintaining the FTIV and the CVV open, and maintaining closed the CPV.

Upon indication that the remote refueling event is complete at 1305, method 1300 may proceed to 1315. At 1315, method 1300 may include commanding closed the CVV and commanding closed the FTIV. By commanding closed the FTIV and the CVV together, the fuel system may be sealed, the evaporative emissions system may be sealed, and importantly, the fuel system and evaporative emissions system may be sealed from each other. In other words, at 1315, method 1300 may comprise isolating the fuel system from the evaporative emissions system and from atmosphere after the fuel system has been filled to the predetermined fuel fill level (predetermined level).

Proceeding to 1320, method 1300 may include monitoring pressure in the fuel system and the evaporative emissions system. Importantly, pressure in the fuel system may be monitored separately from the pressure monitoring in the evaporative emissions system. For example, as discussed above, pressure in the fuel system may be monitored by one pressure sensor (e.g. 117), while pressure in the evaporative emissions system may be monitored by another pressure sensor (e.g. 118). Thus, both the fuel system and evaporative emissions system may be simultaneously monitored, where the monitoring may include indicating the presence or absence of undesired evaporative emissions, in addition to whether the FTIV is functioning as desired, as discussed in further detail below. It may be understood that monitoring of the fuel system and evaporative emissions system at 1320 may include monitoring for a predetermined time duration, for example.

Continuing to 1325, method 1300 may include indicating whether an amount of fuel that was added to the tank was sufficient for conducting the simultaneous fuel system and evaporative emissions test diagnostic, in addition to the FTIV diagnostic. For example, if an amount of fuel is less than a predetermined threshold, then the test results may not be robust. As such, if it is determined at 1325 that the amount of fuel added to the tank was below a predetermined threshold, then method 1300 may proceed to 1330, and may include aborting the FTIV diagnostic test procedure (and the simultaneous evaporative emissions system and fuel system diagnostic procedure). Method 1300 may then proceed to 1340, and may include commanding open the CVV. By commanding open the CVV, the evaporative emissions system may be coupled to atmosphere. Method 1300 may then end.

Returning to 1325, if it is indicated that the amount of fuel added to the tank was sufficient for conducting the FTIV diagnostic test and simultaneous evaporative emissions system and fuel system diagnostic procedure, method 1300 may proceed to 1335. At 1335, method 1300 may include updating fuel system status, evaporative emissions system status, and a FTIV status, according to FIG. 14. In some examples, the results of the monitoring of the evaporative emissions system and fuel system pressure for the predetermined time duration may be compared to a lookup table, where the lookup table comprises a 2D lookup table such as that depicted in FIG. 14. In one example, the lookup table may be stored at the controller (e.g. 12).

Turning now to FIG. 14, four possibilities (A-D) are illustrated, depicting potential outcomes of the FTIV diagnostic test procedure and simultaneous evaporative emissions system and fuel system diagnostic procedure discussed above with regard to FIG. 13. Referring to possibility A, if responsive to closing the FTIV and the CVV after a refueling event, fuel system pressure is indicated to reach a predetermined positive pressure threshold and a vacuum-build in the evaporative emissions system is indicated to reach a predetermined vacuum pressure threshold, then an absence of undesired emissions in both the fuel system and evaporative emissions system, and an indication that the FTIV is functioning as desired, may be indicated. If there were undesired emissions in either the fuel system or evaporative emissions system, or if the FTIV were not functioning as desired, then it would not be expected for the fuel system to reach the positive pressure threshold, and for the evaporative emission system to reach the predetermined vacuum pressure threshold, as will be discussed in greater detail below.

Referring to possibility B, for example, if fuel system pressure is indicated to reach the predetermined positive pressure threshold, but evaporative emissions system pressure is roughly equal to atmospheric pressure, then undesired evaporative emissions may be indicated in the evaporative emissions system (e.g. canister-side, between the FTIV and atmosphere). Furthermore, an absence of undesired evaporative emissions may be indicated for the fuel system, and it may additionally be indicated that the FTIV is functioning as desired. More specifically, if the FTIV were not functioning as desired, it would not be expected for pressure in the fuel system to build to the positive pressure threshold, in the case where undesired evaporative emissions are present in the evaporative emissions system.

Referring to possibility C, for example, if fuel system pressure and evaporative emissions system pressure converge, then it may be indicated that the FTIV is not functioning as desired. More specifically, subsequent to the completion of the refueling event, if the FTIV and the CVV are commanded closed in order to isolate the fuel system and evaporative emissions system from each other and from atmosphere, pressure in the fuel system may be expected to build (e.g. positive with respect to atmospheric pressure), whereas pressure in the evaporative emissions system may be expected to decrease (e.g. negative with respect to atmospheric pressure), responsive to cooling of the fuel vapor canister. Thus, if pressure in the fuel system as monitored by a fuel system pressure sensor (e.g. 117), and pressure in the evaporative emissions system as monitored by an evaporative emissions system pressure sensor (e.g. 118) are indicated to converge, rather than diverge, it may be indicated that the FTIV is not functioning as desired. Furthermore, if pressure in the fuel system and evaporative emissions system converge, undesired evaporative emissions may not be indicated in the fuel system and evaporative emissions system, however it may not be possible to conclusively determine under such circumstances whether the fuel system and evaporative emissions system are free from undesired evaporative emissions. As such, if pressure in the fuel system and evaporative emissions system are indicated to converge, it may be indicated that the FTIV is not functioning as desired, and while undesired evaporative emissions may not be indicated, future tests may be scheduled in order to properly diagnose the presence or absence of undesired evaporative emissions in the fuel system and evaporative emissions system that do not rely on a functioning FTIV. Such an example may include an EONV test, as discussed above. Briefly, an EONV test may include sealing the fuel system and evaporative emissions system following engine shut-off and monitoring a change in pressure. In such an example, the FTIV that is not functioning as desired may be commanded open. As such, if the fuel tank is heated further after engine shut-off (e.g. from hot exhaust or a hot parking surface), then pressure in the fuel system and evaporative emissions system may rise, and if the pressure rise meets or exceeds a predetermined threshold, it may be indicated that the fuel system and evaporative emissions system are free from undesired evaporative emissions.

Referring to possibility D, for example, if fuel system pressure is indicated to not reach the positive pressure threshold, while vacuum-build in the evaporative emissions system is indicated to reach the predetermined vacuum pressure threshold, then undesired evaporative emissions may be indicated in the fuel system, and it may be indicated that the FTIV is functioning as desired. Furthermore, an absence of undesired evaporative emissions may be indicated in the evaporative emissions system. More specifically, if the FTIV were not functioning as desired, then it would not be expected for a vacuum-build in the evaporative emissions system to reach the predetermined vacuum pressure threshold.

Returning to FIG. 13, at step 1335, method 1300 may include updating fuel system status and evaporative emissions system status, along with FTIV status, via the lookup table depicted at FIG. 14, as discussed above. Furthermore, depending on the results of the test diagnostic procedure conducted according to method 1300, at 1335, method 1300 may be accordingly updated. For example, responsive to an indication of undesired evaporative emissions being present in the fuel system, or evaporative emissions system, or responsive to the FTIV not functioning as desired, then a malfunction indicator light (MIL) may be illuminated on the vehicle dash to alert the vehicle operator to service the vehicle. In some examples where it is indicated that the FTIV is not functioning as desired, a canister purge schedule may be updated, such that the canister is purged more frequently, as a result of the canister being potentially loaded with more fuel vapors than would typically be expected if the FTIV were functioning as desired. In another example where undesired evaporative emissions are indicated in the fuel system, the FTIV may be commanded open during selected vehicle-off conditions and selected conditions where the vehicle is in operation, in order to mitigate potential undesired evaporative emissions stemming from the fuel system to atmosphere, by instead routing fuel vapors from the fuel tank to the fuel vapor canister via the open FTIV. In such an example, a canister purge schedule may need to be updated accordingly, to more frequently purge fuel vapors from the fuel vapor canister.

Proceeding to 1340, method 1300 may include commanding open the CVV. By commanding open the CVV, the evaporative emissions system may be coupled to atmosphere. Method 1300 may then end.

FIG. 15 depicts an example timeline 1500 for conducting a FTIV diagnostic test procedure, while additionally conducting a test diagnostic on a vehicle fuel system and evaporative emissions system. More specifically, responsive to the completion of a refueling event, where the refueling event may in some examples comprise a remote refueling event, both a vehicle fuel system and evaporative emissions system may be sealed from atmosphere and from each other, such that an indication of the presence or absence of undesired evaporative emissions may be indicated separately for each of the fuel system and evaporative emissions system, in addition to diagnosing whether a FTIV is functioning as desired. Example timeline 1500 uses the method illustrated in FIG. 13. Example timeline 1500 includes plot 1505 indicating whether the vehicle is in operation (On), or not (Off), over time. Timeline 1500 further includes plot 1510, indicating whether a refueling event, which may in some examples comprise a remote refueling event, is complete, over time. Timeline 1500 further includes plot 1515, indicating the open or close state of a fuel tank isolation valve (FTIV) (e.g. 115), and plot 1520, indicating the open or closed state of a canister vent valve (CVV) (e.g. 132), over time. Timeline 1500 further includes plot 1525, indicating pressure in the fuel system (e.g. 20), where the fuel system may be defined as being separated from an evaporative emissions system by the FTIV (e.g. 115), over time. Line 1526 represents a predetermined positive pressure threshold, which, if reached during the evaporative emissions test diagnostic procedure, may indicate an absence of undesired evaporative emissions in the fuel system. Timeline 1500 further includes plot 1530, indicating pressure in the evaporative emissions system (e.g. 119) over time, where the evaporative emissions system may be defined as the system between a canister vent valve (CVV) (e.g. 132), FTIV (e.g. 115), and canister purge valve (CPV) (e.g. 161). Line 1531 represents a negative pressure threshold, which, if reached during the evaporative emissions test diagnostic procedure, may indicate the absence of undesired evaporative emissions in the evaporative emissions system. Accordingly, timeline 1500 further includes plot 1535, indicating whether undesired evaporative emissions are indicated in the fuel system, and plot 1540, indicating whether undesired evaporative emissions are indicated in the evaporative emissions system, over time. Timeline 1500 further includes plot 1545, indicating whether the FTIV is functioning as desired, over time.

At time t0, it may be understood that a refueling event is in progress. As such, the vehicle is not in operation, as indicated by plot 1505. The refueling event is not yet indicated to be complete, as indicated by plot 1510. As discussed above, a refueling event may be indicated to be complete responsive to a re-locking of a fuel lock (e.g. 25), closing of a fuel door, replacement of a gas cap, etc. In some examples where the refueling event comprises a remote refueling event, a fuel delivery operator may communicate with a software application, such as that depicted in FIG. 3, that the refueling event is complete, wherein such information may be further communicated to the vehicle controller. As the refueling event is in progress, the FTIV is open, indicated by plot 1515, and the CVV is also open, indicated by plot 1520. While not explicitly illustrated, it may be understood that a CPV (e.g. 161) is closed. With the FTIV and CVV open (and CPV closed), fuel vapors generated during the refueling event may be directed to the fuel vapor canister for adsorption, prior to exiting to atmosphere. Because the FTIV and the CVV are open, fuel system pressure is near atmospheric pressure, indicated by plot 1525. Fuel system pressure may be indicated by a pressure sensor (e.g. 117). Similarly, evaporative emissions (Evap) system pressure is near atmospheric pressure, indicated by plot 1530. Evaporative emissions system pressure may be indicated by another pressure sensor (e.g. 118). A test diagnostic is not being conducted as a refueling event is in progress, and as such undesired fuel system emissions are not indicated, illustrated by plot 1535, and undesired evaporative emissions system emissions are not indicated, illustrated by plot 1540. Still further, at time t0, no prior indication that the FTIV is not functioning as desired has been indicated, thus the FTIV is indicated to be functioning as desired, illustrated by plot 1545.

At time t1, it is indicated that the refueling event is complete. Accordingly, the FTIV and the CVV are commanded closed. By commanding closed the FTIV, the fuel system may be sealed from atmosphere and from the evaporative emissions system. Further, by commanding closed the CVV, the evaporative emissions system may be sealed from atmosphere (and sealed from the fuel system by the closed FTIV). Because the addition of fuel to the tank may agitate the fuel, and may thus increase fuel temperature and fuel vaporization, pressure in the fuel system may be expected to build. Alternatively, during the refueling event, fuel tank vapors adsorbed by the fuel vapor canister (e.g. 122) may result in the generation of heat. As such, a vacuum may be expected to build in the evaporative emissions system as the fuel vapor canister cools. Accordingly, between time t1 and t2, a pressure build is monitored in the fuel system, and a vacuum build is monitored in the evaporative emissions system.

Between time t1 and t2, pressure in the fuel system is indicated to rise and stabilize, however fuel system pressure is not indicated to reach the positive pressure threshold (represented by line 1526). Alternatively, between time t1 and t2, pressure in the evaporative emissions system begins to decrease initially with respect to atmospheric pressure, but then begins to rise and ultimately increases to a positive pressure with respect to atmosphere. Thus, rather than pressure in the fuel system and evaporative emissions system diverging, as would be expected if no undesired evaporative emissions were present in the fuel system and evaporative emissions system, and if the FTIV were functioning as desired, pressure in the fuel system and evaporative emission system is indicated to converge to a positive pressure.

Because pressure in the fuel system and evaporative emissions system is indicated to converge, a likely explanation is that the FTIV is not functioning as desired. Accordingly, at time t2, it is indicated that the FTIV is not functioning as desired. Furthermore, because pressure in the fuel system and evaporative emissions system converged, it is likely that the fuel system and evaporative emissions system are free from undesired evaporative emissions, and as such, undesired evaporative emissions are not indicated in the fuel system or the evaporative emissions system. However, because the positive pressure threshold was not reached in the fuel system, and because the negative pressure threshold was not reached in the evaporative emissions system, it may not be conclusively determined whether the fuel system and evaporative emissions system are free from undesired evaporative emissions. In such an example, follow-up tests may be scheduled in order to effectively diagnose the fuel system and evaporative emissions system for the presence or absence of undesired evaporative emissions, responsive to the indication of the FTIV not functioning as desired. As discussed above, such a follow-up test may include an EONV test after engine shut-off, with the FTIV commanded open and the CVV (and CPV) commanded closed. Other potential follow-up tests may additionally be conducted without departing from the scope of this disclosure.

With the FTIV diagnosed as not functioning as desired, at time t2 the CVV is commanded open, illustrated by plot 1520. Between time t2 and t3, the vehicle remains off, and pressure in the fuel system returns to atmospheric pressure, the result of the CVV being opened and the FTIV not functioning as desired, and pressure in the evaporative emissions system additionally returns to atmospheric pressure, the result of the CVV being opened. In this way, subsequent to a refueling event, where the refueling event may comprise a remote refueling event, both a fuel system and an evaporative emissions system may be simultaneously diagnosed for the presence or absence of undesired evaporative emissions, and it may be further indicated as to whether the fuel system is effectively sealed from the fuel system and evaporative emissions system. By pinpointing whether the undesired evaporative emissions are present in the fuel system, or in the evaporative emissions system, and whether the fuel system is effectively sealed from the evaporative emissions system, costs associated with vehicle labor may be decreased, and undesired evaporative emissions reduced.

The technical effect is to recognize that during a refueling event, fuel vapors routed to a fuel vapor storage canister positioned in the evaporative emissions system may result in an increase in temperature of the fuel vapor canister, as fuel vapors are adsorbed therein. Thus, subsequent to the refueling event, if the fuel system and evaporative emissions system are sealed from atmosphere and each other, a pressure increase may be expected in the fuel system, whereas a pressure decrease may be expected in the evaporative emissions system as the canister cools, thus creating a vacuum-build. As such, based on whether pressure in the fuel system increases to a positive pressure threshold, whether pressure in the evaporative emissions system decreases to a negative pressure threshold, and whether pressure in both the fuel system and evaporative emissions system converge to a common pressure, both the fuel system and evaporative emissions system may be diagnosed for the presence or absence of undesired evaporative emissions. Such a method further enables diagnosing whether a fuel tank isolation valve positioned between the fuel tank and the fuel vapor canister and which functions to seal the fuel system from the evaporative emissions system, is functioning as desired. By diagnosing functionality of the fuel tank isolation valve as such, an onboard pump may not be needed in the vehicle for such a test, and the test may be conducted without engine operation. Furthermore, by pinpointing the source of undesired evaporative emissions or identifying that the fuel tank isolation valve is not functioning as desired, time and costs associated with vehicle labor may be decreased, and undesired evaporative emissions may be reduced.

The systems described herein and with reference to FIGS. 1-2, along with the methods described herein and with reference to FIG. 3, FIGS. 4A-4B, FIGS. 5A-5B, FIGS. 6-9, FIG. 11, and FIG. 13, may enable one or more systems and one or more methods. In one example, a method comprises after refueling a fuel system that supplies fuel to an engine, sealing the fuel system, and an evaporative emissions system removably coupled thereto, from atmosphere and from each other; and while the fuel system and the evaporative emissions system remain sealed and the engine is off, testing each of the systems based on a first pressure change in the fuel system, and a second pressure change in the evaporative emissions system. In a first example of the method, the method further includes wherein testing each of the systems further comprises: indicating an absence of undesired evaporative emissions in the fuel system responsive to the first pressure change in the fuel system reaching a first predetermined pressure threshold that is positive with respect to atmospheric pressure; and indicating an absence of undesired evaporative emissions in the evaporative emissions system responsive to the second pressure change in the evaporative emissions system reaching a second predetermined pressure threshold that is negative with respect to atmospheric pressure. A second example of the method optionally includes the first example and further includes wherein the evaporative emissions system includes a fuel vapor canister configured to capture and store fuel vapors from the fuel tank; and wherein during refueling the fuel tank, fuel vapors are routed to the fuel vapor canister for storage, thus resulting in a canister temperature increase due to the adsorption of fuel vapors by the fuel vapor canister. A third example of the method optionally includes any one or more or each of the first and second examples, and further includes wherein cooling of the fuel vapor canister subsequent to sealing the fuel system and the evaporative emissions system from atmosphere and from each other results in the development of negative pressure within the evaporative emissions system. A fourth example of the method optionally includes any one or more or each of the first through third examples, and further includes wherein sealing the fuel system and evaporative emissions system from each other is accomplished via a fuel tank isolation valve positioned in a conduit between the fuel system and the evaporative emissions system. A fifth example of the method optionally includes any one or more or each of the first through fourth examples and further includes wherein the fuel tank isolation valve is indicated to be not functioning as desired responsive to pressure in the fuel system and the evaporative emissions system converging to a common pressure while the fuel system and evaporative emissions system are sealed from each other and from atmosphere. A sixth example of the method optionally includes any one or more or each of the first through fifth examples and further includes wherein the refueling event comprises a remote refueling event. A seventh example of the method optionally includes any one or more or each of the first through sixth examples and further includes wherein the remote refueling event further comprises: sending a request to route a fuel delivery vehicle to the vehicle to-be-refueled; receiving an indication that the fuel delivery vehicle has arrived and in response unlocking a fuel door on the vehicle provided predetermined conditions of the fuel system and evaporative emissions system are met; and delivering fuel to the fuel system until filled to a predetermined level. An eighth example of the method optionally includes any one or more or each of the first through seventh examples and further includes wherein the predetermined conditions of the fuel system and evaporative emissions system are related to fuel pressure in the fuel system. A ninth example of the method optionally includes any one or more or each of the first through eighth examples and further includes wherein the first pressure change in the fuel system and the second pressure change in the evaporative emissions system are indicated via two separate pressure sensors, one positioned in the fuel system and the other positioned in the evaporative emissions system.

Another example of a method comprises after completion of a refueling event which adds fuel to a fuel tank in a fuel system that supplies fuel to a vehicle engine; sealing the fuel system and an evaporative emissions system removably coupled thereto from atmosphere and from each other; and indicating whether the fuel system and evaporative emissions system are effectively sealed from each other, and indicating the presence or absence of undesired evaporative emissions in the fuel system and evaporative emissions system, responsive to pressure changes in the fuel system and evaporative emissions system subsequent to sealing the fuel system and evaporative emissions system from atmosphere and from each other. In a first example of the method, the method further includes wherein the fuel system and evaporative emissions system are indicated to not be effectively sealed from each other responsive to pressure in the fuel system and evaporative emissions system converging to a common pressure. A second example of the method optionally includes the first example, and further comprises indicating an absence of undesired evaporative emissions in both the fuel system and evaporative emissions system, and indicating that the fuel system and evaporative emissions system are effectively sealed from each other, responsive to pressure in the fuel system increasing to a first pressure threshold that is positive with respect to atmospheric pressure, and responsive to pressure in the evaporative emissions system decreasing to a second pressure threshold that is negative with respect to atmospheric pressure. A third example of the method optionally includes any one or more or each of the first and second examples, and further comprises indicating the presence of undesired evaporative emissions in the evaporative emissions system and further indicating that the fuel system and evaporative emissions system are effectively sealed from each other, responsive to pressure in the fuel system increasing to the first pressure threshold, and responsive to pressure in the evaporative emissions system roughly equivalent to atmospheric pressure. A fourth example of the method optionally includes any one or more or each of the first through third examples and further comprises indicating the presence of undesired evaporative emissions in the fuel system and further indicating that the fuel system and evaporative emissions system are effectively sealed from each other, responsive to pressure in the fuel system not reaching the first pressure threshold, and responsive to pressure in the evaporative emissions system reaching the second pressure threshold. A fifth example of the method optionally includes any one or more or each of the first through fourth examples and further includes wherein the evaporative emissions system includes a fuel vapor canister configured to capture and store fuel vapors from the fuel tank; wherein during refueling the fuel tank, fuel vapors are routed to the fuel vapor canister for storage, thus resulting in a canister temperature increase due to the adsorption of fuel vapors by the fuel vapor canister; and wherein cooling of the fuel vapor canister subsequent to sealing the fuel system and the evaporative emissions system from atmosphere and from each other results in the development of negative pressure with respect to atmospheric pressure within the evaporative emissions system.

An example of a system for a vehicle, comprises a fuel system, including a fuel tank that supplies fuel to a combustion engine; an evaporative emissions control system, removably coupled to the fuel system, the evaporative emissions system including a fuel vapor storage canister for capturing and storing fuel tank vapors; a fuel tank isolation valve, positioned in a conduit between the fuel tank and the fuel vapor storage canister; a canister vent valve, positioned in a vent line between the fuel vapor canister and atmosphere; a first pressure sensor, positioned in the conduit between the fuel tank and the fuel vapor canister; a second pressure sensor, positioned between the fuel vapor storage canister and the canister vent valve; and a controller storing instructions in non-transitory memory, that when executed, cause the controller to: indicate a refueling event that adds fuel to the fuel tank is complete; command closed both the fuel tank isolation valve and the canister vent valve; monitor pressure in the fuel system via the first pressure sensor, and monitor pressure in the evaporative emissions system via the second pressure sensor; and indicate whether the fuel tank isolation valve is functioning as desired responsive to pressure in the fuel system and evaporative emissions system converging to a common pressure over a predetermined time duration. In a first example, the system further includes wherein the controller further stores instructions in non-transitory memory, that when executed, cause the controller to: indicate an absence of undesired evaporative emissions in both the fuel system and the evaporative emissions system, and further indicate that the fuel tank isolation valve is functioning as desired, responsive to a pressure increase in the fuel system reaching a predetermined positive pressure threshold with respect to atmospheric pressure, and responsive to a pressure decrease in the fuel system reaching a predetermined negative pressure threshold with respect to atmospheric pressure. A second example of the system optionally includes the first example and further includes wherein the controller further stores instructions in non-transitory memory, that when executed, cause the controller to: indicate that the fuel tank isolation valve is functioning as desired and indicate the presence of undesired evaporative emissions in the fuel system responsive to pressure in the fuel system not reaching the predetermined positive pressure threshold, and with pressure in the evaporative emissions system reaching the negative pressure threshold; and indicate that the fuel tank isolation valve is functioning as desired and indicate the presence of undesired evaporative emissions in the evaporative emissions system responsive to pressure in the evaporative emissions system not reaching the negative pressure threshold, and with pressure in the fuel system reaching the positive pressure threshold. A third example of the system optionally includes any one or more or each of the first and second examples and further comprises a fuel filler system coupled to the fuel system, the fuel filler system including a refueling lock; wherein the controller further stores instructions in non-transitory memory, that when executed, cause the controller to: receive a request to refuel the fuel tank; command open the fuel tank isolation valve and command open or maintain open the canister vent valve; and unlock the refueling lock responsive to receiving the request to refuel the fuel tank and further responsive to pressure in the fuel tank indicated to be at atmospheric pressure.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
responsive to refueling a fuel system that supplies fuel to an engine,
simultaneously measuring a first pressure in the fuel system and a second pressure in an evaporative emissions system while the fuel system and the evaporative emissions system are sealed from atmosphere and from each other; and testing each of the systems based on the first pressure and the second pressure.

2. The method of claim 1, wherein testing each of the systems further comprises:
indicating an absence of undesired evaporative emissions in the fuel system responsive to the first pressure in the fuel system reaching a first predetermined pressure threshold that is positive with respect to atmospheric pressure; and
indicating an absence of undesired evaporative emissions in the evaporative emissions system responsive to the second pressure in the evaporative emissions system reaching a second predetermined pressure threshold that is negative with respect to atmospheric pressure.

3. The method of claim 1, wherein the evaporative emissions system includes a fuel vapor canister configured to capture and store fuel vapors from a fuel tank; and
wherein during refueling the fuel tank, fuel vapors are routed to the fuel vapor canister for storage, thus resulting in a canister temperature increase due to the adsorption of fuel vapors by the fuel vapor canister.

4. The method of claim 3, further comprising cooling the fuel vapor canister subsequent to sealing the fuel system and the evaporative emissions system from atmosphere and from each other.

5. The method of claim 1, wherein sealing the fuel system and the evaporative emissions system are sealed from atmosphere and from each other via closing a canister vent valve positioned in a vent line between the evaporative emissions system and atmosphere, and closing a fuel tank isolation valve positioned in a conduit between the fuel system and the evaporative emissions system.

6. The method of claim 5, wherein the fuel tank isolation valve is indicated to be not functioning as desired responsive to the first pressure in the fuel system and the second pressure in the evaporative emissions system converging to a common pressure higher than atmospheric pressure while the fuel system and the evaporative emissions system are sealed from each other and from atmosphere.

7. The method of claim 1, wherein a refueling event comprises a remote refueling event.

8. The method of claim 7, wherein the remote refueling event further comprises:
sending a request to route a fuel delivery vehicle to a vehicle to-be-refueled;
receiving an indication that the fuel delivery vehicle has arrived and in response unlocking a fuel door on the vehicle provided predetermined conditions of the fuel system and the evaporative emissions system are met; and
delivering fuel to the fuel system until filled to a predetermined level.

9. The method of claim 8, wherein the predetermined conditions of the fuel system and the evaporative emissions system are related to fuel pressure in the fuel system.

10. The method of claim 1, wherein the first pressure in the fuel system and the second pressure in the evaporative emissions system are measured via two separate pressure sensors, one positioned in the fuel system and the other positioned in the evaporative emissions system.

11. A method, comprising:
responsive to completion of a refueling event which adds fuel to a fuel tank in a fuel system that supplies fuel to a vehicle engine,
sealing the fuel system and an evaporative emissions system removably coupled thereto from atmosphere and from each other;
simultaneously measuring pressures in the fuel system and the evaporative emissions system while the fuel system and the evaporative emissions system are sealed; and
indicating whether the fuel system and the evaporative emissions system are sealed from each other, and indicating a presence or absence of undesired evaporative emissions in the fuel system and the evaporative emissions system based on the measured pressures.

12. The method of claim 11, wherein the fuel system and the evaporative emissions system are indicated to not be sealed from each other responsive to the measured pressures in the fuel system and the evaporative emissions system converging to a common pressure higher than atmospheric pressure.

13. The method of claim 11, further comprising:
indicating the absence of undesired evaporative emissions in both the fuel system and the evaporative emissions system, and indicating that the fuel system and the evaporative emissions system are sealed from each other, responsive to the pressure in the fuel system increasing to a first pressure threshold that is positive with respect to atmospheric pressure, and responsive to the pressure in the evaporative emissions system decreasing to a second pressure threshold that is negative with respect to atmospheric pressure.

14. The method of claim 13, further comprising:
indicating the presence of undesired evaporative emissions in the evaporative emissions system and further indicating that the fuel system and the evaporative emissions system are sealed from each other, responsive to the pressure in the fuel system increasing to the first pressure threshold, and responsive to the pressure in the evaporative emissions system equivalent to atmospheric pressure.

15. The method of claim 13, further comprising;
indicating the presence of undesired evaporative emissions in the fuel system and further indicating that the fuel system and the evaporative emissions system are sealed from each other, responsive to the pressure in the fuel system not reaching the first pressure threshold, and responsive to the pressure in the evaporative emissions system reaching the second pressure threshold.

16. The method of claim 11, wherein the evaporative emissions system includes a fuel vapor canister configured to capture and store fuel vapors from the fuel tank; and
wherein during refueling the fuel tank, fuel vapors are routed to the fuel vapor canister for storage, thus resulting in a canister temperature increase due to adsorption of fuel vapors by the fuel vapor canister,
the method further comprises cooling the fuel vapor canister subsequent to sealing the fuel system and the evaporative emissions system from atmosphere and from each other.

* * * * *